(12) United States Patent
Jones et al.

(10) Patent No.: US 8,185,100 B2
(45) Date of Patent: *May 22, 2012

(54) COMMUNICATION SYSTEM

(75) Inventors: Aled Wynne Jones, Harston (GB);
Michael Raymond Reynolds, Harston (GB); David Bartlett, Harston (GB); Ian Michael Hosking, Harston (GB); Donald Glenn Guy, Harston (GB); Peter John Kelly, Harston (GB); Daniel Reginald Ewart Timson, Harston (GB); Nicolas Vasilopolous, Harston (GB); Alan Michael Hart, Harston (GB); Robert John Morland, Harston (GB)

(73) Assignee: Intrasonics S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,325

(22) Filed: Jun. 4, 2010

(65) Prior Publication Data
US 2010/0240297 A1    Sep. 23, 2010

Related U.S. Application Data

(63) Continuation of application No. 10/432,886, filed as application No. PCT/GB01/05306 on Nov. 30, 2001, now Pat. No. 7,796,978.

(30) Foreign Application Priority Data

| Nov. 30, 2000 | (GB) | 0029273.0 |
|---|---|---|
| Jan. 25, 2001 | (GB) | 0101947.0 |
| Jan. 25, 2001 | (GB) | 0101953.8 |
| Mar. 9, 2001 | (GB) | 0105869.2 |
| Mar. 16, 2001 | (GB) | 0106587.9 |
| Mar. 19, 2001 | (GB) | 0106778.4 |
| Mar. 21, 2001 | (GB) | 0107124.0 |
| May 4, 2001 | (GB) | 0111016.2 |
| Jun. 15, 2001 | (GB) | 0114714.9 |
| Nov. 9, 2001 | (GB) | 0127013.1 |

(51) Int. Cl.
*H04M 3/00* (2006.01)
*H04M 3/42* (2006.01)
*H04H 60/21* (2008.01)

(52) U.S. Cl. ........... 455/420; 455/414.1; 455/2.01

(58) Field of Classification Search .......... 455/418–420, 455/3.01, 2.01, 3.03, 414.1–414.4, 405, 412.1–412.2, 455/550.1, 90.1, 556.1–556.2, 552.1, 566, 455/569.1, 90.3

See application file for complete search history.

(56) References Cited

U.S. PATENT DOCUMENTS
2,660,662 A   11/1953   Scherbatskoy
(Continued)

FOREIGN PATENT DOCUMENTS
CA    2 073 387 A1   1/1993
(Continued)

OTHER PUBLICATIONS

Bender et al., *Techniques for Data Hiding*, IBM Systems Journal, MIT Media Lab, vol. 35, Nos. 3 and 4, 1995, pp. 313 and 323-336.
(Continued)

*Primary Examiner* — Brandon Miller
(74) *Attorney, Agent, or Firm* — Alston & Bird LLP

(57) ABSTRACT

There is described a communication system in which data is received by and/or transmitted to a telecommunications apparatus using an acoustic data channel. In embodiments, the data is encoded within the audio track of a media broadcast or other public broadcast. The invention has particular, but not exclusive, relevance to a cellular communication system. There are also described acoustic position detection systems for determining the position of a telecommunications apparatus.

17 Claims, 27 Drawing Sheets

U.S. PATENT DOCUMENTS

| | | |
|---|---|---|
| 3,651,471 A | 3/1972 | Haselwood et al. |
| 3,732,536 A | 5/1973 | Larka et al. |
| 3,742,463 A | 6/1973 | Haselwood et al. |
| 3,845,391 A | 10/1974 | Crosby |
| 4,025,851 A | 5/1977 | Haselwood et al. |
| 4,237,449 A | 12/1980 | Zibell |
| 4,425,642 A | 1/1984 | Moses et al. |
| 4,514,725 A | 4/1985 | Bristley |
| 4,642,685 A | 2/1987 | Roberts et al. |
| 4,718,106 A | 1/1988 | Weinblatt |
| 4,750,034 A | 6/1988 | Lem |
| 4,807,031 A | 2/1989 | Broughton et al. |
| 4,840,602 A | 6/1989 | Rose |
| 4,846,693 A | 7/1989 | Baer |
| 4,923,428 A | 5/1990 | Curran |
| 4,945,412 A | 7/1990 | Kramer |
| 5,085,610 A | 2/1992 | Engel et al. |
| 5,090,936 A | 2/1992 | Satoh et al. |
| 5,108,341 A | 4/1992 | DeSmet |
| 5,113,437 A | 5/1992 | Best et al. |
| 5,136,613 A | 8/1992 | Dumestre, III |
| 5,191,615 A | 3/1993 | Aldava et al. |
| 5,301,167 A | 4/1994 | Proakis et al. |
| 5,305,348 A | 4/1994 | Izumi |
| 5,319,735 A | 6/1994 | Preuss et al. |
| 5,353,352 A | 10/1994 | Dent et al. |
| 5,412,620 A | 5/1995 | Cafarella et al. |
| 5,436,941 A | 7/1995 | Dixon et al. |
| 5,442,343 A | 8/1995 | Cato et al. |
| 5,446,756 A | 8/1995 | Mallinckrodt |
| 5,450,490 A | 9/1995 | Jensen et al. |
| 5,457,807 A * | 10/1995 | Weinblatt ............ 455/2.01 |
| 5,479,442 A | 12/1995 | Yamamoto |
| 5,499,265 A | 3/1996 | Dixon et al. |
| 5,519,779 A | 5/1996 | Proctor et al. |
| 5,539,705 A | 7/1996 | Akerman et al. |
| 5,555,258 A | 9/1996 | Snelling et al. |
| 5,574,773 A | 11/1996 | Grob et al. |
| 5,579,124 A | 11/1996 | Aijala et al. |
| 5,604,767 A | 2/1997 | Dixon et al. |
| 5,657,379 A | 8/1997 | Honda et al. |
| 5,663,766 A | 9/1997 | Sizer, II |
| 5,687,191 A | 11/1997 | Lee et al. |
| 5,719,937 A | 2/1998 | Warren et al. |
| 5,734,639 A | 3/1998 | Bustamante et al. |
| 5,752,880 A | 5/1998 | Gabai et al. |
| 5,774,452 A | 6/1998 | Wolosewicz |
| 5,822,360 A | 10/1998 | Lee et al. |
| 5,828,325 A | 10/1998 | Wolosewicz et al. |
| 5,848,155 A | 12/1998 | Cox |
| 5,930,369 A | 7/1999 | Cox et al. |
| 5,937,000 A | 8/1999 | Lee et al. |
| 5,945,932 A | 8/1999 | Smith et al. |
| 5,960,398 A | 9/1999 | Fuchigami et al. |
| 5,978,413 A | 11/1999 | Bender |
| 5,999,899 A | 12/1999 | Robinson |
| 6,021,432 A | 2/2000 | Sizer, II et al. |
| 6,022,273 A | 2/2000 | Gabai et al. |
| 6,031,914 A | 2/2000 | Tewfik |
| 6,035,177 A | 3/2000 | Moses et al. |
| 6,061,793 A | 5/2000 | Tewfik et al. |
| 6,125,172 A | 9/2000 | August et al. |
| 6,290,566 B1 | 9/2001 | Gabai et al. |
| 6,298,322 B1 | 10/2001 | Lindemann |
| 6,370,666 B1 | 4/2002 | Lou et al. |
| 6,389,055 B1 * | 5/2002 | August et al. ............ 375/130 |
| 6,434,253 B1 | 8/2002 | Hayashi et al. |
| 6,438,117 B1 | 8/2002 | Grilli et al. |
| 6,442,283 B1 | 8/2002 | Tewfik et al. |
| 6,449,596 B1 | 9/2002 | Ejima |
| 6,467,089 B1 * | 10/2002 | Aust et al. .............. 725/13 |
| 6,577,881 B1 | 6/2003 | Ehara |
| 6,584,138 B1 | 6/2003 | Neubauer et al. |
| 6,636,551 B1 | 10/2003 | Ikeda et al. |
| 6,650,877 B1 | 11/2003 | Tarbouriech et al. |
| 6,708,214 B1 | 3/2004 | LaFleur |
| 6,737,957 B1 | 5/2004 | Petrovic et al. |
| 6,757,300 B1 | 6/2004 | Pages et al. |
| 6,765,950 B1 | 7/2004 | Nuytkens et al. |
| 6,773,344 B1 | 8/2004 | Gabai et al. |
| 6,782,253 B1 | 8/2004 | Shteyn et al. |
| 6,832,093 B1 | 12/2004 | Ranta |
| 6,850,555 B1 | 2/2005 | Barclay |
| 6,876,623 B1 | 4/2005 | Lou et al. |
| 6,892,175 B1 | 5/2005 | Cheng et al. |
| 6,983,051 B1 | 1/2006 | Rhoads |
| 7,031,271 B1 | 4/2006 | LaRosa et al. |
| 7,065,342 B1 | 6/2006 | Rolf |
| 7,155,159 B1 * | 12/2006 | Weinblatt et al. ............ 455/2.01 |
| 7,158,676 B1 | 1/2007 | Rainsford |
| 7,796,978 B2 * | 9/2010 | Jones et al. ................ 455/414.3 |
| 2002/0069263 A1 | 6/2002 | Sears et al. |
| 2004/0169581 A1 | 9/2004 | Petrovic et al. |
| 2008/0049971 A1 | 2/2008 | Ramos et al. |

FOREIGN PATENT DOCUMENTS

| | | |
|---|---|---|
| CA | 2129925 | 2/1996 |
| CA | 2 162 614 A1 | 5/1996 |
| CA | 2 230 071 A1 | 6/1996 |
| CA | 2 457 089 A1 | 2/2003 |
| DE | 32 29 405 A1 | 2/1984 |
| EP | 0 135 192 | 3/1985 |
| EP | 0 172 095 | 2/1986 |
| EP | 0 347 401 A3 | 12/1989 |
| EP | 0 688 487 | 5/1994 |
| EP | 0 631 226 A1 | 12/1994 |
| EP | 0 669 070 | 5/1995 |
| EP | 0 713 335 A2 | 5/1996 |
| EP | 0 766 468 A2 | 4/1997 |
| EP | 0 779 759 A2 | 6/1997 |
| EP | 0 883 939 | 8/1997 |
| EP | 0 822 550 A1 | 2/1998 |
| EP | 0 828 372 A2 | 3/1998 |
| EP | 0 863 631 A2 | 9/1998 |
| EP | 0 674 405 B1 | 10/1998 |
| EP | 0 872 995 A2 | 10/1998 |
| EP | 0 606 703 B1 | 12/1998 |
| EP | 1 064 742 | 7/1999 |
| EP | 1 158 800 A1 | 11/2001 |
| EP | 1 423 936 | 3/2003 |
| FR | 2 626 731 | 8/1989 |
| GB | 2 135 536 A | 8/1984 |
| GB | 2 192 743 A | 1/1988 |
| GB | 2 196 167 A | 4/1988 |
| GB | 2 256 113 A | 11/1992 |
| GB | 2 294 619 A | 5/1996 |
| GB | 2 301 989 A | 12/1996 |
| GB | 2 334 133 A | 8/1999 |
| GB | 2 343 774 A | 5/2000 |
| GB | 2 345 779 A | 7/2000 |
| JP | 58-69536 A | 4/1958 |
| JP | 63-147738 U | 9/1963 |
| JP | 59-166545 U | 11/1984 |
| JP | 63-088673 | 4/1988 |
| JP | 63-272134 A | 11/1988 |
| JP | 04-092518 | 3/1992 |
| JP | 5252578 A | 9/1993 |
| JP | 05-316598 | 11/1993 |
| JP | 06-311079 | 11/1994 |
| JP | 07-245782 | 9/1995 |
| JP | 10-021259 | 1/1998 |
| JP | 2000152217 | 5/2000 |
| JP | 2000-207170 | 7/2000 |
| JP | 2000-236576 | 8/2000 |
| JP | 2000-267952 | 9/2000 |
| JP | 2000-308130 | 11/2000 |
| WO | WO 91/10490 | 7/1991 |
| WO | WO 91/10491 | 7/1991 |
| WO | WO 93/07689 | 4/1993 |
| WO | WO 94/08677 | 4/1994 |
| WO | WO 96/19274 | 6/1996 |
| WO | WO 97/21279 | 6/1997 |
| WO | WO 97/31440 | 8/1997 |
| WO | WO 97/33391 | 9/1997 |
| WO | WO 97/41936 | 11/1997 |
| WO | WO 98/06195 A1 | 2/1998 |
| WO | WO 98/20411 | 5/1998 |

| | | |
|---|---|---|
| WO | WO 98/26529 A2 | 6/1998 |
| WO | WO 98/32248 | 7/1998 |
| WO | WO 98/51077 | 11/1998 |
| WO | WO 99/00979 | 1/1999 |
| WO | WO 99/46720 | 9/1999 |
| WO | WO 00/15316 | 3/2000 |
| WO | WO 00/21203 A1 | 4/2000 |
| WO | WO 00/39955 A1 | 7/2000 |
| WO | WO 00/44168 A1 | 7/2000 |
| WO | WO 00/57586 | 9/2000 |
| WO | WO 00/60484 | 10/2000 |
| WO | WO 01/10065 A1 | 2/2001 |
| WO | WO 01/31816 A1 | 5/2001 |
| WO | WO 01/57619 | 8/2001 |
| WO | WO 01/61987 A2 | 8/2001 |
| WO | WO 01/75629 | 10/2001 |

OTHER PUBLICATIONS

Chung et al., *Digital Watermarking for Copyright Protection of MPEG2 Cojpressed Video*, IEEE Transactions on Consumer Electronics, vol. 44, No. 3, pp. 895-901, Aug. 1998.

Cox et al., *A Secure, Robust Watermark for Multimedia*, 1$^{st}$ International Workshop Cambridge, UK, May/Jun. 1996 Proceedings, pp. 185-206.

Cox et al., *A Secure, Imperceptible Yet Perceptually Salient, Spread Spectrum Watermark for Multimedia*, SouthCon 96, Conference Record, Orlando, Florida, pp. 192-197, Jun. 25-27, 1996.

Cox et al., *Secure Spread Spectrum Watermarking for Multimedia*, IEEE Transactions on Image Processing, vol. 6, No. 12, pp. 1673-1687, Dec. 1997.

Cox et al., *Secure Spread Spectrum Watermarking for Images, Audio and Video*, International Conference on Image Processing, vol. III of III, Sep. 16-19, 1996, Lausanne, Switzerland, pp. 243-246.

Iwakiri et al., *Digital Watermark Scheme for High Quality Audio Data by Spectrum Spreading and Modified Discrete Cosine Transform*, Information Processing Society of Japan, vol. 39, No. 9, pp. 2631-2637, Sep. 1998.

Neubauer et al., *Continuous Steganorgraphic Data Transmission Using Uncompressed Audio*, Lecture Notes in Computer Science 1525, Information Hiding, 2$^{nd}$ International Workshop, IH '98, Portland, Oregon, USA, Apr. 1998 Proceedings, pp. 208-217.

Sundaram et al., *An Embedded Cryptosystem for Digital Broadcasting*, 1997 IEEE 6$^{th}$ International Conference on Universal Personal Communications Record, vol. 2 of 2, Oct. 12-16, 1997, San Diego, CA, pp. 401-405.

Swanson et al., *Robust Audio Watermarking Using Perceptual Masking*, Elsevier Signal Processing, vol. 66, No. 3, May 1998, pp. 337-355.

Seok et al., *Prediction-Based Audio Watermark Detection Algorithm*, 109$^{th}$ AES Convention, Sep. 22-25, 2000, pp. 1-11.

*Simultaneous Subliminal Signalling in Conventional Sound Circuits: A Feasibility Study*, BBC and the ITA, Research Department Report No. 1971/1, Jan. 1971, pp. 1-12.

Huang, D.Y., et al.; "Robust and Inaudible Multi-echo Audio Watermarking"; Department of Electrical Engineering; National University of Singapore; 2002; pp. 615-622.

Pohlmann, *Fundamentals of Digital Audio*, pp. 47-48 and *Digital Audio Tape (DAT)*, pp. 255-256 and *The Compact Disc*, p. 323, Principles of Digital Audio, Second Edition.

Extended European Search Report for European Patent Application No. 10182207, mailed May 19, 2011.

Notification of Reasons for Refusal for Japanese Patent Application No. 2008-192010, mailed Dec. 13, 2010.

Gerasimov, V., et al.; "Things that talk: Using sound for device-to-device and device-to-human communication"; IBM Systems Journal; vol. 39; Nos. 3 & 4; 2000; pp. 530-546.

Huang, D.Y., et al.;"Robust and Inaudible Multi-echo Audio Watermarking"; Department of Electrical Engineering; National University of Singapore; 2002; pp. 615-622.

Petrovic, R., et al.; "Data Hiding within Audio signals"; Telsiks '99; Oct. 13-15, 1999; Yugoslavia; pp. 88-95.

Bender, W. et al., Techniques for Data Hiding, SPIE vol. 2420, Mar. 1995; pp. 164-173.

\* cited by examiner

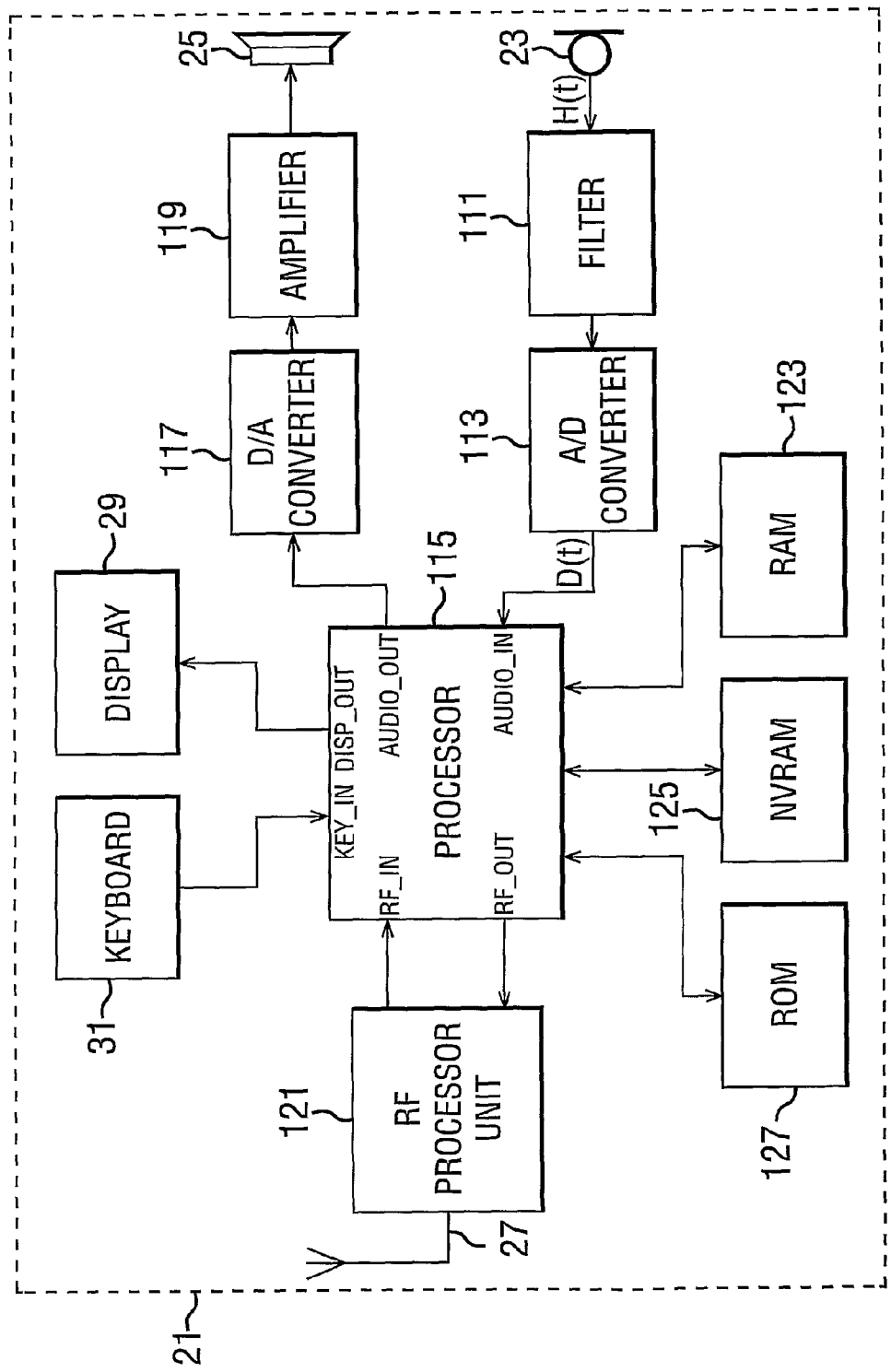

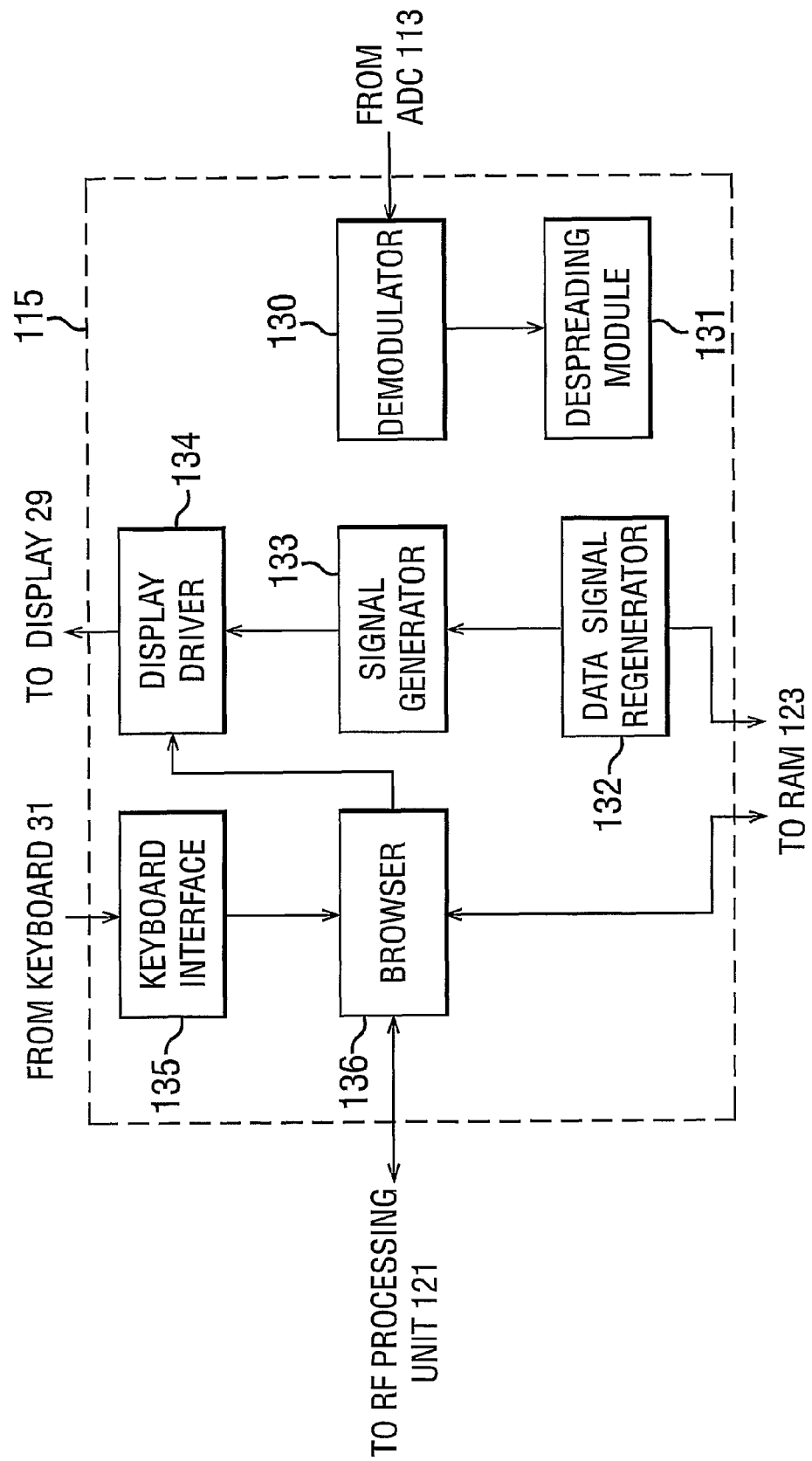

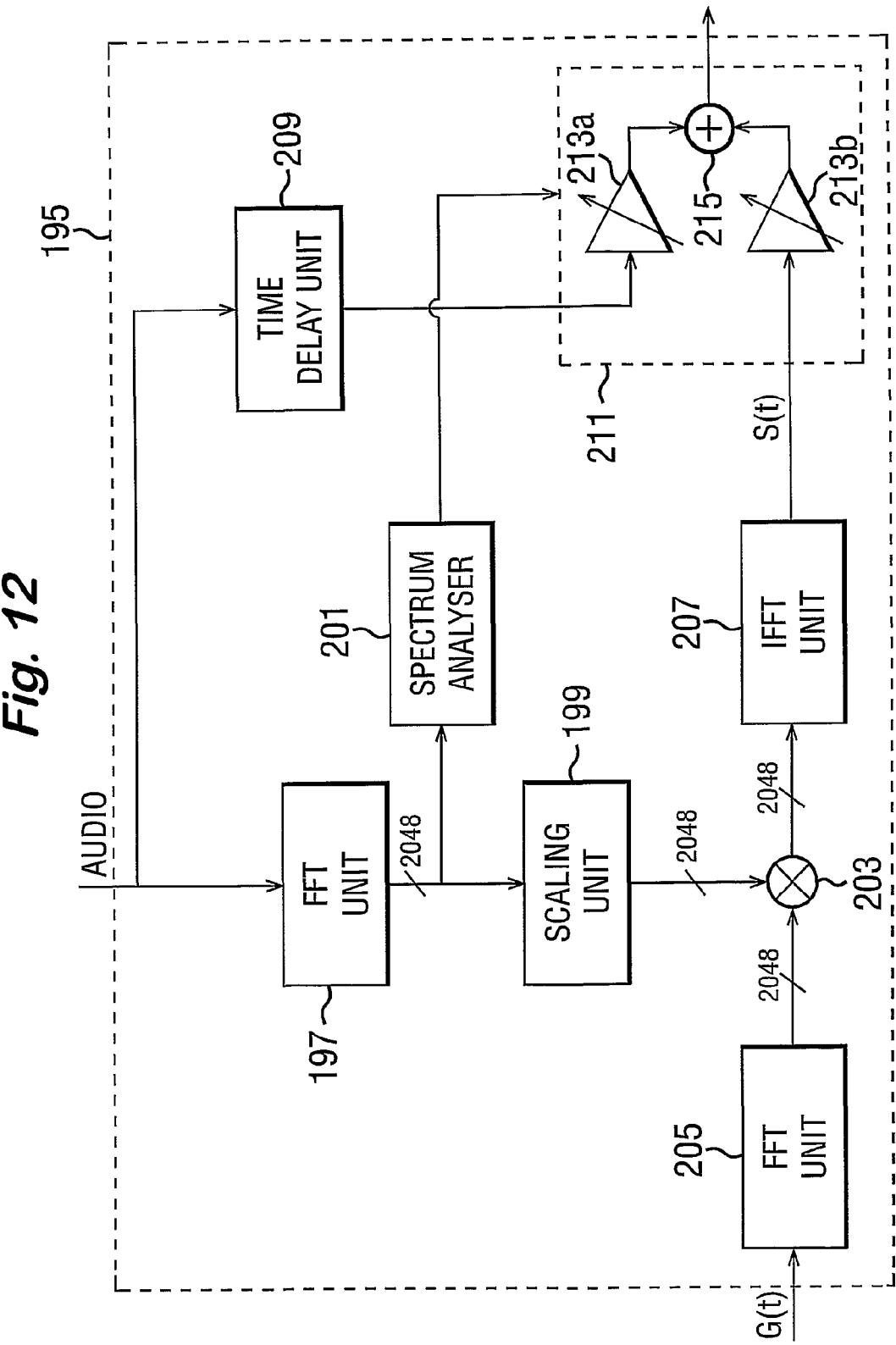

COMMUNICATION SYSTEM

CROSS-REFERENCE TO RELATED APPLICATIONS

This application is a continuation of U.S. application Ser. No. 10/432,886, filed Dec. 15, 2003 now U.S. Pat. No. 7,796,978, which was a national stage filing under 35 U.S.C. 371 of PCT/GB01/05306, filed Nov. 30, 2001, which are hereby incorporated herein in their entirety by reference.

This invention relates to a communication system. The invention has particular, but not exclusive, relevance to communications system in which a telephone apparatus such as a cellular phone is provided with a secondary data channel.

Cellular phones are available in which a secondary data channel is formed by transmitting data over an infra-red link, for example in accordance with the IrDA protocol. A disadvantage of using an infra-red link is that the cellular phone has to be aligned quite accurately with another infra-red port.

According to one aspect of the invention, there is provided a communication system in which data is received by and/or transmitted to a telecommunications apparatus using an acoustic data channel. By using an acoustic data channel, the requirement for accurate alignment is removed.

Acoustic signals are encountered in many different ways during daily life. Many of these acoustic signals are generated by inputting an electrical signal into an electro-acoustic transducer, for example the audio tracks of television/radio programmes and public address announcements. According to an aspect of the invention, data are encoded within an electrical signal which is then output by an electro-acoustic transducer. The acoustic signal is detected by a telecommunications apparatus which recovers the data and responds in some manner to the recovered data.

In some applications, the data conveys information and the telecommunications apparatus responds by presenting the information to a user.

In other applications, the data triggers the telecommunications apparatus to initiate a stored application, for example sending a message to a predefined telephone number. This trigger can be synchronised with an event, for example a particular moment within a television programme.

In still other applications, the data is used to configure the telecommunications apparatus. For example, the data could convey a ring tone for a cellular phone.

Preferably, the data identifies a data source which is accessible using the telecommunications network, and the telecommunications apparatus responds to the acoustic data signal by downloading information from the data source. For example, the data source could be a web site. In this way, the acoustic signal transmits only a small amount of data which is advantageous because the transmission of the data signal becomes less invasive to a listener (i.e. unobtrusive even when transmitted within the audible frequency range).

According to another aspect of the invention, a telecommunications apparatus has an electro-acoustic transducer and is arranged to produce a data signal which is output by the electro-acoustic transducer to form an acoustic data signal. This acoustic data signal can then be detected by a remote device.

According to a further aspect of the invention, there is provided a communications system in which data are encoded within an electrical signal which is then output by an electro-acoustic transducer. The acoustic signal is detected by a telecommunications apparatus which converts the acoustic signal into a corresponding electrical signal. The telecommunications apparatus is coupled to a telecommunications network and means for recovering the data from the electrical signal corresponding to the acoustic signal is provided in the telecommunications apparatus or another device coupled to the telecommunications network.

According to another aspect of the invention, there is provided a communication system in which a data signal generator generates a data signal and sends the generated data signal, vis a telecommunications network, to a telecommunications apparatus. The data signal is converted by the telecommunications apparatus into a corresponding acoustic signal, which is detected by an acousto-electric transducer and converted into a corresponding electrical signal. A reception apparatus which is coupled to the acousto-electric transducer then processes the electrical signal to recover the data signal.

Preferably, the data signal is encoded using spread spectrum encoding which spreads the energy of the data signal over a wide range of audible frequencies. This reduces the noticeability of the data signal within the audio track to a listener. Using spread spectrum encoding also makes eavesdropping on the data transmitted via the acoustic data channel more difficult.

According to a further aspect of the invention, there is provided an acoustic position detection system in which the position of a cellular communications apparatus is determined by processing acoustics signals which are either received by or transmitted from the cellular communications apparatus.

Exemplary embodiments of the invention will now be described with reference to the accompanying drawings, in which:

FIG. 1 schematically shows a signalling system for communicating a data signal to a cellular phone via the audio track of a television signal and for downloading information from the internet to the cellular phone in accordance with the data signal;

FIG. 2 schematically shows an encoder which forms part of the signalling system illustrated in FIG. 1;

FIG. 3 is a plot comparing the power spectrum of a typical audio track of a television signal with that of a modulated data signal with and without spread spectrum encoding;

FIG. 4 schematically shows a shaping unit which forms part of the encoder illustrated in FIG. 2;

FIG. 5 is a plot of a power spectrum corresponding to the sensitivity of a human ear with and without the presence of a narrowband tone;

FIG. 6 schematically shows a cellular phone which forms part of the signalling system illustrated in FIG. 1;

FIG. 7A is a schematic block diagram showing the functional configuration of a processor which forms part of the cellular phone illustrated in FIG. 6 when receiving and processing a data signal;

Figure 1:
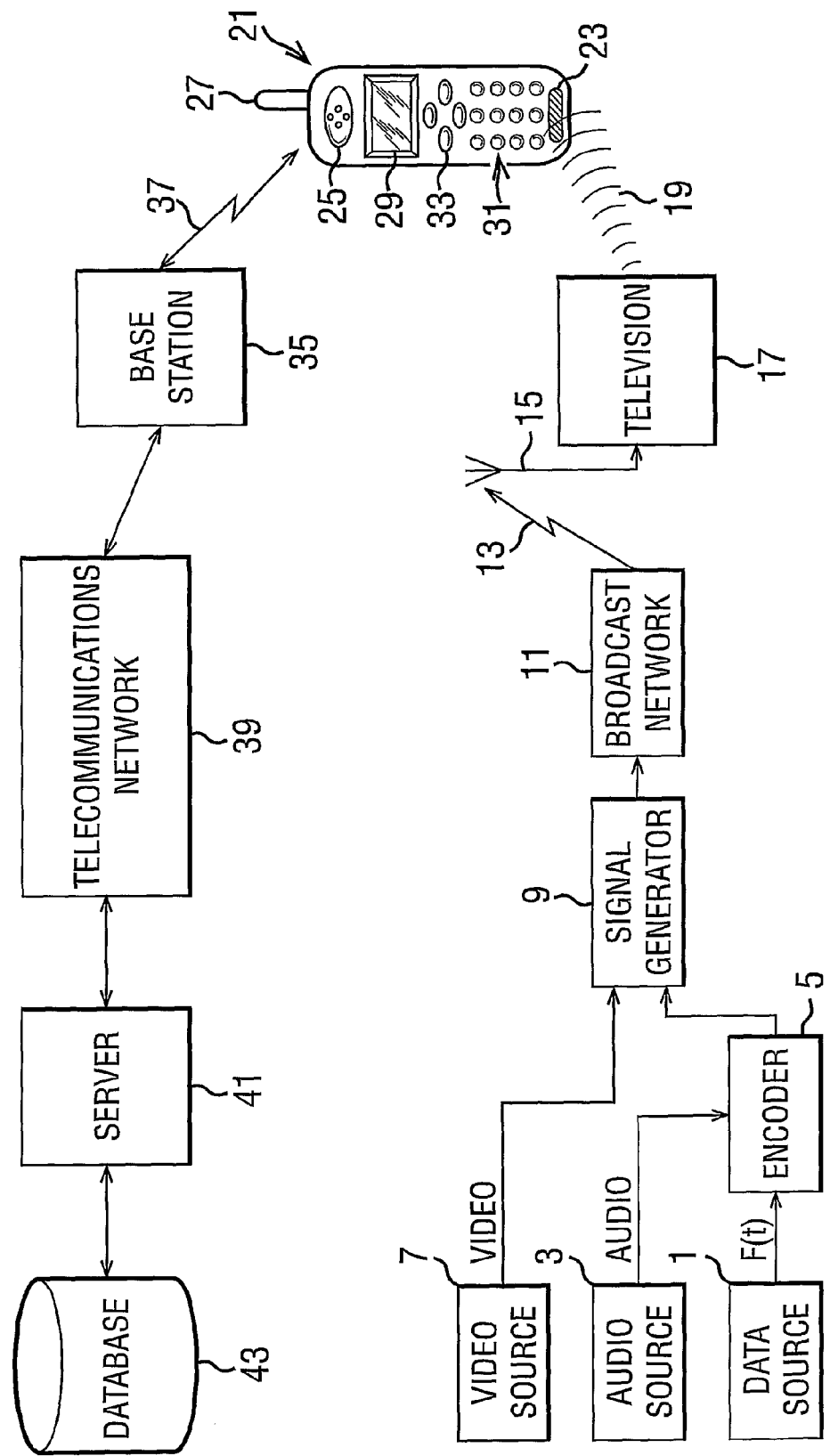
Figure 2:
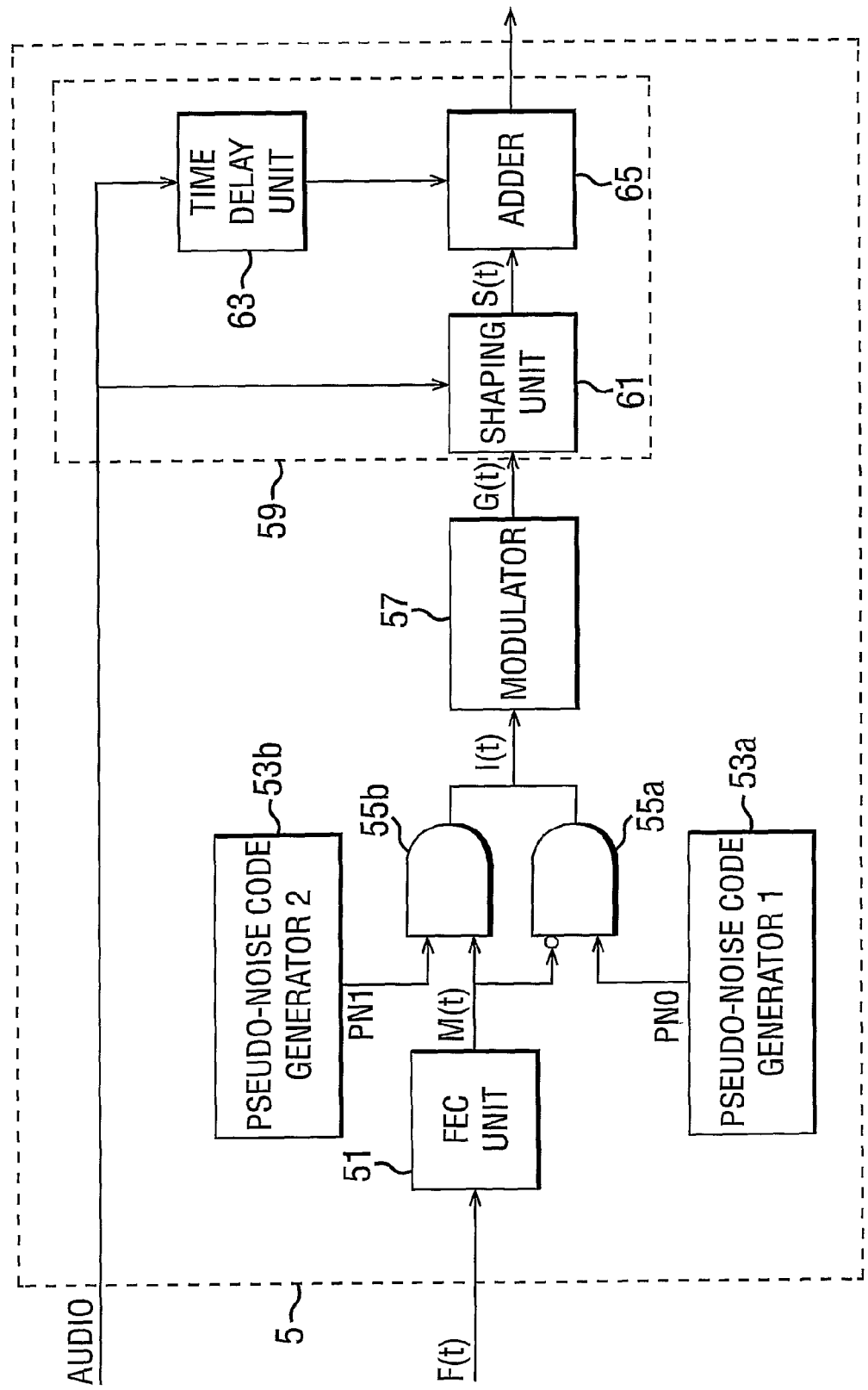
Figure 8:
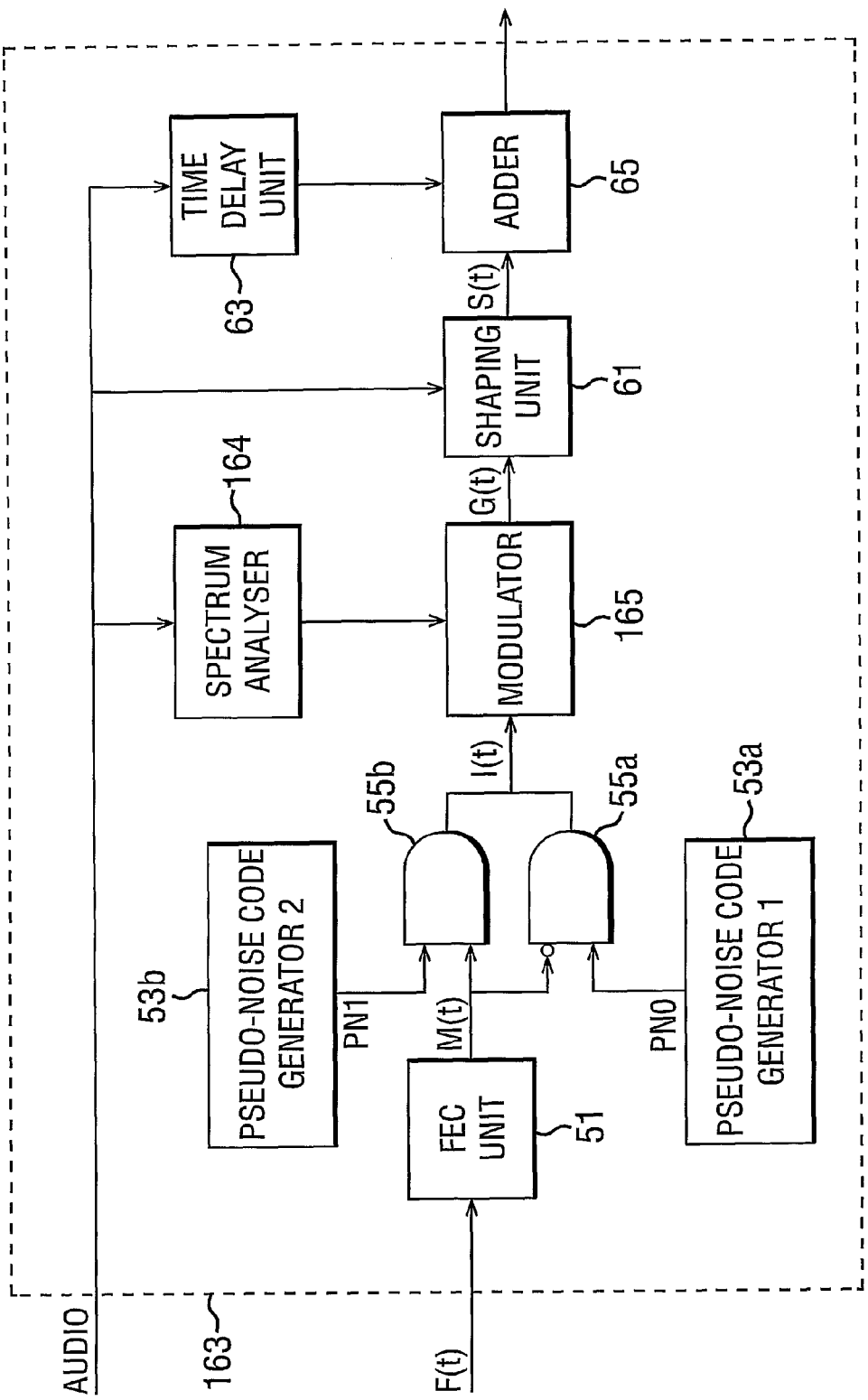
Figure 9:
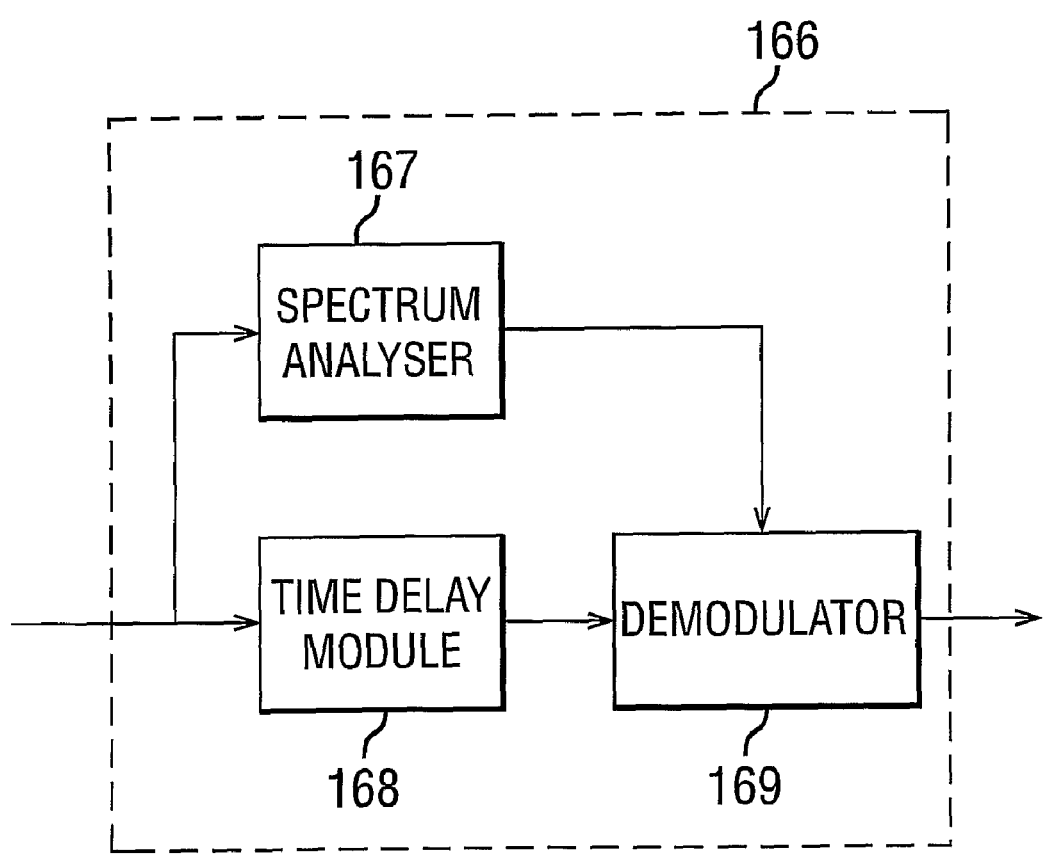
Figure 10:
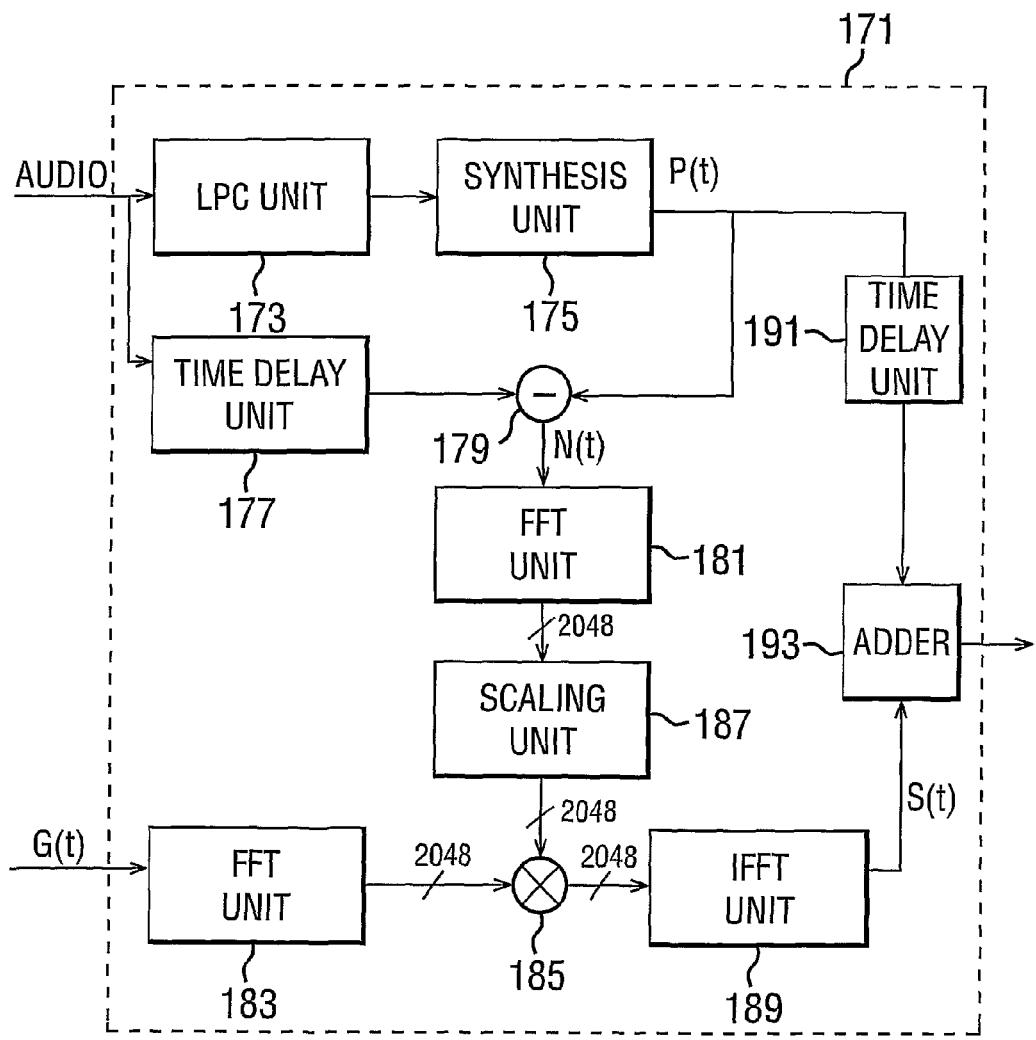
Figure 11A:
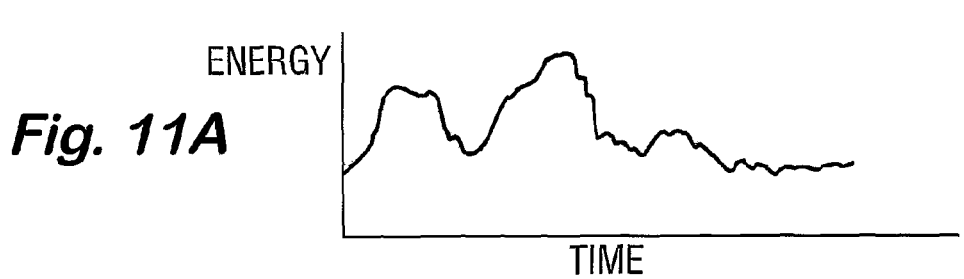
Figure 11B:
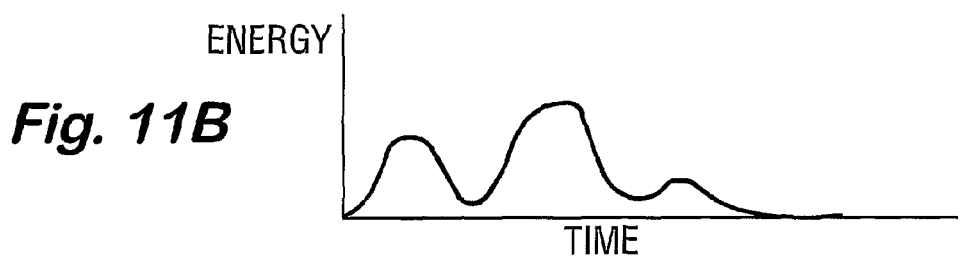
Figure 11C:
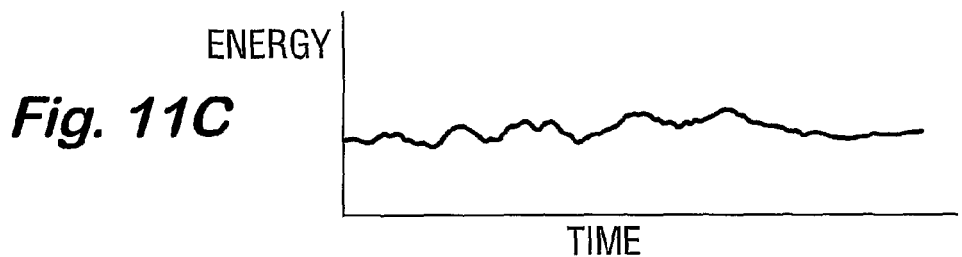
Figure 11D:
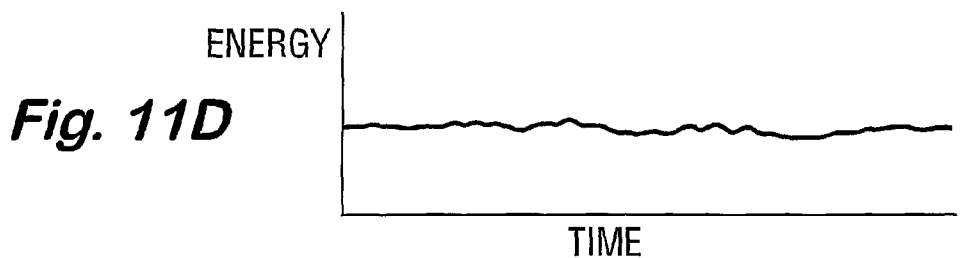
Figure 11E:
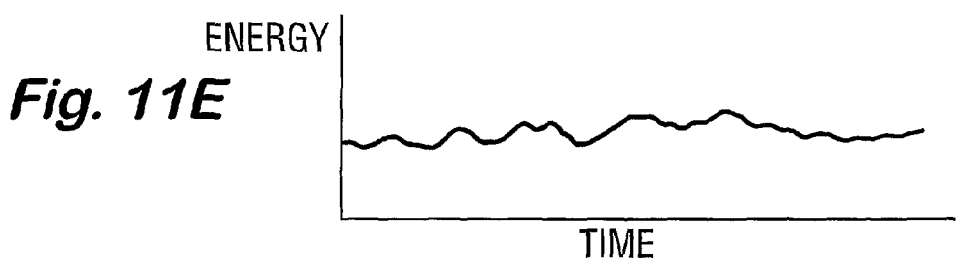
Figure 11F:
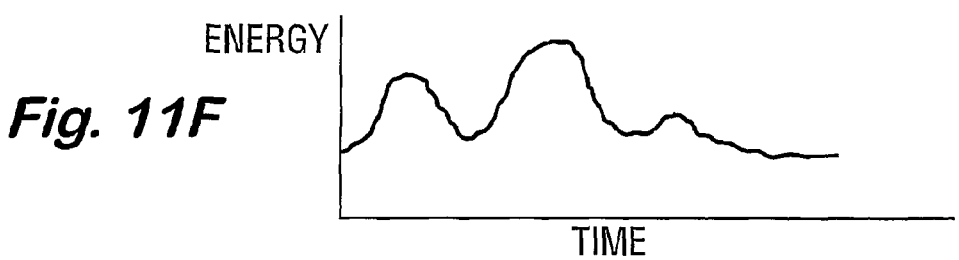
Figure 13:
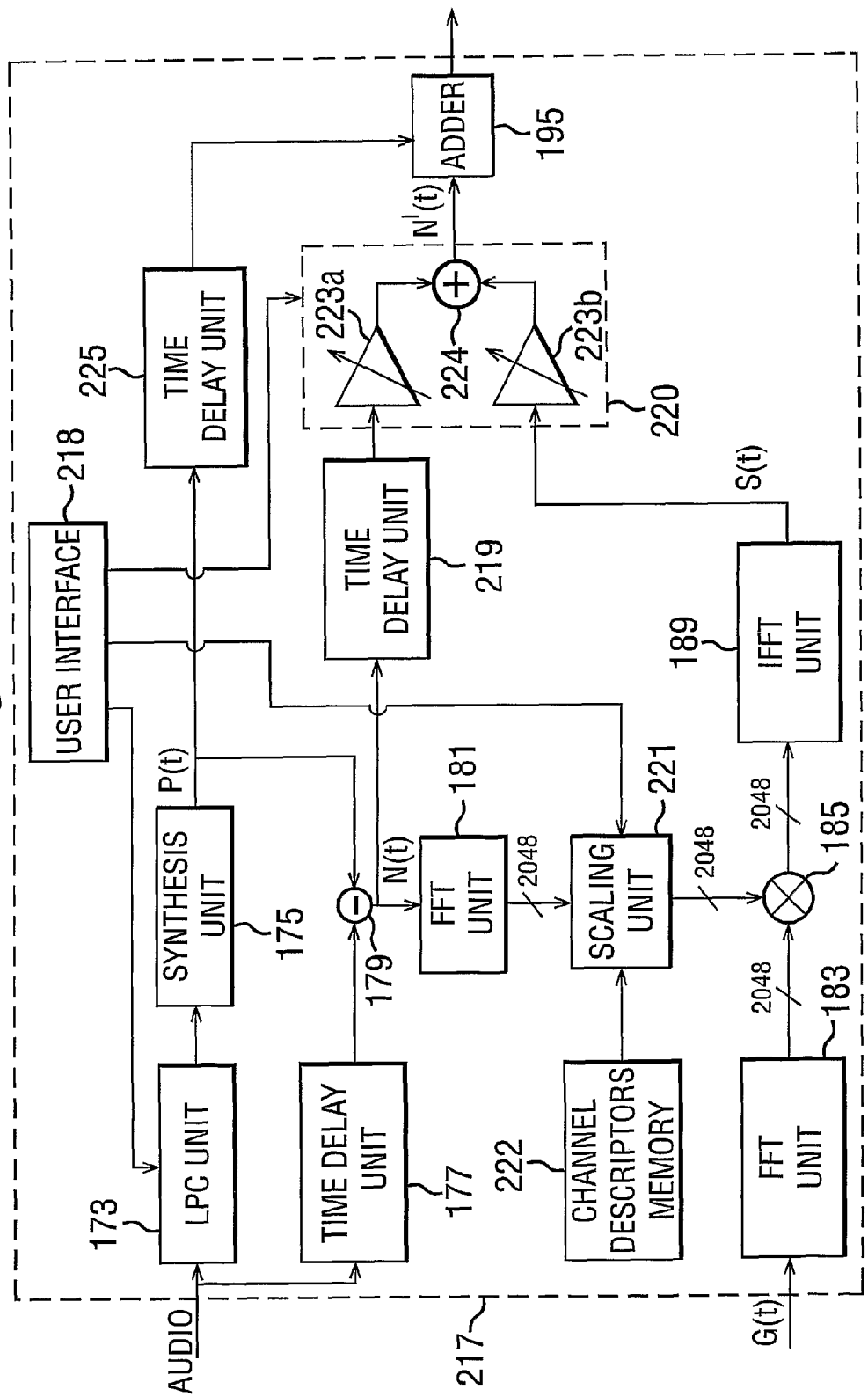
Figure 14:
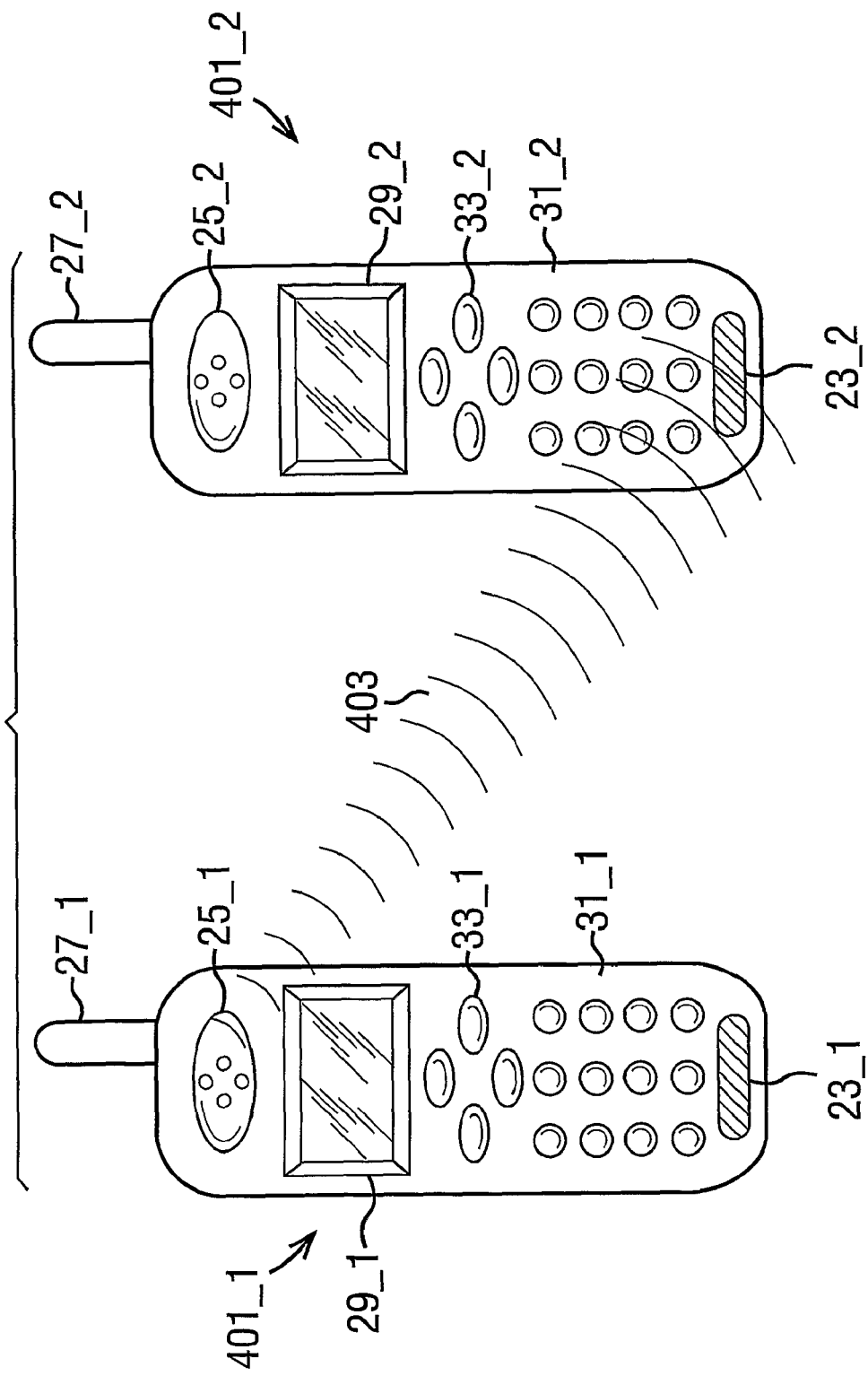
Figure 15:
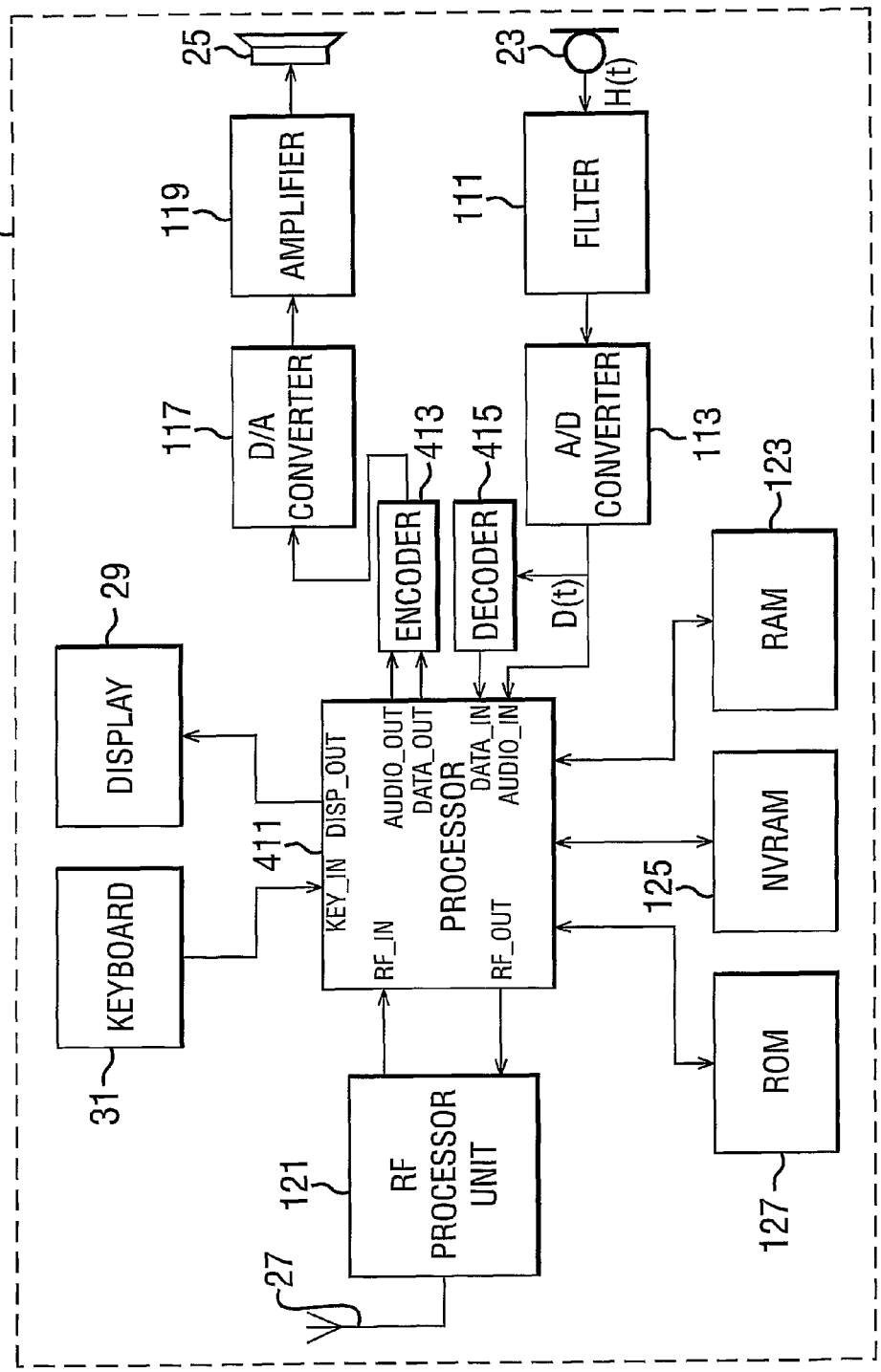
Figure 16:
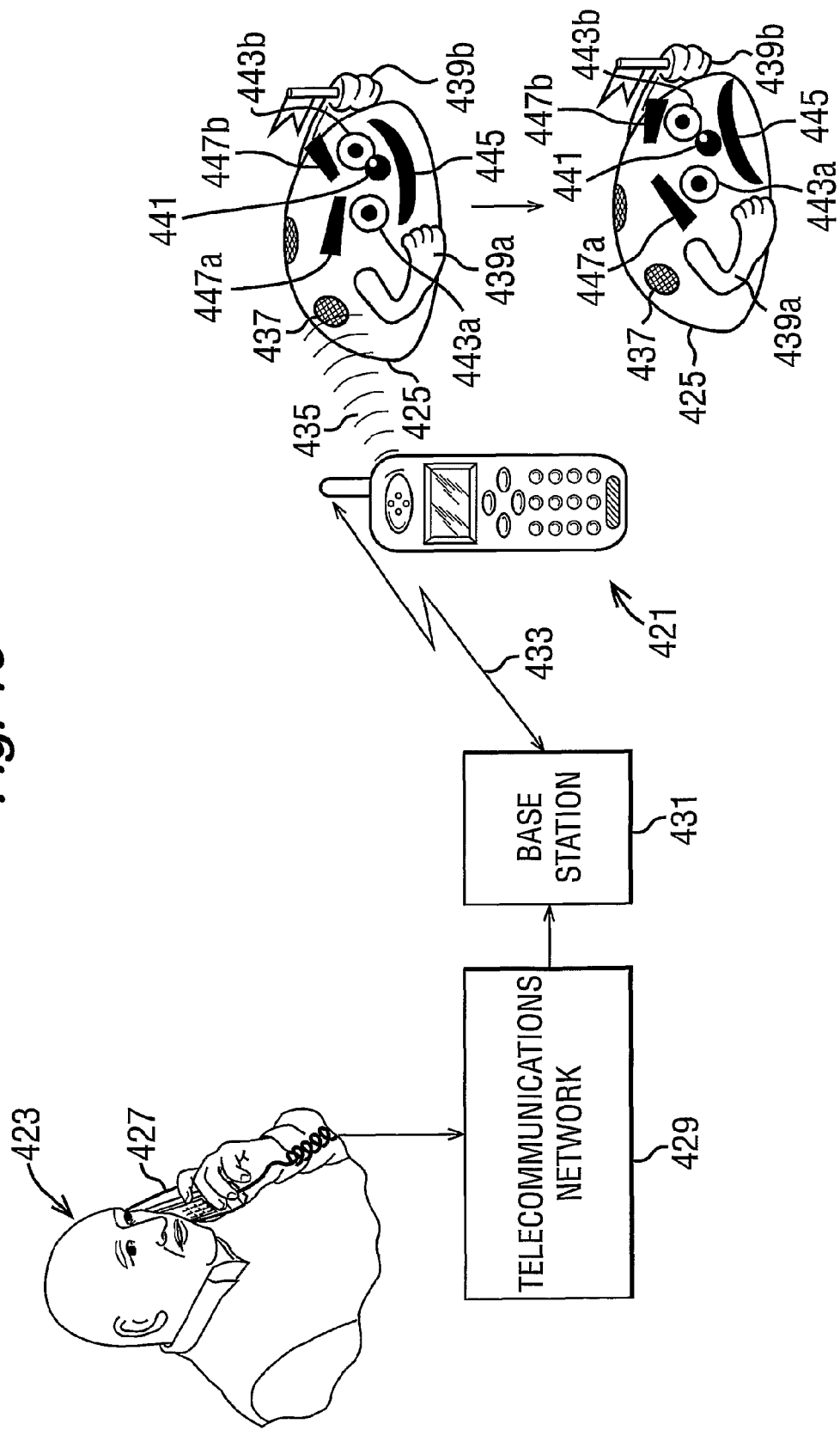
Figure 17:
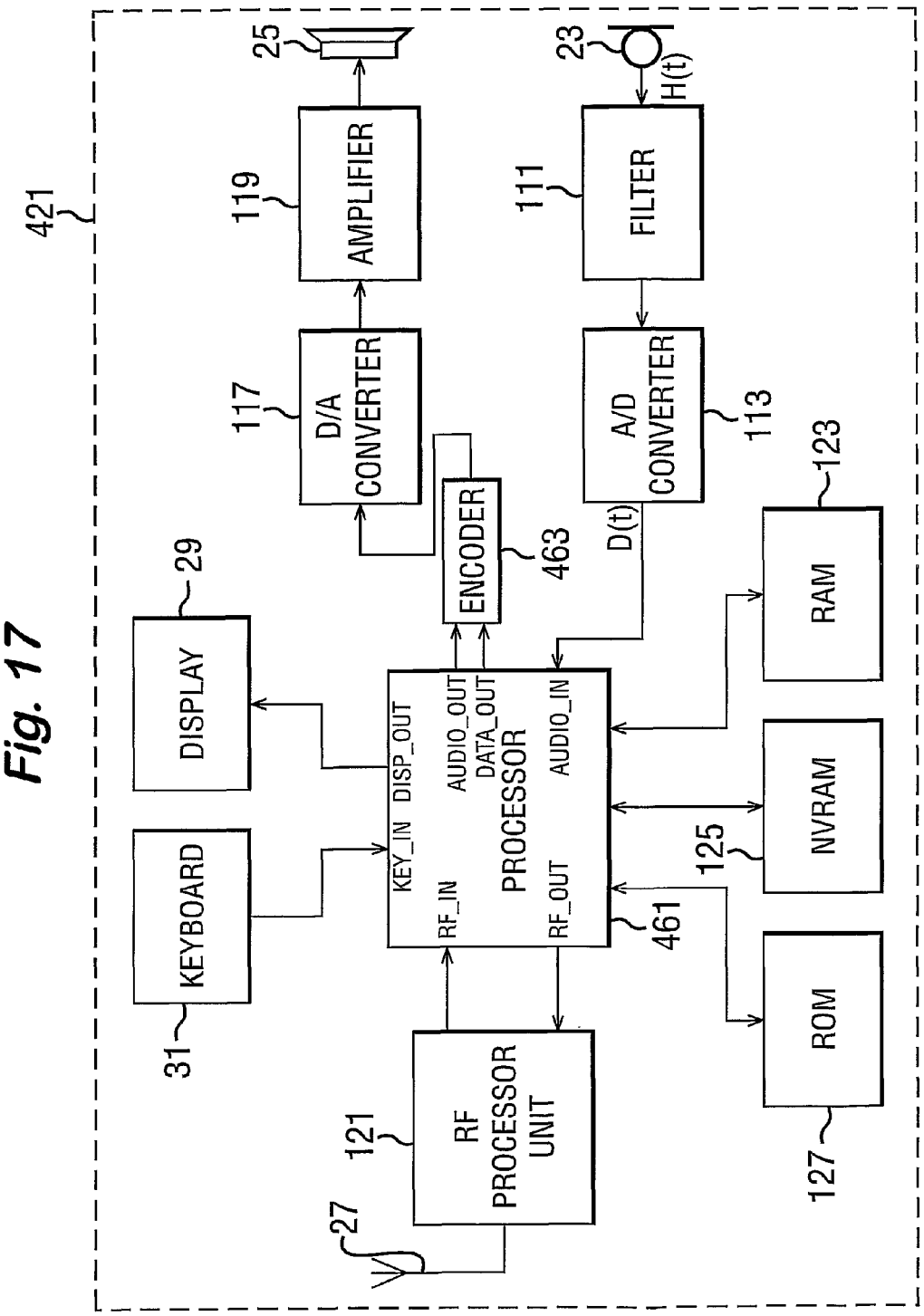
Figure 18:
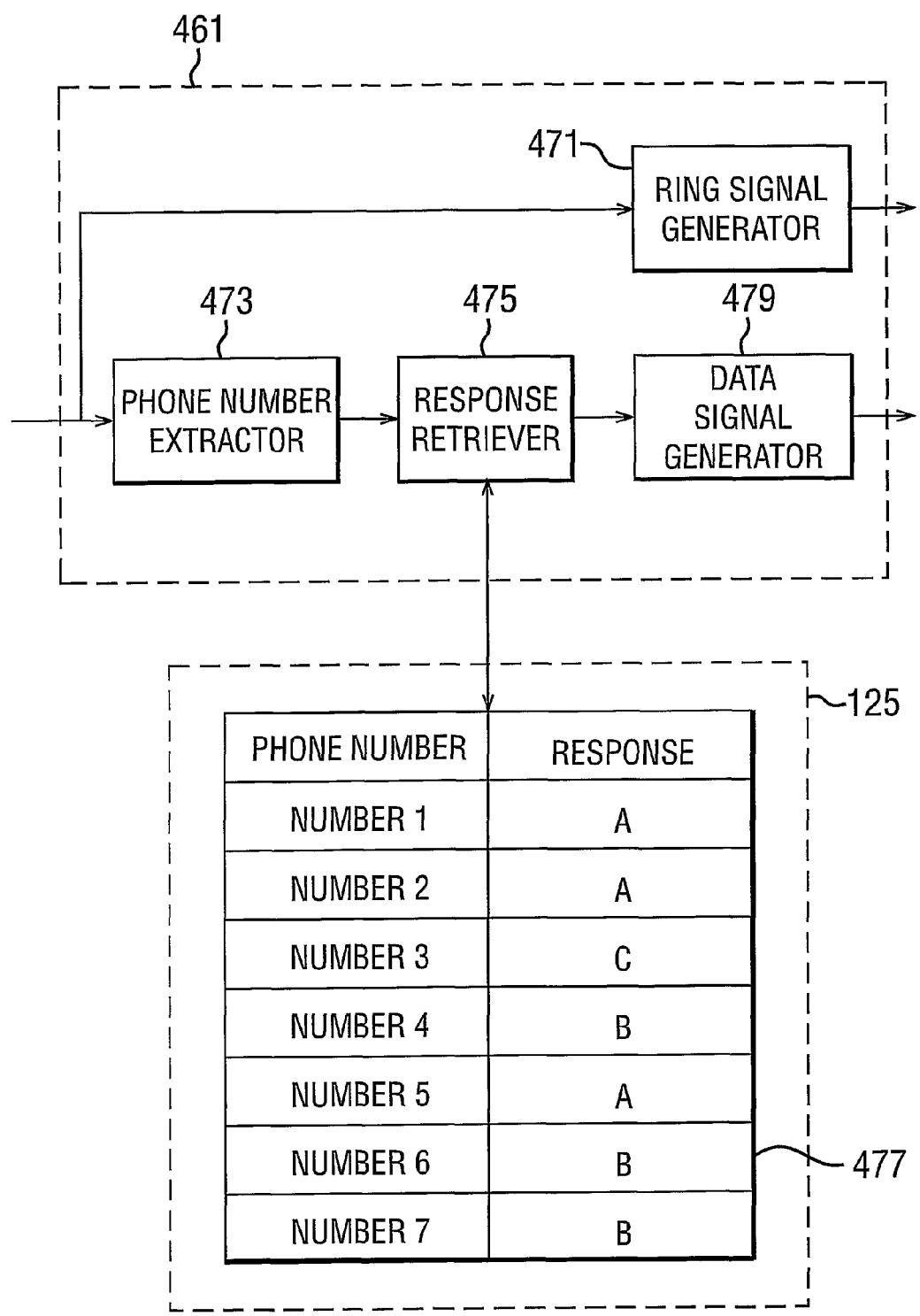
Figure 19:
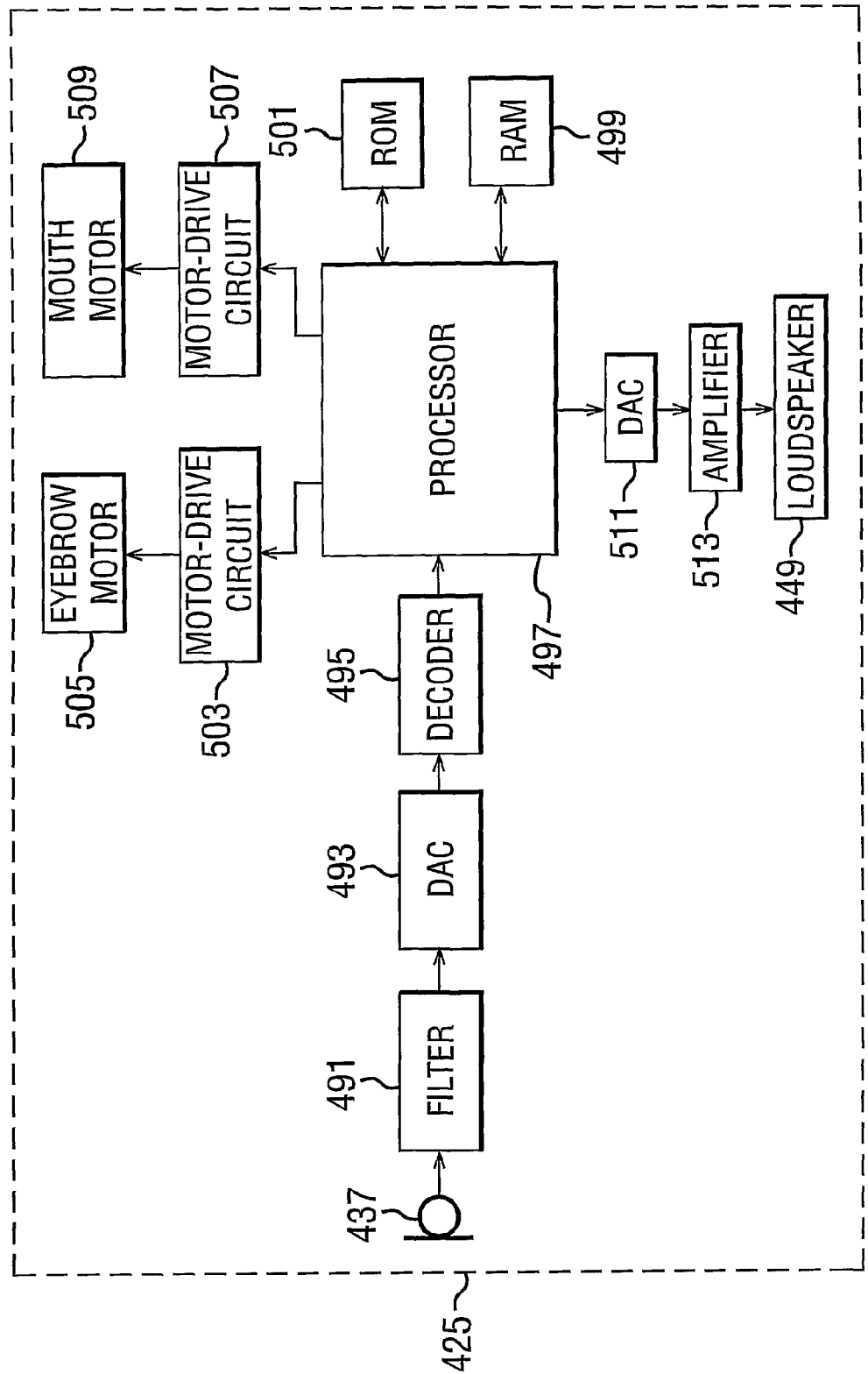
Figure 20:
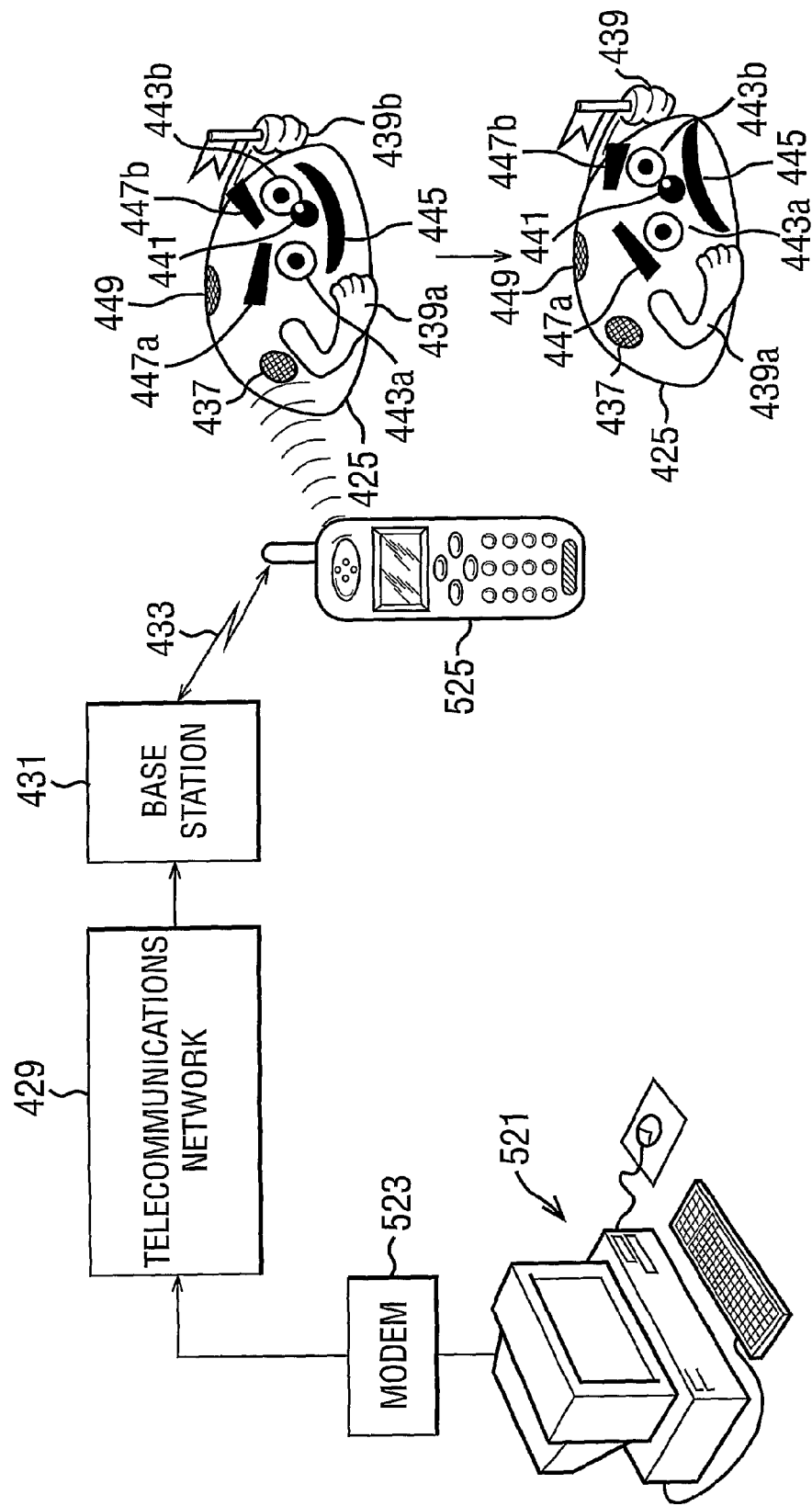
Figure 21:
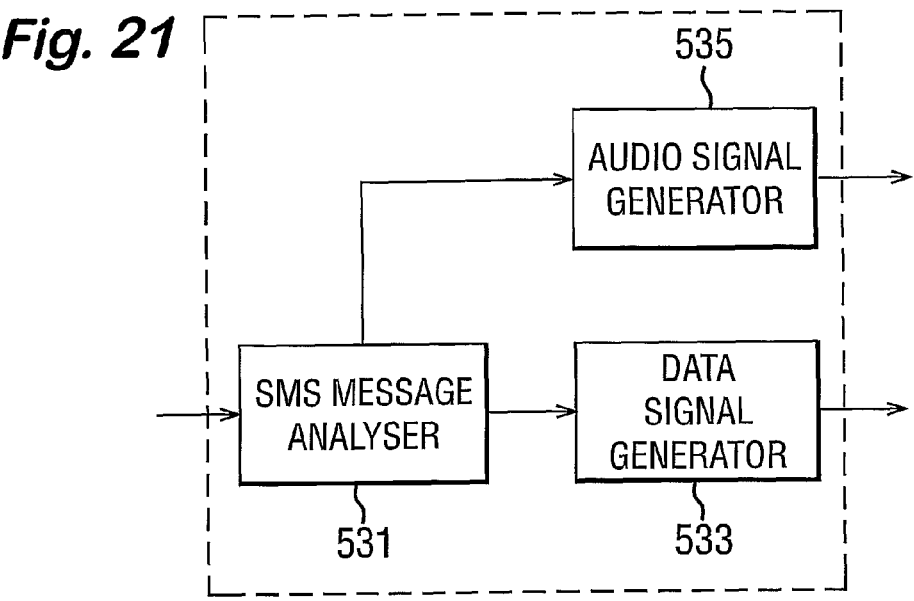
Figure 22:
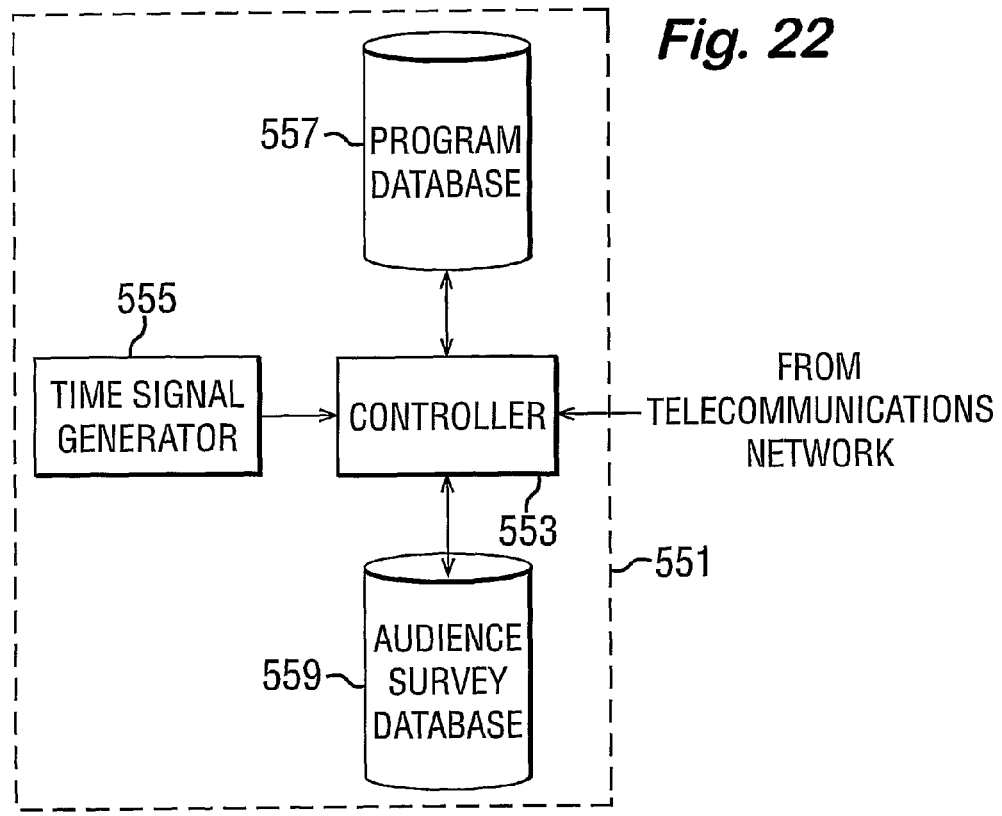
Figure 23:
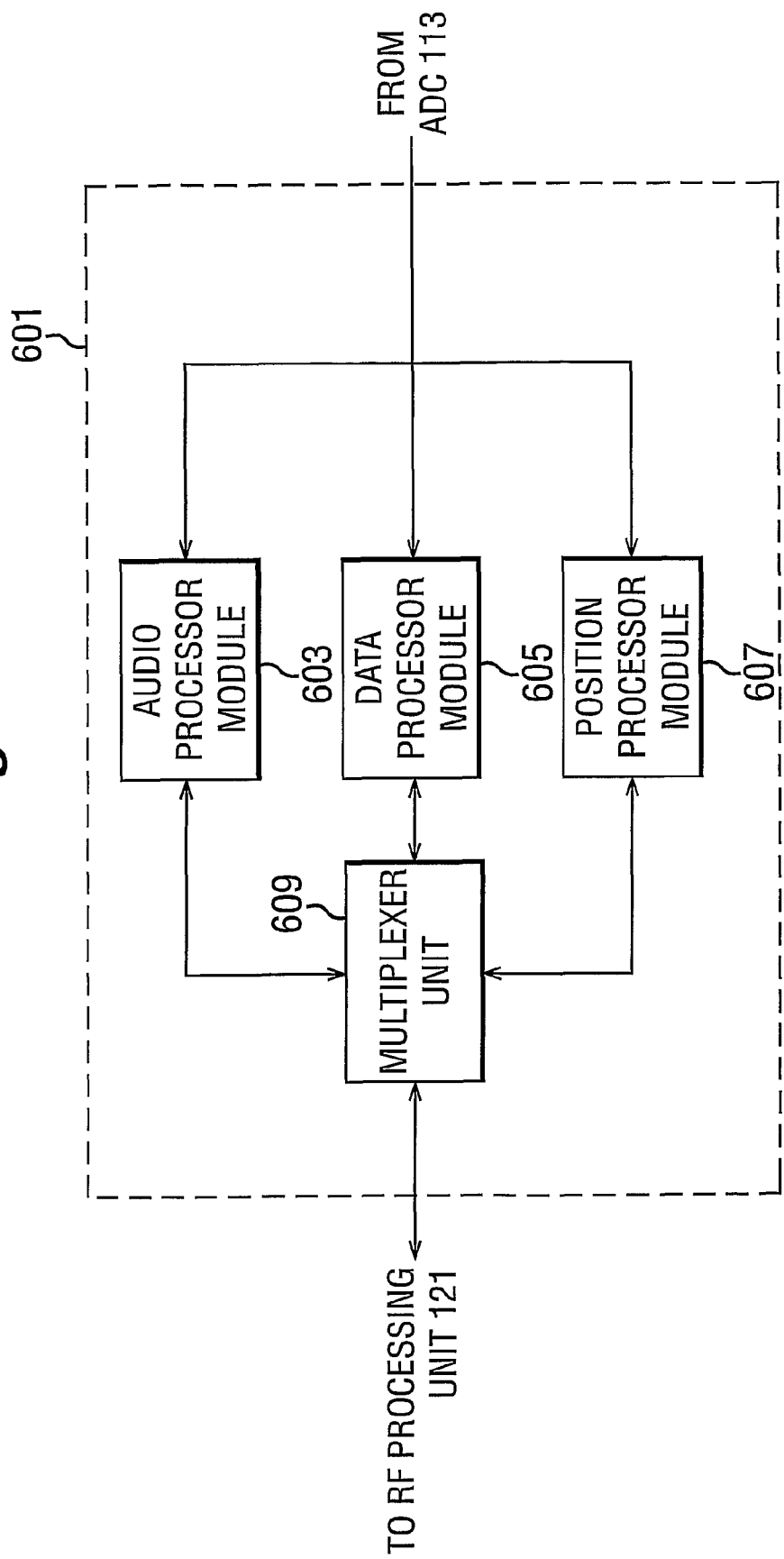
Figure 24:
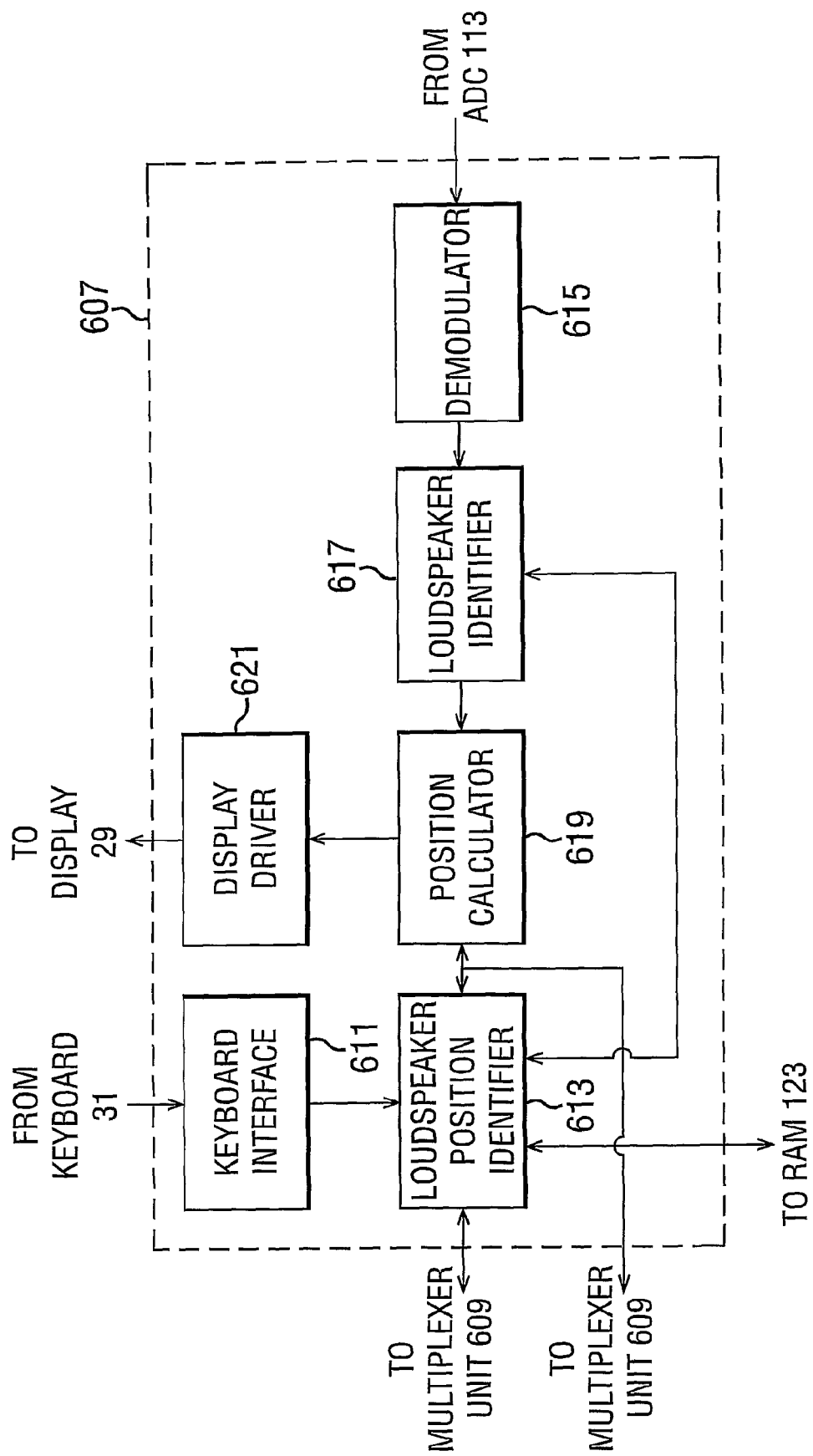
Figure 25:
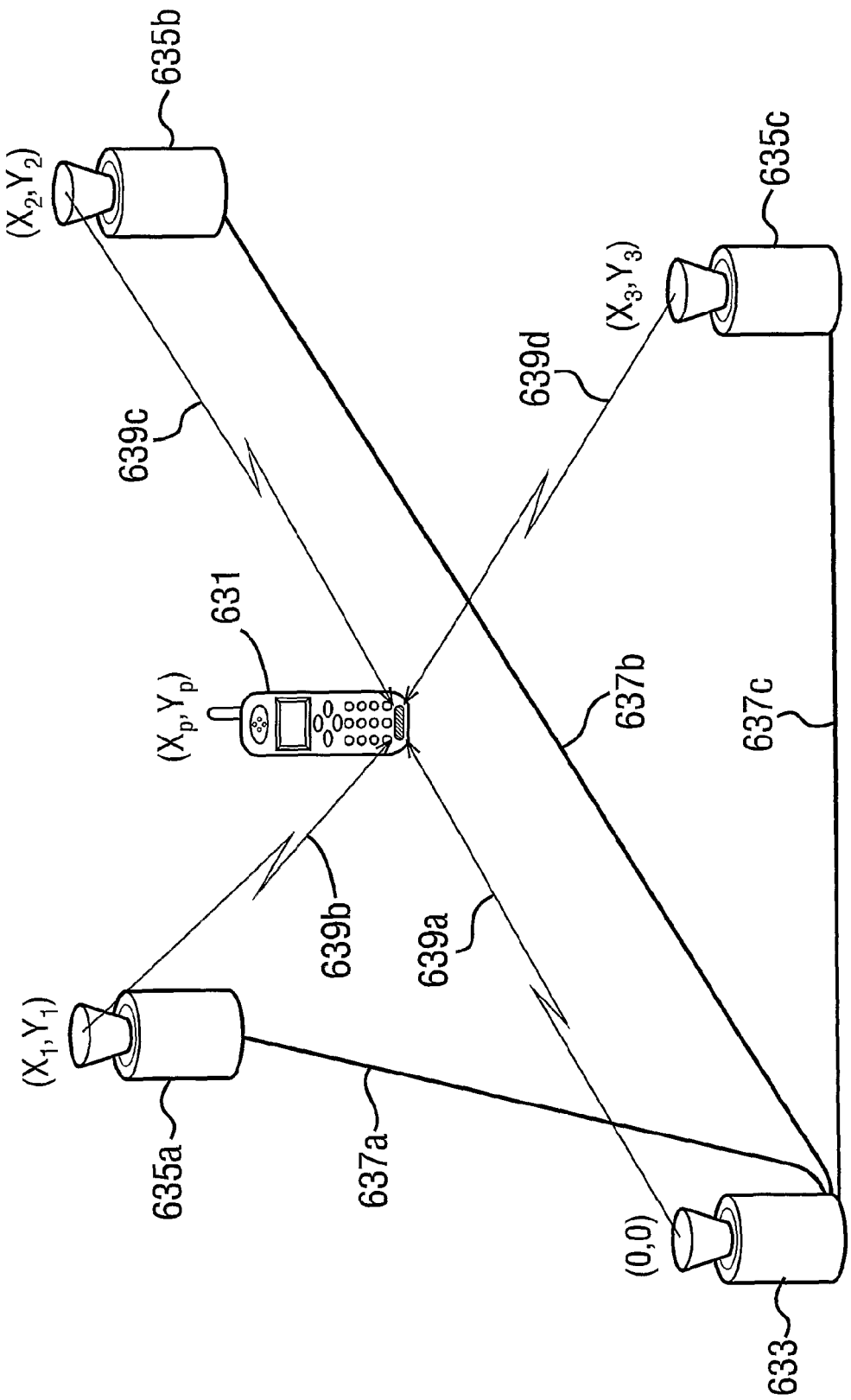
Figure 26:
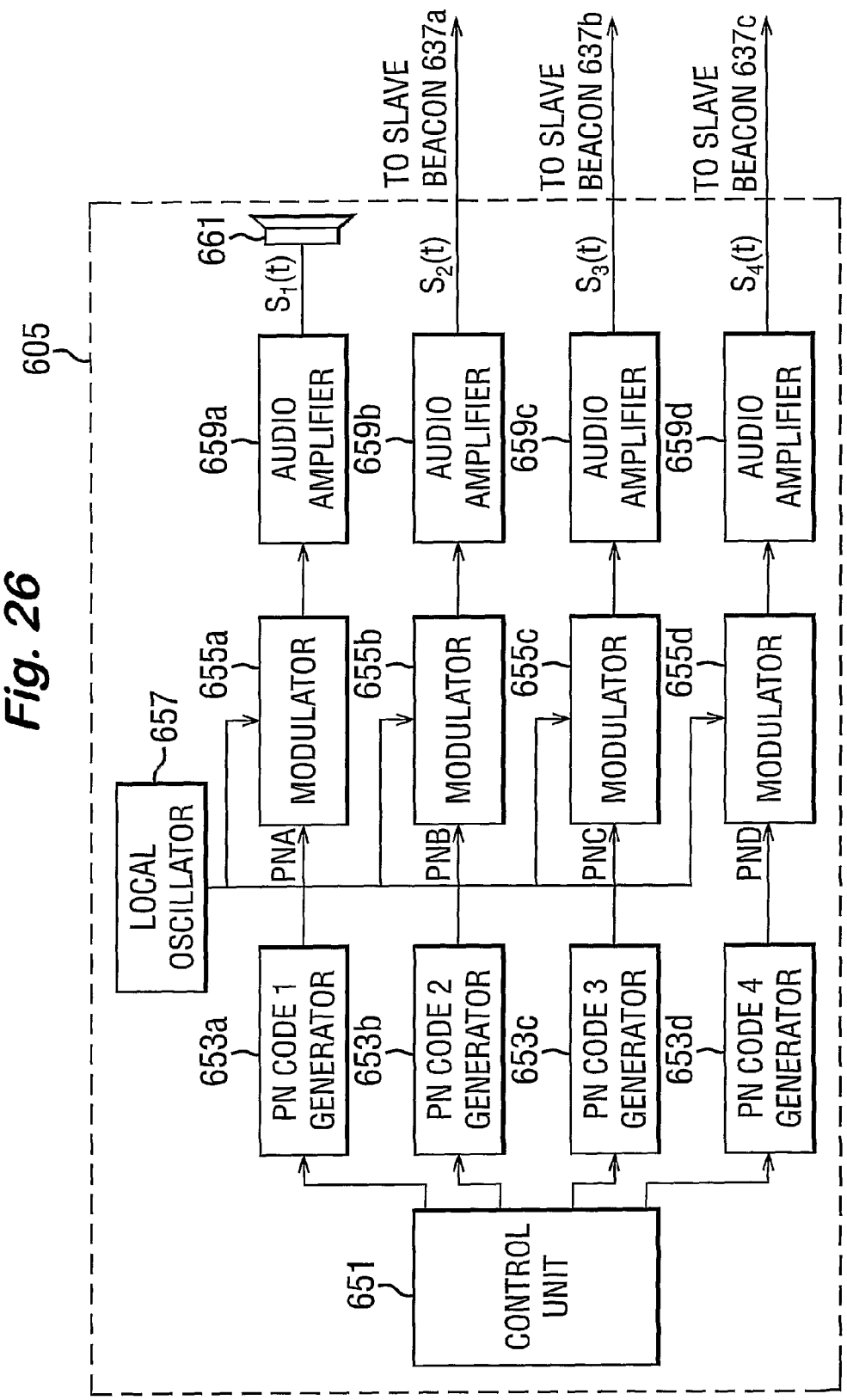
Figure 27:
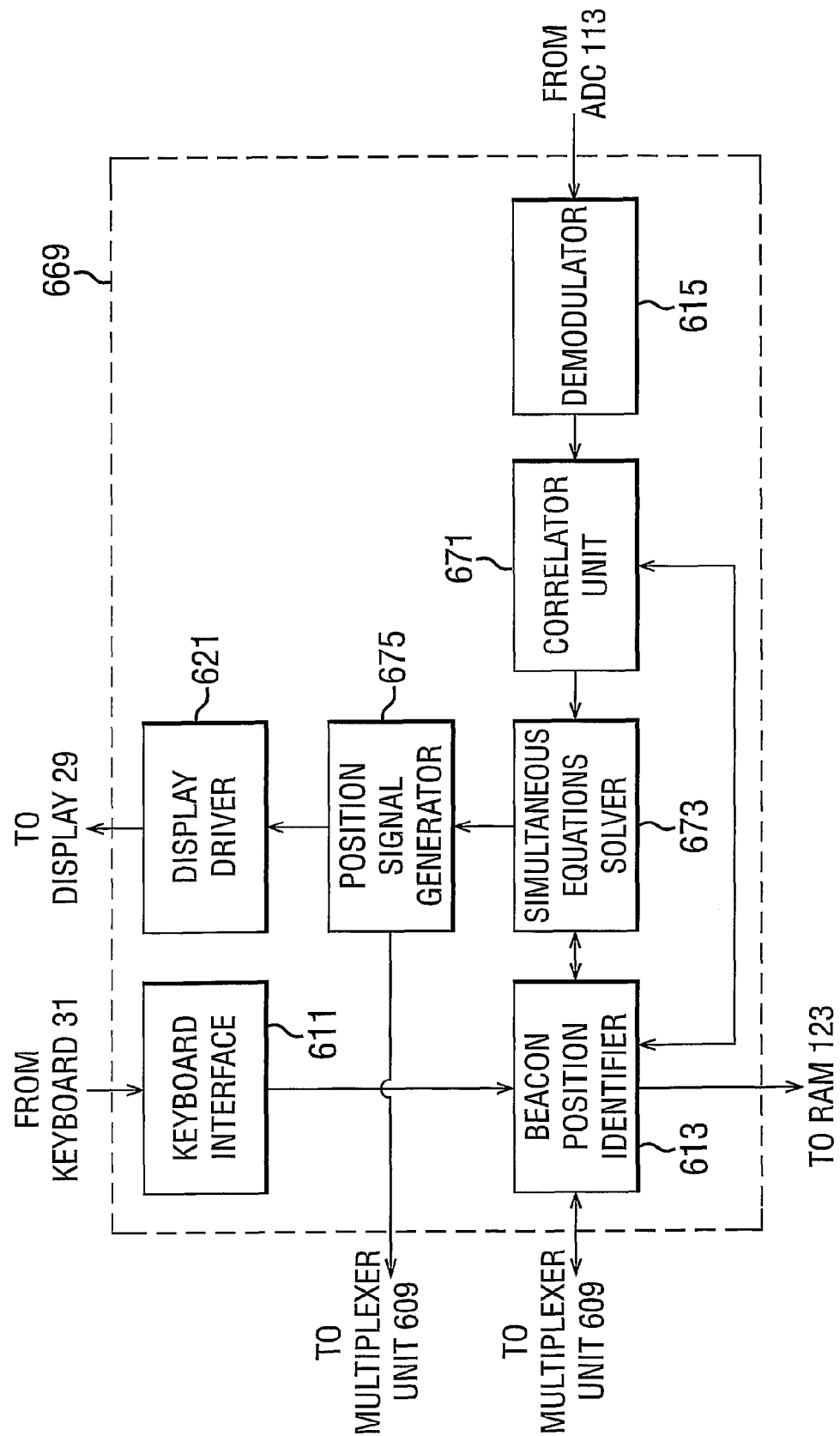
Figure 28:
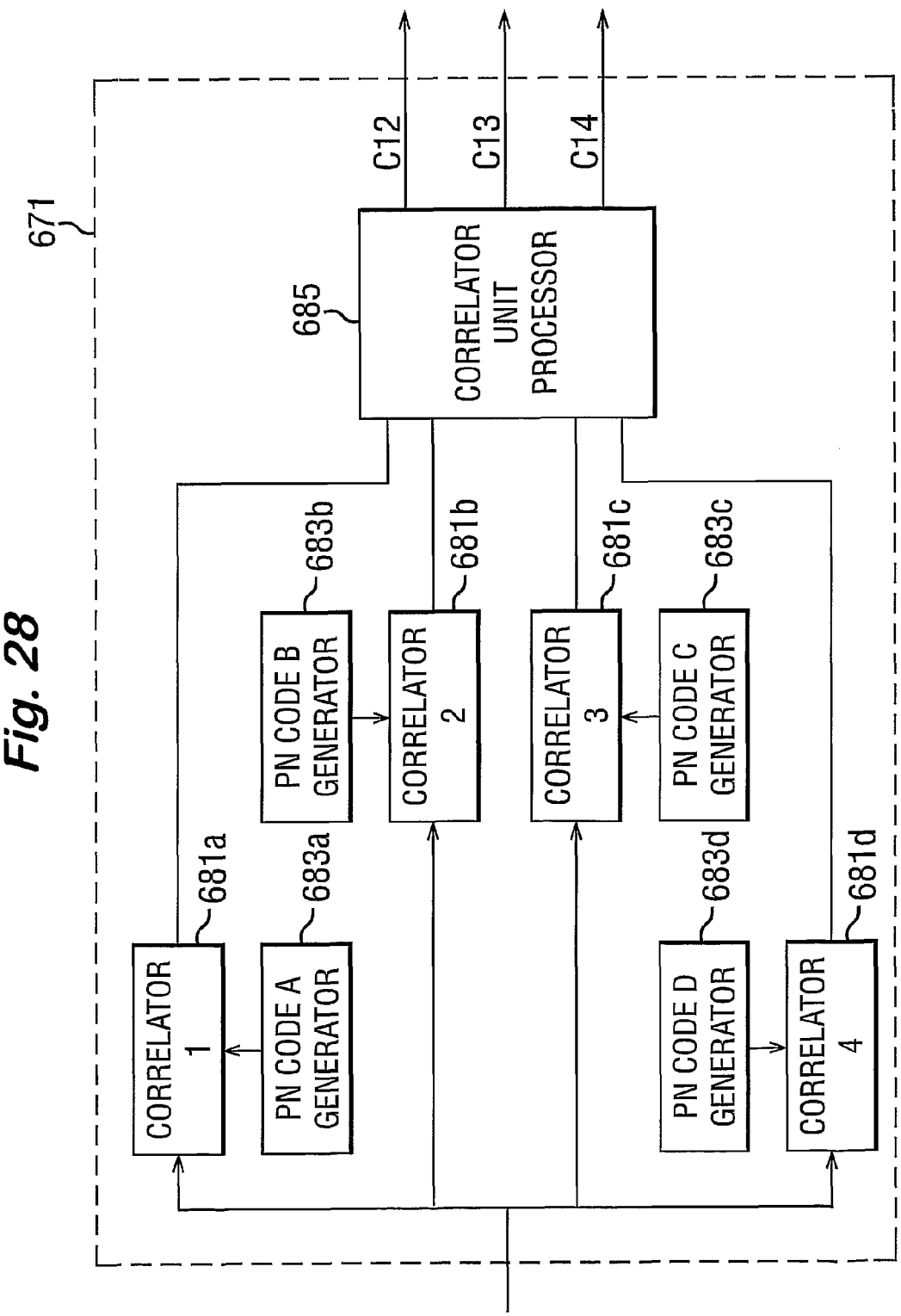

FIG. 8 schematically shows a first alternative encoder to the encoder illustrated in FIG. 2;

FIG. 9 is a schematic block diagram showing the functional configuration of a processor of a first alternative cellular phone to the cellular phone illustrated in FIG. 6 when demodulating a signal encoded by the first alternative encoder illustrated in FIG. 8;

FIG. 10 schematically shows an audio mixer of a second alternative encoder to the encoder illustrated in FIG. 2;

FIG. 11A is a timing diagram illustrating a typical audio track;

FIG. 11B is a timing diagram illustrating the predictable portion of the audio track illustrated in FIG. 11A;

FIG. 11C is a timing diagram showing the non-predictable portion of the audio track illustrated in FIG. 11A;

FIG. 11D is a timing diagram showing a spread spectrum data signal;

FIG. 11E is a timing diagram showing the spread spectrum data signal illustrated in FIG. 11D after it has been shaped to approximate the non-predictable portion of the audio track as illustrated in FIG. 11C;

FIG. 11F is a timing diagram showing a modified audio track obtained by combining the predictable portion of the audio track as illustrated in FIG. 11B with the shaped spread spectrum signal as shown in FIG. 11E;

FIG. 12 schematically shows an audio mixer for a third alternative encoder to the encoder illustrated in FIG. 2;

FIG. 13 schematically shows an audio mixer for a fourth alternative encoder to the encoder illustrated in FIG. 2;

FIG. 14 schematically shows a first alternative signalling system in which data is communicated between two cellular phones via acoustic signals;

FIG. 15 is a block diagram showing in more detail a cellular phone of the first alternative signalling system illustrated in FIG. 14;

FIG. 16 schematically shows a second alternative signalling system in which a cellular phone encodes a control signal, which varies in accordance with the telephone number of a caller, within a ring signal and a toy detects the ring signal and responds in accordance with the control signal;

FIG. 17 schematically shows a cellular phone which forms part of the second alternative signalling system illustrated in FIG. 16;

FIG. 18 is schematic block diagram showing the functional configuration of a processor of the cellular phone illustrated in FIG. 17 when receiving an incoming call;

FIG. 19 schematically shows a toy which forms part of the second alternative signalling system illustrated in FIG. 16;

FIG. 20 schematically shows a third alternative signalling system in which a data signal is conveyed between a computer and a toy via an acoustic signal emitted by a cellular telephone;

FIG. 21 is a schematic block diagram showing the functional configuration of a processor of a cellular phone for the third alternative signalling system illustrated in FIG. 20 when processing a received control signal;

FIG. 22 schematically shows a first alternative server for the signalling system illustrated in FIG. 1;

FIG. 23 is a schematic block diagram showing the functional configuration of a processor of a cellular phone which forms part of a position determining system;

FIG. 24 is a schematic block diagram showing the functional configuration of a position processor module executed by the processor illustrated in FIG. 23;

FIG. 25 is a schematic diagram of a first alternative position detection system;

FIG. 26 schematically shows electrical circuitry of a master beacon in the first alternative position detection system illustrated in FIG. 25;

FIG. 27 is a schematic block diagram showing the functional configuration of a processor of a cellular phone which forms part of the first alternative position detection system illustrated in FIG. 25; and FIG. 28 is a schematic block diagram showing the functional configuration of a correlator unit executed by the processor illustrated in FIG. 27.

FIG. 1 schematically illustrates a first embodiment of the invention in which a data signal F(t), generated by a data source 1, is encoded within an audio track from an audio source 3 by an encoder 5 to form a modified audio track for a television program. In this embodiment, the data signal F(t) conveys a Uniform Resource Locator (URL) identifying a web page, accessible via the Internet, associated with the television program. The modified audio track output by the encoder 5 is then combined with the corresponding video track, from a video source 7, by a signal generator 9 to form a television signal conveying the television program. In this embodiment the data source 1, the audio source 3, the video source 7 and the encoder 5 are all located in a television studio and the television signal is broadcast by a conventional broadcast network 11 using a radio frequency (RF) signal 13.

The RF signal 13 is detected by a television aerial 15 which directs the television signal to a conventional television 17. The television 17 has a display (not shown) for showing the video track and a loudspeaker (not shown) for outputting the modified audio track as an acoustic signal 19.

In this embodiment, a cellular phone 21 (sometimes referred to as a mobile phone) detects the acoustic signal 19 emitted by the television 17 using a microphone 23 which converts the detected acoustic signal into a corresponding electrical signal. The cellular phone 21 then decodes the electrical signal to recover the data signal F(t). The cellular phone 21 also has conventional components such as a loudspeaker 25, an antenna 27 for communicating with a cellular telecommunications network, a display 29, a keypad 31 for entering numbers and letters, and menu keys 33 for accessing menu options.

In this embodiment, the cellular phone 21 is able to access the Internet using the Wireless Application Protocol (WAP). After the data signal F(t) has been recovered by the cellular phone 21, in response to a user requesting further information about the television program being shown by the television 17 by selecting a menu option using the menu buttons 33, the cellular phone 21 transmits to a base station 35, via RF signals 37, a request to download the web page corresponding to the URL conveyed by the data signal F(t). The base station 35 forwards the request, via a telecommunications network 39, to the server 41 identified in the URL conveyed by the data signal F(t). The server 41 retrieves from a database 43 the requested web page and transmits the requested web page to the cellular phone 21 via the telecommunications network 39 and the base station 35. The user is then able to read the web page on the display 29 and, for example, access further web pages referenced in the requested web page or make a transaction to buy a product associated with the television program.

As those skilled in the art will appreciate, an advantageous feature of the above-described signalling system is that conventional television broadcast networks, televisions, cellular communications networks and web pages can be used, although a novel encoder 5 and a novel cellular phone 21 are required.

FIG. 2 shows in more detail the main components of the encoder 5 of the first embodiment. The data signal F(t) is input to a forward error correction (FEC) unit 51 which separates the data signal F(t) into blocks of 7 data bits and encodes each block of seven data bits using a (15,7) block code, in particular a BCH (Bose, Chaudhuri and Hocquenghem) code, to form a block of 15 data bits. Those skilled in the art will appreciate that the extra bits added by the BCH code enable errors in transmission to be detected and corrected. In this embodiment, the FEC unit 51 also adds a synchronisation bit (hereafter referred to as the SYNC bit) having a value of "0" at the beginning of each block of 15 data bits to generate a modified data signal M(t) formed by 16-bit frames of data. In this embodiment, the modified data signal M(t) is a logic signal which is generated at approximately 7.8 bits per second.

An advantageous feature of the first embodiment is that a spread spectrum encoding technique is used to spread the energy of the modified data signal M(t) over a wide range of frequencies. This has the effect of making the data signal less noticeable in the acoustic signal 19 emitted by the television 17. In particular, if the modified data signal M(t) is directly combined with the audio track without such coding, then it is more likely to be heard by a viewer of the television 17.

In this embodiment, direct sequence spread spectrum (DSSS) encoding is used to spread the energy of the data signal over a wide band of frequencies. In order to perform the DSSS encoding, a first pseudo-noise code generator 53a is used to generate a pseudo-noise code PN0 and a second pseudo-noise code generator 53b is used to generate a pseudo-noise code PN1. As those skilled in the art of telecommunications will appreciate, pseudo-noise codes are binary codes which appear to be completely random in nature, but which are in fact deterministic, i.e. they can be reproduced. In particular, these codes are generated by exclusive-OR (XOR) feedback from synchronously clocked registers. By continually clocking the registers, the pseudo-noise code is cyclically reproduced. The number of registers, the registers used in the feedback path and the initialisation state of the registers determines the length of the code and the specific code produced.

In this embodiment, the pseudo-noise code generators 53 have 12 registers and generate pseudo-noise codes having 4095 bits (which will hereinafter be referred to as chips using the standard nomenclature in the art to distinguish the bits of the pseudo-noise code from the bits of the data signal to be spread) in a stream with no sequence of more than 12 chips repeated in the 4095 chips. Such a pseudo-noise code is conventionally referred to as a 12-bit code after the number of registers used to generate it. At the end of each stream of 4095 chips a binary 0 is added to make the total length of the stream 4096 chips. In this embodiment, the pseudo-noise codes PN0 and PN1 are orthogonal to each other and therefore if they are sequentially input chip by chip into respective inputs of an XOR gate then another pseudo-noise sequence is output by the XOR gate.

The output of the first pseudo-noise code generator 53a is connected to a non-inverting input of a first AND gate 55a while the output of the FEC unit 51 is connected to an inverting input of the first AND gate 55a. The output of the FEC unit 51 is also connected to a non-inverting input of a second AND gate 55b and the output of the second pseudo-noise code generator 53b is connected to a non-inverting input of the second AND gate 55b. The outputs of the first and second AND gates 55 are connected together to generate a spread data signal I(t) which corresponds to PN0 when the value of the modified data signal m(t) is 0 and corresponds to pseudo-noise code PN1 when the value of the modified data signal M(t) is 1.

In this embodiment, each pseudo-noise code is generated at a rate of 2000 chips per second so that each data bit is multiplied by a sequence of 256 chips and each data frame is multiplied by 4096 chips. As each data frame corresponds to a complete cycle of the pseudo-noise codes PN0 and PN1, the SYNC bit, which has a data value of "0", is always represented by the same 256 chip sequence of the pseudo-noise code PN0. This allows a decoder to synchronise itself with a received chip sequence more easily.

The logic signal I(t) is input to a modulator 57 which uses phase shift keying to modulate a 2 kHz carrier signal generated by a local oscillator (not shown) in accordance with the value of the logic signal I(t). In particular, the carrier signal is a digital signal having a sample rate of 8 kHz and a 16-bit value per sample. Each chip of the logic signal I(t) therefore modulates a sequence of four samples of the carrier signal. In this embodiment, the modulator 57 includes a re-sampling circuit (not shown) which re-samples the modulated signal at the sampling rate of the audio track, which in this embodiment is 22.05 kHz, to generate a modulated signal G(t).

Figure 3:
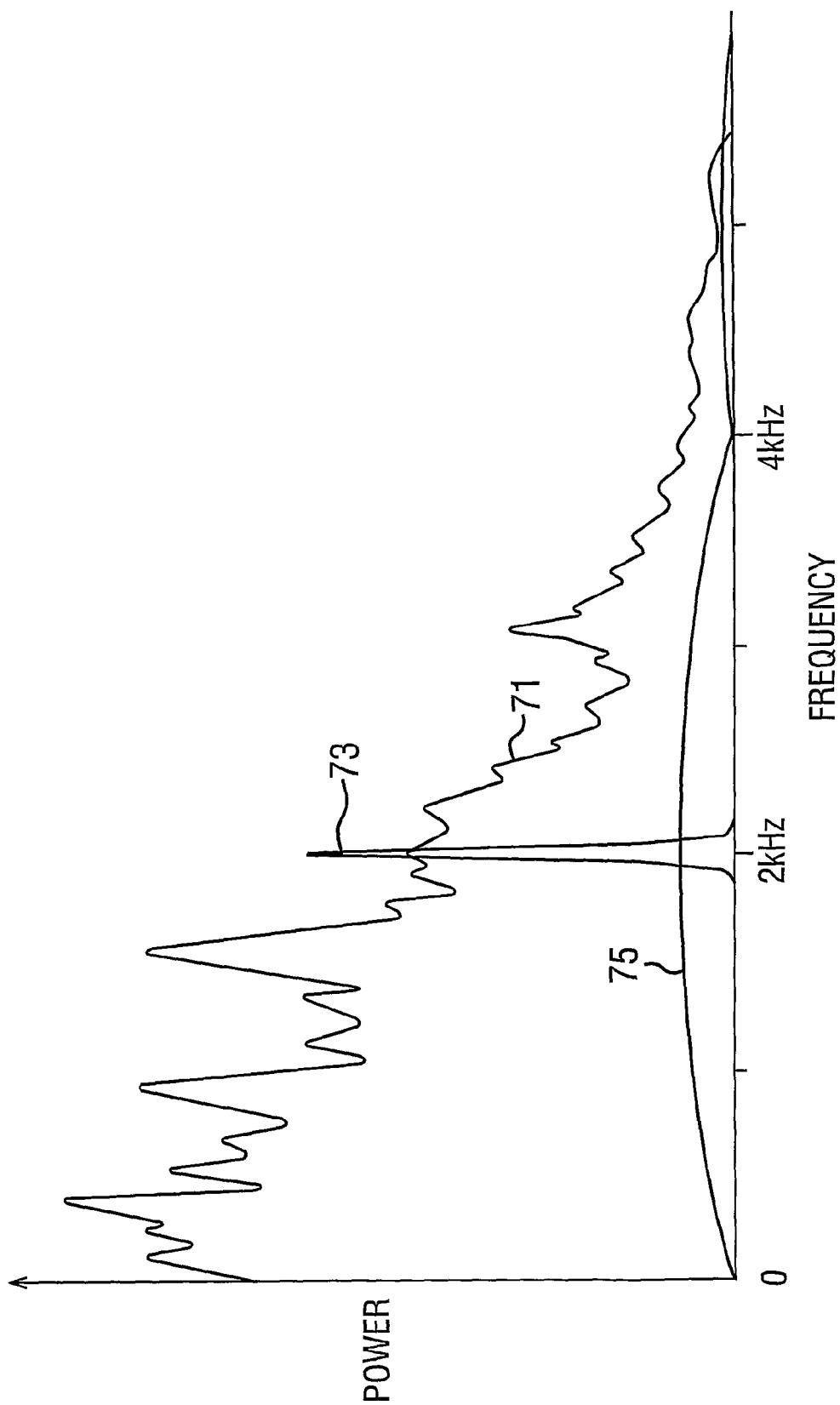

The effect of the spread spectrum encoding is illustrated in FIG. 3 which shows a typical audio signal 71 in the frequency range of 0 to 6 kHz with, as is normally the case, the power being predominantly concentrated at the lower frequencies. FIG. 3 also shows a modulated data signal 73 which would result if no spreading was carried out and the modified data signal M(t) was directly modulated by the modulator 57. As shown, this modulated data signal 73 is a narrow band signal centred at approximately 2 kHz and having a peak power significantly above the power level of the audio signal 71 at that frequency. However, if spreading is performed as well as modulating, a spread signal 75 is obtained which has a power spectrum with a main band spread between 0 and 4 kHz and harmonic bands at higher frequencies. As the power of the spread signal 75 is distributed over a wider range of frequencies than for the modulated signal 73, the peak power level is significantly reduced. For many applications the spread signal 75 is not noticeable to a listener or is heard only as a background white noise. Further, the majority of the energy of the main band is in a frequency range for which most conventional television loudspeakers work satisfactorily. There is, therefore, no requirement for a user to obtain a new television set to take advantage of the invention.

Figure 4:
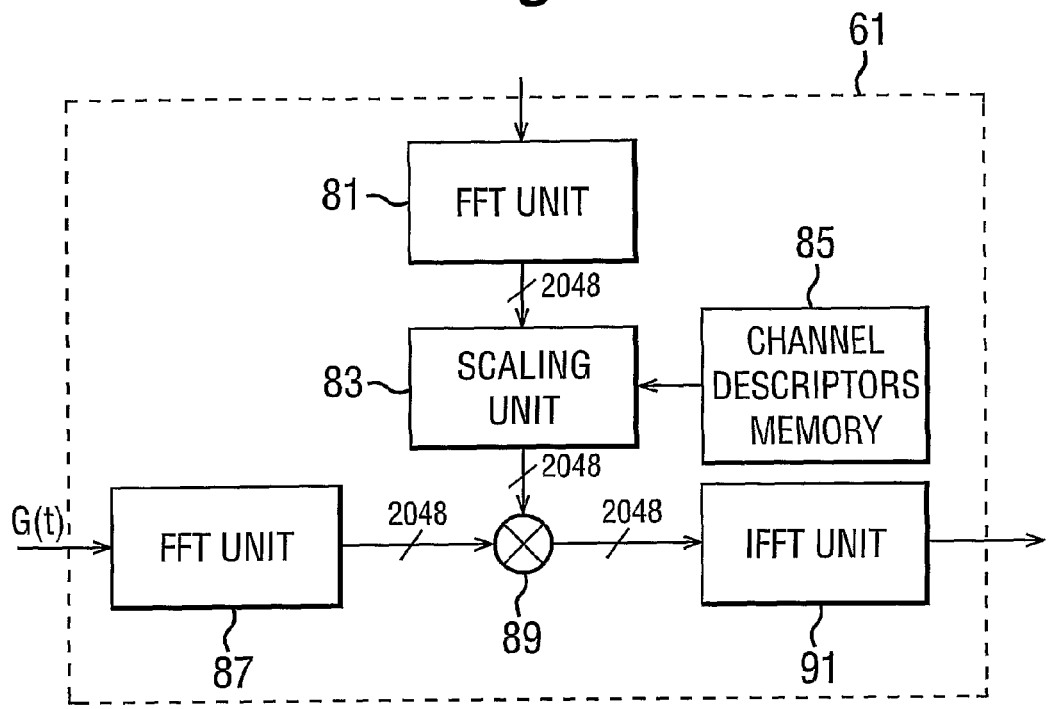

Returning to FIG. 2, the modulated signal G(t) and the audio track are input to an audio mixer 59 where they are combined to form the modified audio track. In particular, in the audio mixer 59 the modulated signal G(t) and the audio track are input to a shaping unit 61 which analyses the power spectrum of the audio track and modifies the power spectrum of the modulated signal G(t) in dependence upon the power spectrum of the audio track in order to generate a shaped signal S(t) which is less obtrusive when combined with the audio track. FIG. 4 shows in more detail the main components of the shaping unit 61. The audio track, which in this embodiment is generated at 22,050 samples per second with each sample having a 16-bit value, is input to a first Fast Fourier Transform (FFT) unit 81 which splits the audio track into blocks each having 2048 samples applying conventional overlapping and windowing techniques. The FFT unit 81 measures for each block the energy in 2048 frequency sub-bands to generate 2048 coefficients which are output to a scaling unit 83.

Figure 5:
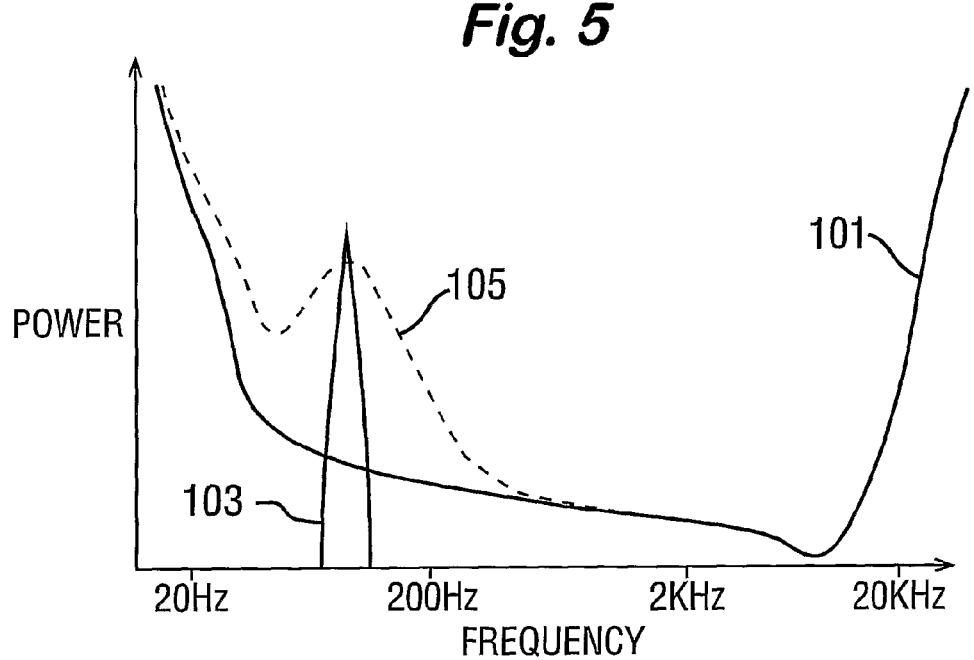

The scaling unit 83 applies a psycho-acoustic algorithm to generate scaling factors for the 2048 frequency sub-bands. In particular, the scaling unit includes a psycho-acoustic filter which outputs, for each frequency sub-band of each block of samples, a scaling factor based on the energy in that and neighbouring frequency sub-bands for that block of samples and for preceding and succeeding neighbouring blocks of samples. Using a psycho-acoustic algorithm allows higher signal levels to be used than if a simple scaling algorithm was applied because it takes into account the dynamic variation of sensitivity of the human ear in the presence of sounds. This will be explained further with reference to FIG. 5 which shows the sensitivity of a typical human ear for different frequencies (in other words, the minimum sound levels for different frequencies which can be heard by a typical human ear) without any background noise (the plot referenced as 101) and in the presence of a narrow band signal 103 (the dashed plot referenced as 105). As can be seen from FIG. 5, the ability of the human ear to distinguish sound in the frequency range of the narrow band signal 103 and in a range of frequencies both above and below the frequency range of the narrow band signal 103 is significantly reduced. There are therefore audio signals which cannot be heard by the human ear in the presence of the narrow band signal 103, even though they would be heard if the narrow band signal 103 is not present. In this embodiment, the psycho-acoustic algorithm uses channel descriptors, which are stored in a memory 85, to approximate how the audio track will be modified by the broadcast network 11 and television 17 when determining the scaling factors for each of the 2048 frequency sub-bands.

Psycho-acoustic algorithms have been previously investigated for data compression, since sounds which would not be discerned by a listener can be removed from an audio data stream. Further details of psycho-acoustic encoding can be found in the paper "Transform Coding of Audio Signals Using Perceptual Noise Criteria" by James D. Johnston, IEEE Journal on Selected Areas in Communications, Vol. 6, No. 2, February 1988, whose contents are hereby incorporated by reference.

The modulated signal G(t) is input to a second FFT unit 87 which, in the same manner as the FFT unit 81, splits the modulated signal G(t) into blocks of 2048 samples and generates 2048 coefficients corresponding to the energy in 2048 frequency sub-bands for each block. In this embodiment, the 2048 frequency sub-bands for the second FFT unit 87 match the 2048 frequency sub-bands of the first FFT unit 81. The 2048 coefficients output by the second FFT unit 87 and the 2048 scaling factors output by the scaling unit 83 are input to a multiplier 89 where the coefficient for each frequency sub-band of the modulated signal G(t) is multiplied by the corresponding scaling factor for that frequency sub-band determined from the audio track. The scaled coefficients output by the multiplier 89 are then input to an Inverse Fast Fourier Transform (IFFT) unit 91 which generates the shaped signal S(t) from the scaled coefficients, taking into account the windowing and overlapping.

Returning to FIG. 2, the audio track is also input to a time delay unit 63 which delays the audio track for a period of time corresponding to the time required for the shaping unit 61 to generate the shaped signal S(t) using the audio track. The audio track output from the time delay unit 63 and the shaped signal S(t) are input to an adder 65 which performs a simple linear adding operation to combine them to form the modified audio track. The purpose of the time delay unit 63 is to ensure that each portion of the audio track is combined in the adder 65 with the portion of the shaped signal S(t) which has been shaped in accordance with the power spectrum of that portion of the audio track.

As described above, the modified audio track is combined with a video track to form a television signal which is then broadcast over a conventional television network 11. An aerial 15 detects the broadcast television signal 13 and directs a corresponding electrical signal to a television 17 which outputs an acoustic signal 19 corresponding to the modified audio track using a loudspeaker (not shown). The output acoustic signal 19 is then detected by the microphone 23 of the cellular phone 21.

FIG. 6 shows in more detail the main components of the cellular phone 21 of the first embodiment. As shown, the microphone 23 of the cellular phone 21 converts the detected acoustic signal 19 into a corresponding electrical signal H(t) which is input to an anti-aliasing filter 111. The filtered signal output by the anti-aliasing filter 111 is input to an analog-to-digital converter (ADC) 113 which converts the filtered signal into a corresponding digital signal D(t) using a sampling rate of 8 kHz. The output of the ADC 113 is connected to an AUDIO_IN input of a processor 115.

Digital signals output via an AUDIO_OUT output of the processor 115 are input to a digital-to-analog converter (DAC) 117 which converts the digital signals into corresponding analog signals which are then amplified by an amplifier 119 before being output as acoustic waves by the loudspeaker 25. A DISP_OUT output of the processor 115 is connected to the display 29 while a KEY_IN input to the processor 115 is connected to the keyboard 31. An RF_OUT output of the processor 115 is connected to a radio frequency (RF) processor unit 121 which processes baseband digital signals output by the processor 115 to form RF signals for broadcast via the antenna 27. The RF processor unit 121 also processes incoming RF signals received via the antenna 27 to form baseband signals which are input to an RF_IN input of the processor 115.

A random access memory (RAM) 123, a non-volatile random access memory (NVRAM) 125 and a read only memory (ROM) 127 are also connected to the processor 115. The NVRAM 125 stores data associated with the user of the cellular phone 21, for example a phone book listing the names and associated phone numbers of commonly called people, and the RAM 123 provides working space for use during the operation of the processor 115. The ROM 127 stores routines which control the operation of the processor 115.

In particular, the ROM 127 stores routines, which enable the processor to operate in three different modes. In a call mode, which is activated when the cellular phone 21 is used during a telephone call, acoustic signals received by the microphone 23 are converted by the processor 115 into baseband signals which are output to the RF processor unit 121 and incoming baseband signals from the RF processor unit 121 are converted into audio signals which are output by the loudspeaker 25. In a standby mode, which is the default mode when no telephone call is being made, the processor 115 waits for either an RF signal initiating a call to be detected by the antenna 27 or for one of the keys of the keyboard 31 to be pressed. In the standby mode the processor 115 does not process acoustic signals detected by the microphone 23. The call mode and standby modes are conventional modes of operation for a cellular phone. In the third mode, hereafter called the monitor mode, the processor 115 processes acoustic signals 19 received by the microphone 23 to recover any data signal embedded within the acoustic signal 19 in addition to performing the operations of the standby mode.

Figure 7B:
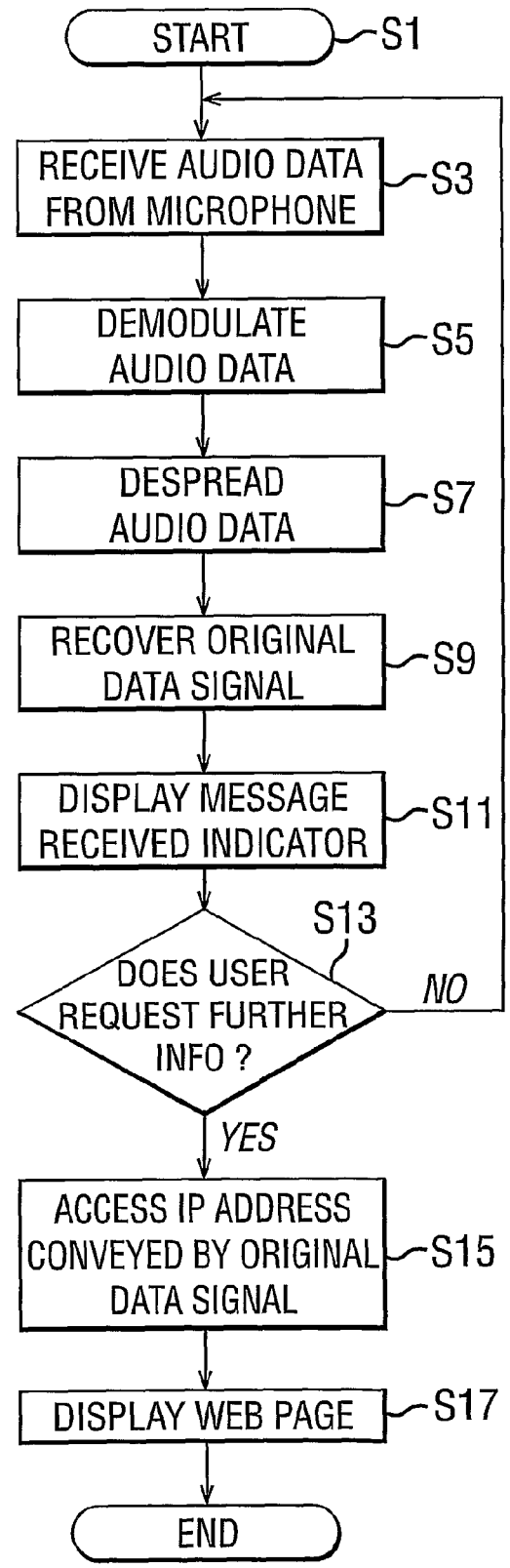
FIG. 7B is a flow chart illustrating the steps performed by the cellular phone shown in FIG. 6 to receive and process a data signal.

The operation of the processor 115 in the monitor mode will now be described in more detail with reference to FIGS. 7A and 7B. FIG. 7A is a schematic block diagram showing the functional configuration of the processor 115 during the monitor mode and FIG. 7B shows a flowchart illustrating the main steps performed by the processor 115 in the monitor mode. The monitor mode is initiated, in step S1, by the user selecting a menu option using the menu keys 33. Once the monitor mode has been initiated, the processor 115 receives, in step S3, the digital signal D(t) conveying audio data from the microphone 23 via the AUDIO_IN input of the processor 115.

The digital signal D(t) is then processed by a demodulator 130 which demodulates, in step S5, the digital signal D(t) using conventional digital signal processing techniques. The demodulated digital signal is then processed by a despreading module 131 which despreads, in step S7, the audio data. This despreading involves monitoring for the chip sequence corresponding to the SYNC bit which, when detected, is processed to determine the timing of the received chip sequence and the slight frequency offset between the chip rate of the received chip sequence and the chip rate of the pseudo-noise codes generated within the cellular phone 21. In general, there will be a slight frequency offset which arises from three main causes. The first cause is that many transmission media slightly vary the transmission rate of the audio track, thereby varying the chip rate of the chip sequence conveyed by the audio track. The second cause is that Doppler effects can occur, for example due to movement of the cellular phone 21, which affects the chip rate in the detected signal. Finally, the third main cause is that there is always a slight difference between the clock frequencies used to generate the pseudo-noise codes in the encoder 5 and the cellular phone 21. The despreading module 131 is then able to determine from the received chip sequence transitions between the pseudo-noise codes PN0 and PN1, thereby recovering the modified data signal.

The recovered modified data signal is then processed by a data signal regenerator 132 which recovers, in step S9, the original data signal F(t) by removing the synchronisation bit and decoding the remaining (15,7) BCH code, thereby recovering the URL associated with the television programme. After the URL has been recovered, the data signal regenerator 132 outputs, in step S11, a signal to a signal generator 133 which sends a control signal to a display driver 134 which in turn outputs a drive signal to the display 29 causing the display 29 to show a message received indicator. The message received indicator enables the user of the cellular phone 21 to see that further information about the television program is available from the internet. The data signal regenerator 132 also stores the URL in the RAM 123.

The processor 115 then waits, in step S13, for the user to request further information. If the user does not request further information within a preset time, the routine returns to step S3. If, however, the user selects the menu option for requesting further information then this selection is input to the keyboard interface 135 which sends a signal to a browser 136 causing the browser 136 to access, in step S15, the web page corresponding to the URL conveyed by the original data signal F(t). In particular, the browser retrieves the URL from the RAM 123 and outputs a baseband signal, via the RF_OUT output, which is converted to an RF signal by the RF processor unit 121 and is broadcast by the antenna 27.

Subsequently, a RF signal conveying web page data for the IP address is detected by the antenna 27 and converted to a baseband signal by the RF processor unit 121, and the baseband signal is input to the RF_IN input of the processor 115. In the processor 115, the web page data is processed by the browser 136 which sends the web page data to the display driver 134 which in turn outputs, in step S17, a drive signal causing the display 29 to display the received web page.

Those skilled in the art will appreciate that processors typically used in digital cellular phones are well suited to be programmed to perform the digital signal processing required in the monitor mode.

As described above, in the first embodiment a cellular phone 21 retrieves from the acoustic signal 19 corresponding to the audio track of a television program an IP address for a web page associated with that program so that the user of the cellular phone can download additional information about the television program. By using spread spectrum encoding techniques to generate a spread signal and by shaping the spread signal in dependence upon the power spectrum of the audio track, the data embedded within the audio track can be hidden from a listener. An advantage of encoding the data signal within the acoustic signal is that the bandwidth required to electronically transmit the audio track after the data signal has been encoded therein is no more than that required to transmit the audio track by itself.

In the first embodiment, a 2 kHz carrier signal is modulated using phase shift keying in accordance with the logic signal I(t) to produce a spread signal G(t) having a power spectrum with a main band spread between 0 and 4 kHz. However, the energy spectrum of the audio track could be concentrated in a frequency range away from 2 kHz, in which case the power level of the shaped signal (and hence the signal to noise ratio) needs to be low if the data signal is not to be noticed by a listener. A second embodiment will now be described with reference to FIGS. 8 and 9 in which the encoder of the first embodiment is replaced by an alternative encoder in which the frequency of the carrier wave is varied in accordance with the frequency spectrum of the audio track, and the software stored in the ROM of the cellular phone is modified to account for this variation in frequency during decoding. The remaining components of the signalling system of the second embodiment are the same as those of the first embodiment and will not therefore be described again.

FIG. 8 shows the main components of the encoder 163 of the second embodiment. In FIG. 8, components which are the same as corresponding components of the encoder of the first embodiment have been referenced with the same numerals and will not be described again. As shown, the audio track is input to a spectrum analyser 164 which monitors the frequency spectrum of the audio track. In particular, the spectrum analyser 164 monitors the energy in 2048 frequency sub-bands, each corresponding to 10 Hz, and determines the set of 200 adjacent frequency sub-bands which has the greatest energy. The spectrum analyser 164 then outputs a control signal to a modulator 165 to adjust the frequency of the local oscillator so that the carrier signal is in the centre of the frequency range corresponding to the identified set of frequency sub-bands. The modulated signal G(t) output by the modulator 165 is then shaped and combined with the audio track to form the modified audio track in the same manner as described above in the first embodiment.

In this embodiment, the cellular phone is substantially as described in the first embodiment except that when the processor is configured for the monitor mode, the demodulator 130 shown in FIG. 7A is in effect replaced by the demodulator module 166 shown in FIG. 9. As shown, the digital signal D(t) received at the AUDIO_IN input is processed by a spectrum analyser 167 which determines, in the same manner as the spectrum analyser 164, the frequency spectrum of the digital signal D(t) and outputs a signal identifying the centre frequency. The digital signal D(t) is also delayed by a time delay module 168 and then processed by a demodulator 169 whose carrier frequency is controlled by the signal output by the spectrum analyser 167 to match the centre frequency. The purpose of the time delay unit 168 is to ensure that each part of the digital signal D(t) is demodulated using the carrier frequency calculated for that part. The demodulated signal output by the demodulator 169 is processed by the despreading module 131 and the process continues as described with reference to FIGS. 7A and 7B.

In this embodiment, the carrier frequency is varied so that the main band of the modulated signal G(t) is moved to a frequency range in which the energy of the audio track is relatively large. This has the effect that the scaling factors determined by the shaping unit 61 are generally larger than if the carrier frequency was kept constant. In this way, the power of the shaped signal S(t) is increased.

In the first and second embodiments, the modulated signal G(t) is combined with the audio track after having been scaled in order to reduce its noticeability in the modified audio track. A third embodiment will now be described with reference to FIGS. 10 and 11 in which the encoder of the first embodiment is replaced by an alternative encoder which removes part of the audio track, shapes the modulated signal G(t) to approximate the removed part of the audio track, and then adds the shaped signal to the remaining part of the audio track. The remaining components of the signalling system of the third embodiment are the same as those for the first embodiment and will not therefore be described again.

FIG. 10 shows the main components of the audio mixer 171 of the third embodiment. As shown, the audio track is input to a linear predictive coding (LPC) unit 173 which uses conventional linear predictive coding techniques to analyse the audio track. Linear predictive coding takes advantage of the fact that for many sounds the power at any instant is strongly dependent on the power in preceding instants in order to generate a small number of linear prediction (LP) coefficients, sometimes called predictors, from which the sound can be reproduced. In particular, a block of samples is analysed to determine the LP coefficients $a_1, a_2 \ldots a_n$ which, when used in the equation:

$$s(k)=a_1 s(k-1)+a_2 s(k-2)+ \ldots +a_n s(k-n)+\xi(k) \qquad (1)$$

where s(k) is the value of the k-th sample, give the smallest set of error values x(k) for the block.

In this embodiment, the LPC unit 173 splits the audio track into blocks of 2048 samples and determines, using a maximum likelihood algorithm, a set of 10 LP coefficients for each block. These 10 LP coefficients model (through equation (1) above) the tonal components of the audio track to be regenerated. The determined LP coefficients are output by the LPC unit 173 and input to a conventional synthesis unit 175 which for each sample synthesises, using the LP coefficients and equation (1) above, a predicted sample value corresponding to $s(k)-\xi(k)$. The sequence of predicted values output by the synthesis unit 175 form a tonal part P(t) of the audio track.

The audio track is also input to a time delay unit 177 which introduces a time delay corresponding to the processing time required to analyse the audio track in the LPC unit 173 and to synthesize the tonal part P(t) in the synthesis unit 175. The output of the time delay unit 177 and the output of the synthesis unit 175 are input to a subtractor 179 in which the tonal part P(t) is subtracted sample by sample from the actual audio track so that the subtractor 179 outputs a noise part N(t) which corresponds to the error values $\xi(k)$, in other words the random part of the audio track (sometimes referred to as the residue, the residual part or the atonal part).

The noise part N(t) is input to a first FFT unit 181 which splits the noise part N(t) into blocks each having 2048 samples, using conventional windowing and overlapping techniques, and outputs for each block 2048 frequency-dependent coefficients corresponding to the energy in 2048 frequency sub-bands. Similarly, the modulated signal G(t) is input to a second FFT unit 183 which, in the same manner as the first FFT unit 181, splits the modulated signal G(t) into blocks of 2048 samples and generates 2048 coefficients corresponding to the energy in 2048 frequency sub-bands for each block. The 2048 coefficients output by the second FFT unit 183 are input to a multiplier 185. The 2048 coefficients output by the first FFT unit 181 are input to a scaling unit 187 which calculates and outputs 2048 scaling factors which are input to the multiplier 185 where the coefficient for each frequency sub-band of the modulated signal G(t) is multiplied by the corresponding scaling factor for that frequency sub-band determined from the noise part N(t). The scaling unit 187 applies a scaling algorithm to calculate the scaling factors so that when the scaled coefficients output by the multiplier 189 are input to an IFFT unit 189, which generates a shaped signal S(t) using the scaled coefficients, the shaped signal S(t) approximates the noise part N(t).

The tonal part P(t) output by the synthesis unit 175 is also input to a time delay unit 191 which delays the tonal part P(t) by a time corresponding to the time required to generate and process the noise part N(t) and to scale the modulated signal G(t) using the noise part N(t) to generate the shaped signal S(t). The output of the time delay unit 191 and the shaped signal S(t) are then input to an adder 193 which performs a linear adding operation to generate the modified audio track. In this way, the noise part N(t) of the audio track is replaced by a version of the modulated signal G(t) which has been shaped to approximate the noise part N(t) of the audio track in order to form the modified audio track.

FIGS. 11A to 11F are plots which illustrate the signals at different points in the audio mixer 171. FIG. 11A shows the audio track which is input to the audio mixer 171. FIG. 11B shows the tonal part P(t) which is output by the synthesis unit 175 and FIG. 11C shows the noise part N(t) which is obtained by subtracting the tonal part P(t) from the audio track. FIG. 11D shows the modulated signal G(t) input to the audio mixer 171 and FIG. 11E shows the shaped signal S(t) output by the IFFT unit 191. FIG. 11F shows the modified audio track formed by adding the tonal part P(t) shown in FIG. 11B and the shaped signal S(t) shown in FIG. 11E. A comparison of FIGS. 11A and 11F shows that the profile of the modified audio track is approximately the same as the profile of the original audio track.

In the third embodiment, the noise part of the audio track, which is particularly associated with hiss-like sounds, is removed from the audio track and replaced by the shaped signal S(t). A fourth embodiment of the invention will now be described with reference to FIG. 12 in which the encoder of the first embodiment is replaced by an encoder which modifies the relative amplitudes of the audio track and the shaped signal in dependence upon the level of tonality of the audio track. The remaining components of the fourth embodiment are identical to those of the first embodiment and will not therefore be described again.

FIG. 12 shows the main components of the audio mixer 195 of the fourth embodiment. As shown, the audio track is input to a first FFT unit 197 which splits the audio track into blocks of 2048 samples using conventional overlapping and windowing techniques and, for each block, determines the energy in 2048 frequency sub-bands to generate 2048 coefficients which are output to a scaling unit 199 and a spectrum analyser 201. The scaling unit 199 applies the same scaling algorithm as that used in the third embodiment to generate 2048 scaling factors which are output to a multiplier 203.

The modulated signal G(t) is input to a second FFT unit 205 which, in the same manner as the first FFT unit 197, splits the modulated signal G(t) into blocks of 2048 samples and for each block generates 2048 coefficients corresponding to the energy in 2048 frequency sub-bands which match the frequency sub-bands for the first FFT unit. The 2048 coefficients output by the second FFT unit 205 are input to the multiplier 203 where each co-efficient is multiplied by the scaling factor, output by the scaling unit 199, for its respective frequency sub-band. The 2048 scaled coefficients output by the multiplier 203 are input to an IFFT unit 207 which generates the shaped signal S(t) from the scaled coefficients.

The spectrum analyser 201 determines the level of tonality of each block of the audio track from the 2048 coefficients output by the first FFT unit 197. In particular, this is achieved by statistically analysing the 2048 coefficients to determine if a tonal signal is present, which will be indicated by peaks in a small number of frequency sub-bands, or if no tonal signal is present in which case the frequency coefficients for the sub-bands will vary more randomly. The spectrum analyser 201 then outputs a signal indicative of the level of tonality which, in this embodiment, is a four bit binary number which varies from 0000 for when the audio track is almost purely noise-like to 1111 when the audio track is almost purely tonal.

The audio track is also input to a time delay unit 209 which delays the audio track for a time corresponding to the time required to analyse a portion of the audio track and generate the shaped signal S(t) for that portion. The output of the time delay unit 209, the shaped signal S(t), and the four bit binary number output by the spectrum analyser 201 are input to respective input ports of a variable combiner 211. In the variable combiner 211, the delayed audio track is input to a variable amplifier 213a where it is multiplied by a gain factor G determined from the four bit number output by the spectrum analyser 201, and the shaped signal S(t) is input to a second variable amplifier 213b where it is multiplied by a gain factor of (1−G). The outputs of the first and second variable amplifiers 213 are then added together by an adder 215 to generate the modified audio track.

In the fourth embodiment, the audio track and the shaped signal S(t) are weighted in accordance with the level of tonality of the audio track and then added together to form the modified audio track. In particular, the more noise-like the audio track the greater the proportion of the modified audio track which is formed by the shaped signal S(t). Further, in the third embodiment the noise-like part of the audio track is removed and replaced by the shaped signal S(t). However, a problem with the third and fourth embodiments is that if the audio track is very tonal then the noise-like part is small and the shaped signal S(t) cannot be added at sufficiently high signal levels for it to be reliably decoded in the decoder. Therefore, if the audio track is very tonal, the psycho-acoustic shaping technique described in the first embodiment is preferred.

A fifth embodiment will now be described with reference to FIG. 13 in which the encoder of the first embodiment is replaced by an alternative encoder which combines the psycho-acoustic shaping technique described in the first embodiment, the linear predictive coding technique described in the third embodiment and the weighting technique described in the fourth embodiment. In the encoder of the fifth embodiment, a user is able to set parameters which determine the nature of the encoding. This is advantageous because the masking ability of the audio track is subjective and therefore better masking is generally obtained if the user can set the encoding parameters than if the encoding parameters were automatically set. The remaining components of the fifth embodiment are identical to those of the first embodiment and will not therefore be described again.

FIG. 13 shows the main components of the audio mixer 217 of the fifth embodiment. Components which are the same as corresponding components in the audio mixer of the third embodiment have been referenced with the same numerals and will not be described again. As shown, the audio track is input to the LPC unit 173 which determines and outputs LP coefficients corresponding to the tonal part P(t) for sequential blocks of 2048 samples. In this embodiment, a user interface 218 is provided via which a user can set the number of LP coefficients used in the LPC unit 173. In response to the user setting the number of LP coefficients, the user interface 218 outputs a control signal to the LPC unit 173 which causes the LPC unit 173 to use the selected number of LP coefficients.

As in the third embodiment, the noise part N(t) is obtained by inputting the LP coefficients output by the LPC unit 173 to a synthesis unit 175 in order to generate the tonal part P(t), and then subtracting the tonal part P(t) from the audio track using the subtracter 179. In this embodiment, the noise part N(t) is input, via a time delay unit 219, to a first input port of a variable combiner 220 as well as to the first FFT unit 181.

The coefficients output by the first FFT unit 181 are input to a scaling unit 221 which applies a psycho-acoustic algorithm, using channel descriptors from a channel descriptors memory 222, to generate 2048 scaling factors which are input to the multiplier 185 to multiply respective ones of the 2048 coefficients output by the second FFT unit 183 to generate the scaled coefficients for forming the shaped signal S(t). In this embodiment, the user is able to set the level of the psycho-acoustic encoding via the user interface 218. In particular, the scaling unit applies a psycho-acoustic filter and, in response to the user setting the level of the psycho-acoustic encoding, the user interface outputs a control signal which determines the bandwidth of the psycho-acoustic filter (i.e. the number of neighbouring frequency sub-bands and blocks of data samples whose energy is taken into account when determining the scaling factors). If the highest level of psycho-acoustic encoding is desired, then the bandwidth is set so that the scaling unit 221 effectively acts in the same manner as the scaling unit of the first embodiment. If, however, the lowest level of psycho-acoustic encoding is desired, then the bandwidth is set so that the scaling unit 221 effectively acts in the same manner as the scaling unit of the third embodiment.

The shaped signal S(t) output by the IFFT unit 189 is input to a second input port of the variable combiner 220. In this embodiment, a user is able to select using the user interface 218 the gain factor G used in the variable combiner 220, in response to which the user interface 218 outputs a signal to a third input port of the variable combiner 220. In the variable combiner 220, the delayed noise part N(t) is input to a variable amplifier 223a where it is multiplied by the gain factor G and the shaped signal S(t) is input to a second variable amplifier 223b where it is multiplied by a gain factor (1−G). The output of the first and second variable amplifiers 223 are then added together by an adder 224 to form a modified noise part N'(t). The purpose of the time delay unit 219 is to ensure that each portion of the noise part N(t) is combined in the variable combiner 220 with the portion of the shaped signal S(t) which was shaped using that portion of the noise part N(t).

The tonal part P(t) output by the synthesis unit 175 is input, via a time delay unit 225, to the adder 195 along with the output of the variable combiner 220. The adder 195 performs a simple linear addition to generate the modified audio track. The purpose of the time delay unit 225 is to ensure that the tonal part P(t) is synchronised with the modified noise part N'(t).

In this embodiment, the audio mixer 217 allows a user to adjust the encoding in accordance with the tonality of the audio track to improve the masking of the data by the audio track. For example, if there is only a small atonal portion to the audio track, the user can reduce the number of LP coefficients used by the LPC unit 173 in order to increase the energy in the noise part N(t) because less of the audio track is modelled by the LPC unit 173. Reducing the number of LP coefficients also has the effect of increasing the tonal features within the noise part N(t). In the extreme case, the number of LP coefficients can be set to 0 so that the noise part N(t) is the same as the audio track. As the tonal features within the noise part N(t) increase, the user can set the scaling unit 221 to apply a wider bandwidth psycho-acoustic filter to take advantage of the masking ability of these tonal features. The user can subsequently set the gain factor G of the variable combiner to 0.9 so that 90% of the modified noise part N'(t) is formed by the noise part N(t) and 10% of the modified noise part N'(t) is formed by the shaped signal S(t). If, however, the audio track is predominantly atonal, then the user can increase the number of coefficients used by the LPC unit 173, decrease the bandwidth of the psycho-acoustic filter applied by the scaling unit 221 and set the value of the gain factor G of the variable combiner 220 to zero so that the modified noise part N'(t) is identical to the shaped signal S(t).

In this embodiment the user can adjust the number of coefficients of the LPC unit 173, the bandwidth of the psycho-acoustic filter and the gain factor G freely. This allows the user to determine, for a required signal to noise ratio, the set-up for which the modified audio track is, in the opinion of the user, most similar to the original audio track.

In the first to fifth embodiments, a data signal conveying a URL identifying a website associated with a television program is input to an encoder in which the data signal is spread and mixed with the audio track for the television program prior to the television program being broadcast over a conventional television network. A cellular phone then recovers the URL from the acoustic signals output by a television tuned to the television program so that the user of the cellular phone, if desired, can download the web page to the cellular phone. The first to fifth embodiments describe different techniques for encoding the data signal within the audio track.

Alternative embodiments will now be described in which the encoder is incorporated within a cellular phone so that a data stream can be encoded within an acoustic signal emitted by the cellular phone.

FIG. 14 illustrates a sixth embodiment of the invention in which a first cellular phone 401_1 emits an acoustic signal 403, having encoded therein user data associated with the user of the first cellular phone 401_1, from a loudspeaker 25_1. In this embodiment, the user data includes the name of the user and the telephone number of the first cellular phone 401_1. The emitted acoustic signal 403 is detected by a second cellular phone 401_2, using a microphone 23_2, and the second cellular phone 401_2 then decodes and stores the user data. In particular, the name of the user of the first cellular phone 401_1 is stored along with the telephone number of the first cellular phone 401_1 in a "phone book" stored in the second cellular phone 401_2. Similarly, the second cellular phone 401_2 emits an acoustic signal conveying user data associated with the user of the second cellular phone 401_2 from a loudspeaker 25_2 for detection and decoding by the first cellular phone 401_1.

It will be appreciated that transmitting user data in this manner removes the requirement of inputting names and phone numbers via the keypad 31 of the cellular phone 401, which is generally a slow and awkward process because the keys of the keypad 31 are small.

FIG. 15 schematically illustrates the main components of the cellular phone 401 of the sixth embodiment. In FIG. 15, components which are identical to corresponding components of the cellular phone of the first embodiment have been referenced by the same reference numerals and will not be described again.

As shown, in this embodiment the processor 411 of the cellular phone 401 has an AUDIO_OUT output and a DATA_OUT output which are connected to respective inputs of an encoder 413. In this embodiment, the only difference between the encoder 413 and the encoder of the first embodiment is that the modulator of the encoder 413 does not include a re-sampling circuit because the digital signal output via the AUDIO_OUT output of the processor 411 has a sample rate of 8 kHz. The output of the encoder 413 is connected to the input of the DAC 117. In this way, user data output via the DATA_OUT output of the processor 411 is encoded within an audio track output by the AUDIO_OUT output to form a modified audio track.

In the cellular phone 401 of this embodiment, the digital signal D(t) output from the ADC 113 is input to a decoder 415 as well as the AUDIO_IN input of the processor 411. In this embodiment, the decoder 415 is substantially as described in International Patent Publication WO 01/10065, whose contents are herein incorporated by reference. The decoder 415 recovers user data encoded within the digital signal D(t) and outputs the recovered user data to a DATA_IN input of the processor 411. In this way, user data conveyed by an acoustic signal from another cellular phone 401 can be decoded for processing by the processor 411.

In this embodiment, the user data associated with the user of the cellular phone 401 is stored in the NVRAM 125 and the ROM 127 stores a sub-routine which, in response to the user selecting a menu option using the menu keys 33, causes the processor 411 to output, via the DATA_OUT output, the user data and to output, via the AUDIO_OUT output, a preset audio sequence. The purpose of the preset audio sequence is to provide an audible indication to the user that the data transfer is taking place. In the encoder 413, the user data is spread, modulated and shaped as described in the first embodiment before being added to the preset audio sequence to form a modified audio sequence. The modified audio sequence output by the encoder 413 is input to the DAC 117 where it is converted into an analogue signal which is amplified by the amplifier 119 and output as an acoustic wave by the loudspeaker 25.

When the cellular phone 401 detects, using the microphone 23, an acoustic wave conveying user data, the user data is decoded by the decoder 415 and input, via the DATA_IN input, to the processor 411. In response to the user data being input, the processor 411 runs a sub-routine stored in the ROM 127 which extracts the user name and phone number from the user data and stores the extracted user name and phone number as an entry in a look-up table within the NVRAM 125. In this embodiment, the NVRAM 125 can store up to 100 entries which form an electronic phone book.

In the sixth embodiment, data is transferred between two cellular phones 401 via an acoustic communications link. However, cellular phones could also use an acoustic communications link to transmit data signals to other electronic devices. A seventh embodiment will now be described with reference to FIGS. 16 to 19 in which a cellular phone encodes a control signal within an emitted acoustic signal; a toy detects the acoustic signal, recovers the control signal and responds in accordance with the control signal in a manner discernable to humans.

As shown in FIG. 16, a caller 423 uses a telephone handset 427, connected to a telecommunications network 429, to phone the user (not shown) of the cellular phone 421. The call is routed by the telecommunications network to a base station 431, which covers the area in which the cellular phone 421 is currently located, and the base station 431 outputs a RF signal 433 which is detected by the antenna of the cellular phone 421. Included in the RF signal 433 is identification data identifying the phone number of the handset 427. Those skilled in the art will appreciate that such identification data is sent in many conventional telephone systems. In this embodiment, the cellular phone 421 determines from the incoming RF signal 433 the telephone number of the handset 427, retrieves from a look-up table a control signal identifier associated with the determined telephone number, and encodes the control signal corresponding to the control signal identifier within a ring tone which is output as an acoustic signal 435.

In this embodiment, the acoustic signal 435 is detected by a microphone 437 in an electronic toy 425. As shown in FIG. 16, the electronic toy 425 includes two arms 439a, 439b and a face formed by: a nose 441; two eyes 443a, 443b; an articulated mouth 445; and two articulated eyebrows 447a, 447b. The electronic toy 425 also includes a loudspeaker 449. The toy 425 decodes the control signal within the ring tone emitted by the cellular phone 421 and responds by outputting a sound via the loudspeaker 449 and by moving the mouth 445 and the eyebrows 447 to from an expression in accordance with the recovered control signal.

FIG. 17 shows the main components of the cellular phone 421 of the seventh embodiment. In FIG. 17, components which are identical to corresponding components of the cellular phone of the first embodiment have been referenced by the same reference numerals and will not be described again. As shown, the processor 461 has a DATA_OUT output which is connected to a first input of an encoder 463 and the AUDIO_OUT output of the processor 461 is connected to a second input of the encoder 463. In this embodiment, the encoder 463 is identical to the encoder of the sixth embodiment. The encoder 463 encodes a data signal output via the DATA_OUT output of the processor 461 within an audio signal output via the AUDIO_OUT output of the processor 461 to form a modified audio signal which is converted into an analog signal by the DAC 117, and the analog signal is then amplified by the amplifier 119 prior to being converted into an acoustic signal by the loudspeaker 25.

FIG. 18 shows the functional configuration of the processor 461 when a signal initiating a telephone call is first received via the antenna 27. As shown, the received signal is input to a ring signal generator 471 which generates a ring signal which is output via the AUDIO_OUT output of the processor 461. The received signal is also input to a phone number extractor 473 which determines from the received signal the telephone number of the caller. The determined telephone number is processed by a response retriever 475 which accesses a response identifier corresponding to the determined telephone number from a response storage region 477 of the NVRAM 125. As shown, the response storage region 477 is in the form of a look-up table which stores a plurality of telephone numbers along with corresponding response identifiers. In this embodiment, there are three possible responses which have response identifiers A, B and C respectively. When the response retriever 475 has retrieved a response identifier from the response storage region 477, the retrieved response identifier is processed by a data signal generator 479 which generates a corresponding control signal which is output via the DATA_OUT output of the processor 461.

As described above, the acoustic signal 435 is detected by a microphone 437 of an electronic toy 425 which converts the acoustic signal into an electrical signal. FIG. 19 schematically shows the main components of the electronic circuitry within the toy 425. As shown, the electrical signal output by the microphone 437 is input to an anti-aliasing filter 491 before being converted into a digital signal by a DAC 493. The digital signal output by the DAC 493 is input to a decoder 495 which recovers the control signal. In this embodiment, the decoder 495 is identical to the decoder for the sixth embodiment.

The recovered control signal is input to a processor 497 which is connected to a RAM 499, which provides working memory, and a ROM 501 which stores routines which are executed in response to the control signal. A first output of the processor 497 is connected to a first motor drive circuit 503 which outputs drive signals to an eyebrows motor 505 for causing movement of the articulated eyebrows 447. A second output of the processor 497 is connected to a second motor drive circuit 507 which outputs drive signals to a mouth motor 509 for causing movement of the articulated mouth 445. A third output of the processor 497 is connected, via a DAC 511 and an amplifier 513, to a loudspeaker 515.

In operation, receipt of a control signal activates a corresponding routine stored in the ROM 501 associated with the control signal which causes the processor 497 to output a signal to the motor drive circuit 503, causing the motor drive circuit 503 to drive the eyebrows motor 505 to move the articulated eyebrows 447, and outputs a signal to the second motor drive circuit 507 causing the second motor drive circuit 507 to output a drive signal to the mouth motor 509 to move the articulated mouth 445. In this way, the desired expression corresponding to the control signal is formed. Further, an audio signal associated with the control signal is output by the processor 497 to the DAC 511 where it is converted into an analog signal which is then amplified by the amplifier 513 before being output as an acoustic signal by the loudspeaker 449. As shown in FIG. 16, the control signal associated with the user 423 causes the facial expression of the toy 425 to become a frown, and the audio signal associated with the user 423 is a groan.

In the seventh embodiment, a cellular phone determines a control signal associated with the telephone number of a caller and combines the control signal with the ring tone for detection by the toy 425. However, control signals could also be transmitted to a cellular phone over a telecommunications network for transmission by the cellular phone as an acoustic signal for subsequent detection and processing by an electronic device. An eighth embodiment will now be described with reference to FIGS. 20 and 21 in which the facial expression of, and sounds output by, the toy 425 of the seventh embodiment are altered in accordance with control signals which are transmitted, using the Short Message Service (SMS) defined in the Global System for Mobile communication (GSM) specification, over the telecommunications network 429 to a cellular phone. In FIG. 20, components which are identical to corresponding components in FIG. 16 have been referenced with the same numerals and will not be described again.

As shown in FIG. 20, a computer system 521 is connected to a modem 523 via which the computer system 521 sends signals over the telecommunications network 429. In response to a user of the computer system 521 indicating a control signal to be sent to the cellular phone 525, a corresponding control signal identifier is output, using the modem 523, in the form of an SMS message to the telecommunications network 429 which routes the SMS message to the base station 431 covering the location of the cellular phone 525. The base station 431 then emits an RF signal 433 conveying the SMS message for detection by the cellular phone 525.

In this embodiment, the hardware components of the cellular phone 525 are identical to those of the cellular phone described with reference to FIG. 17 for the seventh embodiment. However, in this embodiment the ROM in the cellular phone 525 includes a routine which, in response to an SMS message conveying a control signal identifier, retrieves the control signal identifier from the SMS message and outputs the corresponding control signal and a preset audio signal via the DATA_OUT and AUDIO_OUT outputs of the processor respectively.

FIG. 21 shows the functional configuration of the processor of the cellular phone when processing a received SMS message conveying a control signal identifier. The SMS message is processed by a SMS message analyser 531 which retrieves the control signal identifier. The SMS message analyser then causes an audio signal generator 535 to output the preset audio signal via the AUDIO_OUT output of the processor and a data signal generator 533 to output the control signal corresponding to the control signal identifier from the processor via the DATA_OUT output. The encoder then combines the control signal with the preset audio signal to form a modified audio signal which is output as the acoustic signal 435. In this embodiment, the preset audio signal is only used to alert the user of the cellular phone that a control signal is being sent.

In this embodiment, the toy 425 detects the acoustic signal 435 and responds in the same manner as described in the seventh embodiment.

MODIFICATIONS AND FURTHER EMBODIMENTS

In the first to eighth embodiments, an acoustic data channel is used to either input data into or output data from a cellular phone. The addition of an acoustic data channel to a cellular phone has many advantages, for example:
1. The cellular phone is already equipped with a microphone and a loudspeaker which can be used for the acoustic data channel. Therefore, the weight of the cellular phone does not need be significantly increased.
2. The processors typically used in most digital cellular phones are well suited to be programmed to carry out software routines for encoding and/or decoding data within the acoustic data channel.
3. Acoustic communication techniques are well suited for short range communication, particularly as they are not subject to the same regulatory requirements as RF communication techniques.
4. There are already established networks for distributing acoustic signals, for example television and radio networks.
5. Many people carry a cellular phone on their person virtually all the time. It therefore provides an ideal communication route for data which are dependent upon the location of a person.
6. Using an acoustic link to cellular phones enables data to be targeted to people within a specific location, for example a particular building via a public address system within the building, or listeners to a particular audio source, for example a particular radio network. This is advantageous both to the data supplier, because data is supplied efficiently, and to the user of the cellular phone, because only data which is likely to be useful is received.
7. Using an acoustic communication technique to input data into a cellular phone is generally more convenient than inputting data using the keys of the cellular phone because the keys are generally small.

As those skilled in the art will appreciate, some of the above-described advantages also arise with other portable telephones, such as cordless telephones which communicate with a base station directly connected to a public switched telephone network (PSTN), or even a standard telephone which is directly connected to a PSTN. Those skilled in the art will also appreciate that the telephone could be incorporated as part of another device, for example a personal digital assistant (PDA).

As described above in the first to fifth embodiments, the invention is particularly well suited to so-called "smart" phones which have some data processing capability in addition to voice call handling capability because the acoustic communication techniques can be used, for example, to control the accessing of data or to output signals in accordance with received data. In the first to fifth embodiments, the cellular phone is able to download data from the internet using the Wireless Application Protocol. Other types of "smart" phone include those employing the i-MODE system, "Java phones" which have incorporated therein the Java 2 Platform Micro Edition (J2ME), and the future 3G cellular phones.

In the first to fifth embodiments, a user is able to download a web page from the internet about a television programme using a cellular phone. In particular, a URL for the web page is encoded within the audio track of the television programme. In this way the acoustic data channel is used to establish a link between the cellular phone and the web page. The URL encoded within the television programme could relate to a web page specifically mentioned in the television programme as a source of further information. Alternatively, the URL could be for a "hidden" web page whose existence is not generally broadcast and therefore can only be accessed by suitably enabled cellular phones. For example, a feature film could have encoded within its soundtrack a URL for a web page having cast interviews etc.

Those skilled in the art will appreciate that another form of web page identifier could be encoded within the audio track instead of the URL. For example, a combination of the Internet Protocol address of the server storing the web page and index data identifying the desired web page to the server could be used.

In an alternative embodiment, a proprietary web page identifier is encoded within the audio track and on receiving an acoustic signal conveying a proprietary web page identifier, the cellular phone accesses a database storing a look-up table associating a plurality of proprietary web page identifiers with associated IP addresses and/or URLs. In this way, the data location of the web page associated with the received proprietary web page identifier is determined. The database could be located either in the cellular phone or at a remote server which the cellular phone accesses using the cellular telecommunications network. If the database is stored in the cellular phone, the database can be periodically updated, for example by sending new data using a SMS message.

If the proprietary database is located at a remote server, on receiving a proprietary web page identifier the remote server can either send the corresponding IP address/URL back to the cellular phone or forward to the server corresponding to the IP address/URL a request to download data directly to the cellular phone. An advantage of using a remote server to store the database of proprietary web page identifiers and associated IP addresses is that the number of times the server is accessed by the user of the cellular phone can be monitored. This enables the television programme maker to assess the usefulness of encoding the web pages within the television programme. Further, by monitoring the number of times the user of the cellular phone accesses the server, a loyalty scheme can be established in which the user receives rewards, for example free gifts, for frequent use. In particular, if the user accesses the database a predetermined number of times then a reward is given. This encourages the user of the cellular phone to make use of the server.

For the first to fifth embodiments, the television signal need not be broadcast using a transmitter but could be sent to the television set along a cable network or via a satellite. It will also be appreciated that the invention could also be applied to a radio signal, whether broadcast using a transmitter or sent along a cable network. Further these techniques can be applied to a point-to-point communication system as well as broadcast systems. In addition, conventional encryption techniques could be used so that the television or radio signal could only be reproduced after processing by decryption circuitry.

In an embodiment, the data signal added to a broadcast audio track includes a source identifier and a time stamp. The source identifier identifies the source of the audio track, for example which radio station or television station or film the audio track is from, and the time stamp identifies the point of time during the broadcast, for example the actual time of day or just the track number of the audio track. The user of the cellular phone is then able to transmit, via cellular communications network, the source identifier and the time stamp to a remote server which stores a data base identifying for each combination of source identifier and time stamp the title of the music being played. The remote server then transmits the title associated with the received source identifier and time stamp to the cellular phone which displays the title to the user of the cellular phone.

As another alternative, the television signal could be stored on a video cassette, a digital versatile disk (DVD), hard disk or the like. In this way, no signal is transmitted through the atmosphere or through a cable network but rather the television signal is stored on a recording medium which is subsequently played to a user on the user's television set. Similarly, an audio signal could be stored on an audio cassette, compact disc (CD) or the like. Further, the audio track could be stored as a computer file, for example an MP3 file, on a hard disk or the like.

In the first to fifth embodiments, the monitor mode is activated by the user of the cellular phone. In other embodiments, the monitor mode is activated in response to an external stimulus rather than by the user of the cellular phone. For example, the monitor mode could be activated by a received SMS message. Alternatively, the cellular phone could be configured so that the functionality of the monitor mode is continuously activated.

As described above, in the monitor mode a cellular phone monitors for any data signals conveyed by acoustic signals detected by the microphone. In an embodiment, in order to save power during periods when no data signals are detected, the cellular phone can operate in a "power-save" mode in which the cellular phone only periodically checks for data signals rather than continuously checking for data signals. For example, the cellular phone could check for data signals for a period of three seconds and, if no data signals are detected, the cellular phone then waits ten seconds before checking again. The power-save mode could be activated automatically by the cellular phone if no data signal is received for a predetermined time period. Alternatively, the power-save mode could be activated by a user or by an external stimulus.

In the first to fifth embodiments, the web page whose URL is detected within the audio track of a television programme is accessed by the user of the cellular phone selecting a menu option using menu keys. The accessing of the web page could also be initiated by an external stimulus, for example a command sent using the acoustic data channel. In some applications, the web page is automatically accessed by the cellular phone without requiring any input from the user or an external stimulus, in which case the cellular phone need not store the URL or other web page identifier. For example, in an embodiment a sequence of web page identifiers is encoded within the audio track of a television programme and a cellular phone detects the sequence of web page identifiers and automatically downloads the corresponding web pages. In this way, the cellular phone can display web pages which vary in synchronism with the content of the television programme. Such automatic accessing could be activated in response to a user instruction or an external stimulus, or alternatively the cellular phone could be pre-configured for automatic accessing. Preferably, the user is able to disable the automatic accessing if the user considers the data being downloaded to be irrelevant.

In an alternative embodiment, the user of the cellular phone is able to store a received web page identifier in a NVRAM within the cellular phone for future access by selecting an appropriate menu option.

In the described embodiments, the user inputs an instruction to the cellular phone by accessing a menu option. Examples of user instructions are activating the monitor mode or power-save mode, accessing a web page corresponding to a received web page identifier or instructing the cellular phone to access automatically the web page corresponding to a received web page identifier. Instead of or in addition to such a "soft key" arrangement for entering instructions, the cellular phone could include one or more "hard keys" associated with the acoustic data channel, i.e. dedicated keys provided on the cellular phone which are each associated with a corresponding instruction. These "hard keys" could be either pre-configured during manufacture of the cellular phone or programmed by the user of the cellular phone. In an alternative embodiment, the cellular phone includes voice recognition software so that instructions can be entered by a user speaking an associated word or phrase into the microphone of the cellular phone.

In the first to fifth embodiments, the data encoded within the audio track of a television programme relates to a web page. Alternatively, the data encoded within the audio track of a television programme could be related to, for example, the title of a musical track being played on the television. This title can then be displayed by the cellular phone. Alternatively, telephone numbers could be encoded within the audio track of a television programme, for example a "prize" telephone number could be encoded which can be automatically dialed during a broadcast to enter a competition.

The acoustic data channel could also be used to transmit gaming information to the cellular phone. For example, for computer games played on the cellular phone which have a multi-level structure with each level being accessed by a password, the passwords could be encoded within an audio track so that they can be downloaded to the cellular phone, via the acoustic data channel, in order to allow access to respective levels. The audio track could be, for example, the audio track of a film associated with the computer game so that people who have seen the film can have access to one or more levels of the computer game. Alternatively clues or tips related to a computer game could be encoded within an audio track.

In another alternative application, the data signal F(t) encoded within the audio track of a television programme or a radio programme could convey audience survey data identifying the programme being watched and/or listened to by the user of the cellular phone. The use of a cellular phone for audience survey is advantageous for three main reasons. Firstly, the user of a cellular phone tends to carry the cellular phone on their person. The collected audience survey data is therefore associated with a user, rather than a television set or radio as in most automated audience survey systems. Secondly, the cellular phone is able to send the audience survey data for the user automatically, using the cellular communications network, to a remote database where audience survey data from many users is collated and analysed. This provides a simple mechanism for collecting the audience survey data without requiring user involvement. Thirdly, by incorporating the audience survey operation within a cellular phone which the user normally has either on their person or nearby, the user is less aware of the audience survey being performed than if the user has to carry a dedicated audience survey device about on their person, even if the user knows that the cellular phone is collecting audience survey data. This alleviates a common problem with audience surveys that users alter their viewing and/or listening habits in view of the audience survey.

In a preferred embodiment of the audience survey application, as each item of audience survey data is received by the cellular phone it is immediately downloaded, via the cellular telecommunications network, to an audience survey station where it is stored in an audience survey database. In this embodiment, the data signal is only a channel identifier for the radio station being listened to or the television channel being watched rather than an identifier for a particular programme.

FIG. 22 shows the main components of the audience survey station 551 for this preferred embodiment. The audience survey station 551 receives an audience survey signal, via a telecommunications network, conveying the phone number of the cellular phone and the channel identifier. The received audience survey signal is input to a controller 553 which retrieves the channel identifier and, using a time signal from a time signal generator 555, determines from a programme database 557 the programme currently being watched by the user of the cellular phone. In particular, the programme database stores the programmes for each channel identifier for each time and therefore the programme being watched can be determined from the time signal and channel identifier. The controller 553 then stores, in the audience survey database 559, data corresponding to the user, who is identified by the telephone number of the cellular phone, and the television programme being watched by the user. In this way, an almost instantaneous result for the audience survey is produced.

The acoustic data channel could also be used for opinion polling. For example, a television programme about a subject could have encoded within its audio track questions about the subject which are displayed by the cellular phone. The user is then able to input an answer to the cellular phone which automatically forwards the answer to a remote site where it is collated along with answers from other cellular phones. An advantage of such opinion polling is that the user of the cellular phone only has to press a button to answer a question and therefore it requires less effort by the user than other telephone opinion polls in which the user has to dial a telephone number, wait for connection and then give a response. This will encourage more people to participate in the opinion poll. For the above example where the opinion poll is associated with a television programme, the result can be given during the television programme. This is an example of how the acoustic data channel can be used to "close the loop" from a broadcaster to a viewer/listener (via a media broadcast) and from the viewer/listener back to the broadcaster (via a telecommunications network).

In another application, data for a quiz is transmitted to the cellular phone using the acoustic data channel. For example, a question is broadcast and detected by a plurality of cellular phones. The respective users of the cellular phones input their answers which are transmitted, via the cellular-communications network, back to the originator of the question. A prize could then be awarded for the fastest answer.

Those skilled in the art will appreciate that cellular phones which can determine their position are known. For example, the location of the cellular phone can be determined to within five kilometers by identifying the base station of the cellular communications network which is handling the RF communications with the cellular phone. More precise techniques are also known, for example the Enhanced Observed Time Difference (EOTD) technique which is described in U.S. Pat. No. 6,094,168, whose contents are hereby incorporated by reference, and can determine the position of the cellular phone to within about one hundred meters. Alternatively, the cellular phone could use a Global Positioning Systems (GPS) or other satellite-based systems to determine its position to within about ten meters by analysing RF signals received from satellites. However, the receiver circuitry for such satellite-based position detection systems is relatively expensive.

There will now be described a number of acoustic position detection systems which utilise acoustic signals to determine the position of a cellular phone. These acoustic position detection systems are particularly well suited to a cellular phone because the cellular phone already has a microphone and loudspeaker. Further, the processors found in digital cellular phones can typically be programmed to carry out the required position determining calculations.

A first acoustic position detection system of the invention will now be described with reference to FIGS. 23 and 24 in which a cellular phone determines its position from acoustic signals received from loudspeakers in the vicinity of the cellular phone. In the first acoustic position detection system, each of a plurality of loudspeakers within a shopping centre periodically transmits a respective different pseudo-noise code. On entering the shopping centre, the user of the cellular phone downloads into the cellular phone, via the cellular communications network, loudspeaker location data identifying the location and pseudo-noise code for each loudspeaker. Subsequently, the cellular phone is able to determine its position by identifying which loudspeakers are being detected by the cellular phone by their respective pseudo-noise codes.

In the first acoustic position detection system, the hardware components of the cellular phone are identical to those of the cellular phone described with reference to FIG. 6 for the first embodiment. However, in this embodiment the ROM in the cellular phone includes a routine which calculates the position of the cellular phone from received acoustic signals.

FIG. 23 is a schematic block diagram showing the functional configuration of the processor 601 of the cellular phone of the first acoustic position detection system for processing digital signals received from the ADC 113 corresponding to acoustic signals received by the microphone 23. As shown, a digital signal from the ADC 113 is processed by an audio processor module 603, a data processor module 605 and a position processor module 607. The audio processor module 603 is a cellular speech CODEC which is used during a telephone call to convert, in a conventional manner, received acoustic signals to a corresponding data stream for transmission, via the cellular telecommunications network, to a remote phone. The data processor module 605 is used to recover data signals embedded within a received acoustic signal as described in the first to fifth embodiments. The position determining module 607 is used to recover position data from received audio signals and to calculate the position of the cellular phone using the recovered position data.

Each of the audio processor module 603, data processor module 605 and position processor module 607 has an output which is connected to a multiplexer unit 609 which multiplexes signals received from the processor modules prior to transmission to the RF processing unit 121, and de-multiplexes signals received from the RF processor unit 121 and directs the de-multiplexed signals to the appropriate processor modules. In FIG. 23, only the connections from the processor modules to the ADC 113 and RF processing unit 121 are shown for ease of illustration. It will be appreciated that the processor modules will also be connected to the display 29, keyboard 31, loudspeaker 25 and the memory.

The operation of the position processor module 607 will now be described in more detail with reference to FIG. 24 which schematically shows the functional configuration of the position processor module 607.

On entering the shopping centre the user of the cellular phone selects a menu option for downloading the loudspeaker location data. In response to the user selection being detected by a keyboard interface 611, a loudspeaker position identifier 613 outputs a signal to the multiplexer 609 requesting loudspeaker location data. The multiplexer 609 forwards the request, via the RF processor unit 121 and the cellular communications network, to a remote server which responds by sending to the cellular phone loudspeaker location data for loudspeakers within the shopping centre back to the cellular phone. On receiving the loudspeaker location data, via the RF processor unit 121 and the multiplexer 609, the loudspeaker position identifier 613 stores the associated location and pseudo-noise code for each loudspeaker in the RAM 123 and forwards the pseudo-noise codes to a loudspeaker identifier 617.

Subsequently, digital signals from the ADC 113 corresponding to received acoustic signals are demodulated by a demodulator 615 using a conventional digital signal processing technique and then are processed by the loudspeaker identifier 617 to detect the presence of any of the pseudo-noise codes received with the loudspeaker location data. In particular the loudspeaker identifier 617 correlates the demodulated signal with each of the pseudo-noise codes of the loudspeaker location data in order to determine which pseudo-noise codes are present.

The detected pseudo-noise codes are then processed by a position calculator 619 which interrogates the loudspeaker position identifier 613 to retrieve the loudspeaker locations corresponding to the detected pseudo-noise codes from the RAM 123. The position calculator 619 then determines the position of the cellular phone from the retrieved loudspeaker locations. In particular, if only one loudspeaker is detected, then the position calculator 619 assumes that the cellular phone is positioned at the location of the detected loudspeaker. If two loudspeakers are detected, then the position calculator 619 assumes the cellular phone is positioned midway between the locations of the two detected loudspeakers. Similarly, if three or more loudspeakers are detected than the position calculator assumes the cellular phone is positioned at the centroid of the locations of the detected loudspeakers, i.e. the average co-ordinate position of the locations of the detected loudspeakers.

In this embodiment, the position calculator 619 sends a signal identifying the calculated position of the cellular phone to a display driver 621 which causes the calculated position to be displayed to the user of the cellular phone on the display 29. The position identifier 619 also transmits the calculated position to the nearest base station of the cellular communications network which forwards the calculated position to shops within the shopping centre. This enables the shops to identify people in the immediate vicinity of the shop, or even within the shop, and then send advertising data to the identified people. Advertising in this manner is advantageous because people do not have to go a significant distance to get to the shop, and therefore if they are interested by the advertisement they are more likely to visit the shop than if they were a long distance away.

In the first acoustic position detection system, the position of a cellular phone can be determined to within about ten meters if only one loudspeaker is detected, and progressively more accurately as further loudspeakers are detected. An estimated error range can be calculated from the number of different loudspeakers used to calculate the position of the cellular phone. This error range could then be transmitted or displayed along with the calculated position.

In the first acoustic position detection system, the position calculator 619 assumes that the cellular phone is positioned at the centroid of the locations of the detected loudspeakers. However, a more accurate determination of the position can be obtained by calculating weighting factors dependent on the strength of the received signal from each loudspeaker, and then performing a weighted addition of the co-ordinate locations of all the detected loudspeakers. The weighting factors can be determined from the magnitude of the correlation peak detected for each loudspeaker in the loudspeaker identifier 617.

A second acoustic position detection system will now be described with reference to FIGS. 25 to 28 in which the position determining technique described in International Patent Application WO 01/34264, whose contents are hereby incorporated by reference, is used to determine the position of the cellular phone.

FIG. 25 shows a cellular phone 631 in the vicinity of a master beacon 633 which is connected to three slave beacons 635a to 635c by respective cables 637a to 637c. In this embodiment, the master beacon 633 and slave beacons 635 are dedicated solely to the position detection system. The master beacon 633 and the slave beacons 635 transmit respective acoustic signals 639a to 639d which are detected by the microphone of the cellular phone 631 and are processed by the cellular phone 631 to determine the position of the cellular phone 631.

In the exemplary configuration shown in FIG. 25, the cellular phone 631 is substantially in the same plane as the master beacon 633 and the slave beacons 635. As shown in FIG. 25, an origin, that is a position (0,0) with respect to which other positions in the plane are determined by their distance away from the origin in perpendicular x and y directions, is defined by the position of the master beacon 633. The cellular phone 631 is at a position $(X_P, Y_P)$ relative to the origin and the slave beacons 635a to 635c are at positions $(X_1, Y_1)$, $(X_2, Y_2)$ and $(X_3, Y_3)$ respectively relative to the origin. As those skilled in the art will appreciate, the distance $r_1$ between the cellular phone 631 and the master beacon 633 and distances $r_2$, $r_3$, and $r_4$ between the cellular phone 631 and the slave beacon 635a, 635b and 635c respectively are given by:

$$X_P^2 + Y_P^2 = r_1^2 \qquad (2)$$

$$(X_1 - X_P)^2 + (Y_1 - Y_P)^2 = r_2^2 \qquad (3)$$

$$(X_2 - X_P)^2 + (Y_2 - Y_P)^2 = r_3^2 \qquad (4)$$

$$(X_3 - X_P)^2 + (Y_3 - Y_P)^2 = r_4^2 \qquad (5)$$

In the second acoustic position detection system, a differential time of flight measurement system is employed in which the difference between the time required for the acoustic signal 639a to travel from the master beacon 633 to the cellular phone 631 and the time required for each of the acoustic signals 639b to 639d to travel from the corresponding slave beacon 635 to the cellular phone 631 are measured. By multiplying each of these differential times by the speed of the acoustic signals 639, a value representative of the difference in the distance over which the acoustic signals 639 have traveled is obtained. In this way, a value $C_{12}$ is obtained which is equal to the difference between the distance from the cellular phone 631 to the master beacon 633 and the distance from the cellular phone 631 to the slave beacon 635a (i.e. $r_1-r_2$); a value $C_{13}$ is obtained for the difference between the distance from the cellular phone 631 to the master beacon 633 and the distance from the cellular phone 631 to the slave beacon 635b (i.e. $r_1-r_3$); and a value $C_{14}$ is obtained for the difference between the distance from the cellular phone 631 to the master beacon 5 and the distance from the cellular phone 631 to the slave beacon 635c (i.e. $r_1-r_4$).

By inserting $C_{12}$, $C_{13}$ and $C_{14}$ into Equations 3 to 5 and substituting $r_1^2$ for $X_P^2+Y_P^2$ (see Equation 2 above), the following equations can be derived:

$$2C_{12}r_1-2X_PX_1-2Y_PY_1=C_{12}^2-X_1^2-Y_1^2 \quad (6)$$

$$2C_{13}r_1-2X_PX_2-2Y_PY_2=C_{13}^2-X_2^2-Y_2^2 \quad (7)$$

$$2C_{14}r_1-2X_PX_3-2Y_PY_3=C_{14}^2-X_3^2-Y_3^2 \quad (8)$$

These equations can be solved, using Cramer's rule (see for example the Penguin Dictionary of Mathematics), to give the following expressions for $X_P$ and $Y_P$:

$$X_P = \frac{\begin{vmatrix} C_{12} & X_1^2+Y_1^2-C_{12}^2 & Y_1 \\ C_{13} & X_2^2+Y_2^2-C_{13}^2 & Y_2 \\ C_{14} & X_2^2+Y_3^2-C_{14}^2 & Y_3 \end{vmatrix}}{2\begin{vmatrix} C_{12} & X_1 & Y_1 \\ C_{13} & X_2 & Y_2 \\ C_{14} & X_3 & Y_3 \end{vmatrix}} \quad (9)$$

$$Y_P = \frac{\begin{vmatrix} C_{12} & X_1 & X_1^2+Y_1^2+C_{12}^2 \\ C_{13} & X_2 & X_2^2+Y_2^2-C_{13}^2 \\ C_{14} & X_3 & X_3^2+Y_3^2-C_{14}^2 \end{vmatrix}}{2\begin{vmatrix} C_{12} & X_1 & Y_1 \\ C_{13} & X_2 & Y_2 \\ C_{14} & X_3 & Y_3 \end{vmatrix}} \quad (10)$$

A skilled person will therefore appreciate that if the positions of the slave beacons 635 relative to the master beacon 633 and the speed of the acoustic signals 639 are known, and the time differences between the time taken for acoustic signals 639 to travel from each of the slave beacons 635 to the cellular phone 631 and the time taken for acoustic signals to travel from the master beacon 633 to the cellular phone 631 are measured, then the position of the cellular phone 631 can be determined relative to the master beacon 605.

A more detailed description of the components of the second acoustic position detection system shown in FIG. 25 will now be given with reference to FIGS. 26 to 28.

FIG. 26 shows electrical circuitry in the master beacon 633 which is used to generate audio data signals which correspond to the acoustic signals 639. As shown in FIG. 26, a control unit 651 in the master beacon 633 outputs control signals to each of four pseudo-noise code generators 653a to 653d which generate respective different orthogonal pseudo-noise codes. In particular, pseudo-noise code generator 653a generates a code sequence which will be referred to as PNA, pseudo-noise code generator 653b generates a code sequence which will be referred to as PNB, pseudo-noise code generator 653c generates a code sequence which will be referred to as PNC and pseudo-noise code generator 653d generates a code sequence which will be referred to as PND. The pseudo-noise codes are made orthogonal so that if any two of the pseudo-noise codes are multiplied together chip by chip another pseudo-noise sequence is generated.

In response to a signal from the control unit 651, each of the pseudo-noise code generators emits its respective pseudo-noise code sequence. The rate at which the control unit 651 signals the pseudo-noise code generators 653 to emit their respective pseudo-noise codes is dependent on the operating requirements of the position detection system. In particular, the time between pseudo-noise code emissions should preferably be significantly longer than the maximum likely time-of-flight difference for the acoustic signals 639 to travel to the cellular phone 631 to avoid any possibility of overlap between different sets of emissions. In this example, the maximum likely time-of-flight difference is 90 ms (corresponding to a difference in distance of approximately 30 m) and the control unit 651 signals the pseudo-noise code generators 653 to emit their respective pseudo-noise sequences once a second.

The output of each pseudo-noise code generator 653 is input to a respective one of the modulators 655a to 655d where it is used to modulate a carrier signal generated by a local oscillator 657. The spread spectrum signal output by each of the modulators 655 is amplified by a respective one of four audio amplifiers 659a to 659d to generate audio data signals $S_1(t)$, $S_2(t)$, $S_3(t)$ and $S_4(t)$. The audio data signal $S_1(t)$ is input to a loudspeaker 661, forming part of the master beacon 633, which generates the corresponding acoustic signal 639a. The audio data signals $S_2(t)$, $S_3(t)$ and $S_4(t)$ are conveyed to respective ones of the slave beacons 635, via the cables 637. Each slave beacon 635 has a loudspeaker which converts the incoming audio data signal S(t) into the corresponding acoustic signal 639.

The components of the cellular phone 631 of the second acoustic position detection system are identical to the components of the cellular phone of the first acoustic position detection system except for the position processor module. FIG. 27 schematically shows the functional configuration of the position processor module 669 of the cellular phone of the second acoustic position detection system. In FIG. 25, functional elements which are identical to corresponding functional elements of the first acoustic position detection system have been referenced by the same reference numerals.

As in the first acoustic position detection system, the user selects a menu option of the cellular phone 631 to download loudspeaker location data, i.e. the pseudo-random noise codes PNA to PND and the location for each respective beacon. On detection of the user selection by the keyboard interface 611, the beacon position identifier 613 downloads the loudspeaker location data and stores it in the RAM 123. The beacon position identifier 613 also informs a correlator unit 671 of the pseudo-noise codes PNA to PND.

As shown in FIG. 27, the digital signal output by the ADC 113 is demodulated by the demodulator 615, and then the demodulated signal is processed by a correlator unit 671 which correlates the demodulated signal with stored sequences corresponding to pseudo-noise codes PNA to PND. In this embodiment, the correlator unit 671 identifies the timing of the pseudo-noise code sequences from the master beacon 5 and slave beacons 7, measures the time intervals between the identified timings and outputs signals corresponding to $C_{12}$, $C_{13}$ and $C_{14}$ as defined hereinbefore.

The correlator unit 671 will now be described in more detail with reference to FIG. 28. As shown in FIG. 28, the demodulated signal is input to four correlators 681a to 681d which correlate the demodulated signal with respective ones of pseudo-noise codes PNA to PND, which are generated by first to fourth pseudo-noise code generators 683a to 683d respectively based on the data received from the beacon position identifier 613. A peak in the correlation value detected by a correlator 681 will occur whenever the pseudo-noise code associated with the correlator 681 is present in the demodulated signal.

As shown in FIG. 28, the outputs of the correlators 681 are processed by a correlator unit processor 685. The correlator unit processor 685 measures the difference in time between a peak received from the first correlator 681a and a peak received from the second correlator 681b, multiplies this time difference by the speed of the acoustic signals to calculate $C_{12}$ and outputs a signal corresponding to $C_{12}$. Similarly the correlator unit processor 685 calculates $C_{13}$ from the difference in time between a peak received from the first correlator 681a and a peak received from the third correlator 681c and calculates $C_{14}$ from the difference in time between a peak received from the first correlator 681a and a peak received from the fourth correlator 681d, and outputs signals corresponding to $C_{13}$ and $C_{14}$.

Returning to FIG. 27, the signals output by the correlator unit 671 are processed by a simultaneous equation solver 673. The simultaneous equations solver 673 interrogates the beacon position identifier 613 to retrieve the positions of the master beacon and the slave beacons 7 (i.e. (0,0), $(X_1,Y_1)$, $(X_2,Y_2)$ and $(X_3,Y_3)$) from the RAM 123. The simultaneous equation solver 673 then performs processing to calculate the position $(X_P,Y_P)$ of the cellular phone 631 using equations 9 and 10 above and the values for $C_{12}$, $C_{13}$ and $C_{14}$ received from the correlator unit 671 to determine the position of the cellular phone 631.

A position signal generator then generates signals for transmitting the determined position to the cellular communications network or displaying the determined position on the display 29.

In the first acoustic position detection system the position of the cellular phone is determined relative to the master beacon 633. Those skilled in the art will appreciate that if the loudspeaker location data includes the absolute position of the master beacon 633, then the absolute position of the cellular phone 631 can be calculated.

In the second acoustic position detection system the master beacon and slave beacons are dedicated to the position determining system. However, loudspeakers forming part of a public address system, for example, could also be used in which case each loudspeaker could include its own pseudo-noise code generator. It is necessary, however, that the loudspeakers all emit their own pseudo-noise codes with a predetermined timing.

More than four loudspeakers could be used in the second acoustic position detection system, and if signals are received from more than four loudspeakers which are not in the same plane then the position of the cellular phone can be calculated in three dimensions.

In the first and second acoustic position detection systems, loudspeaker location data is downloaded via the cellular communications network. Alternatively, an acoustic data channel could be used to transmit the loudspeaker location data to the cellular phone. The coordinates of all the loudspeakers could either be simultaneously downloaded via the acoustic data channel, or alternatively each loudspeaker could transmit its own coordinates to the cellular phone over the acoustic data channel.

In the first and second acoustic position detection systems, all the loudspeakers output respective different pseudo-noise codes. This requires the cellular phone to check for a large number of pseudo-noise codes. Alternatively, the same pseudo-noise code could be used for different loudspeakers, provided that there are some loudspeakers which are associated with a unique pseudo-noise code which is not used by any other loudspeaker. The loudspeakers having a unique pseudo-noise code each has an associated zone and a cellular phone can determine which zone it is in from which of the unique pseudo-noise codes are detected. Then, loudspeakers having the same pseudo-noise code can be used provided there are no positions where a cellular phone can detect the same pseudo-noise code output by two different speakers.

In the above position detection systems, each loudspeaker has an associated pseudo-noise code which is used by the cellular phone for detecting the position of the cellular phone. This pseudo-noise code could also be used for the acoustic data channel. For the acoustic data channel, each loudspeaker could have a respective different pair of pseudo-noise codes which are used to encode the binary data values, and the cellular phone could determine its position by identifying which pseudo-noise codes are being used for the acoustic data channel. Preferably, the pseudo-noise code for one of the binary data values is the same for all loudspeakers so that only the pseudo-noise code for the other binary data value varies. This reduces the amount of processing performed by the cellular phone.

In all the above described position detection systems, the cellular phone performs the position determining calculation. However, those skilled in the art will appreciate that the cellular phone could transmit raw data, for example identified pseudo-noise codes, to a remote location where the actual position determination calculation is performed. Alternatively, the cellular phone could transmit a signal which is detected by one or more microphones and the position of the cellular phone is then calculated dependent on which microphones detect the signal from the cellular phone and optionally also the timing at which the microphones receive the signal. If the position of the cellular phone is calculated away from the cellular phone, then the calculated position can be transmitted to the cellular phone for display to a user.

In the first and second acoustic position detection systems, the cellular phone also includes a data processor module for communicating vis the acoustic data channel. This is not, however, essential to the acoustic position detection systems.

As described in the first acoustic position detection system, knowledge of the position of a cellular phone enables targeted advertising to be performed. Another situation in which knowledge of the position of a cellular phone would be advantageous is in an airport. Specifically, the locations of air passengers could be determined from their cellular phones so that they could be found quickly if they are late for boarding.

In an embodiment of an acoustic position detection system, an electronic boarding card is transmitted to a cellular phone of an air passenger over the acoustic data channel, and the cellular phone responds by sending its phone number. Then, using a position detection system, the location of the cellular phone is monitored. Of course, if the air passenger is late, he can be called on his cellular phone to warn him that his flight is leaving imminently. Then, in order to board, the air passenger transmits the electronic boarding card over the acoustic data channel.

As cellular phones are relatively inexpensive, in an alternative embodiment a cellular phone including an electronic boarding card is handed to each air passenger when they check in. The air passenger's movements are then monitored via the cellular phone, and then the cellular phone is collected from the air passenger when boarding the flight.

In embodiments, data transmitted by the cellular phone is enhanced with location data calculated by the cellular phone instead of, or in addition to, the user profile data. In this way, for example, an audience survey station could determine the geographical distribution of the audience for a television/radio programme. The location data can be calculated either by the cellular phone itself, or from a signal received by the cellular phone from position determining circuitry external to the cellular phone.

Those skilled in the art will appreciate that the above embodiments described with reference to an airport could also be employed in a railway or bus station.

In preferred embodiments, the data transmitted by the cellular phone is enhanced by adding user profile data stored in the cellular phone. This is particularly useful for the audience survey and opinion polling applications described above because the collected data can be analysed in accordance with user characteristics contained in the user profile data. For example, if the user profile data specified the age of the user then the audience survey station could determine the age profile of the audience of a television/radio programme.

An advantage of sending enhanced data including data which is either stored in the cellular phone, for example the user profile data, or calculated by the cellular phone, for example location data, is that no additional effort is required by the user.

In a further alternative application, the encoder is incorporated within a public address system, for example in an airport or a railway station, and the text of an announcement made over the public address system is encoded within the acoustic signal conveying the announcement. Then, if a user does not hear the announcement, the text of the announcement can be displayed to the user by the user's cellular phone.

In a further application, the data signal added to a broadcast audio track includes a source identifier and a time stamp. The user of a cellular phone including a decoder for decoding the data signal is then able to transmit, via the cellular communications network, the source identifier and the time stamp to a remote server which stores a database identifying for each combination of source identifier and time stamp the title of the music being played. The remote server then transmits the title associated with the received source identifier and time stamp to the cellular phone which displays the title to the user of the cellular phone. For example, if a radio station is playing a song having a data signal encoded therein with a source identifier identifying the radio station and a time stamp identifying the track number of the song being played (e.g. the tenth song played by that radio station that day), then the user can download from the remote server the title of the song. Alternatively, the audio track may be a song in a film and the source identifier identifies the film and the time stamp identifies where in the film the song is being played.

In the first to fifth embodiments, a data signal is encoded within an audio track of a television programme in a television studio. This encoding need not, however, occur prior to the broadcasting of the television signal. For example, the data signal could be carried within the vertical blanking intervals of the video track and either a television set or a "set-top box" could then extract the data signal from the video track and encode it within the audio track. The encoder need not, therefore, be in the television studio but could also, for example, be in a television or a set-top box.

The acoustic data channel could also be used to transmit messages which are either broadcast or selectively addressed to particular cellular phones. In an embodiment, the cellular phone includes an acoustic-only mode in which the RF output is disabled but the phone is still able to detect and analyse acoustic signals to recover data. This is particularly advantageous for transmitting messages in areas where, for safety reasons, cellular phones cannot normally be used because of their RF emissions. Examples of such areas include airports, petrol stations and hospitals.

The acoustic data channel for transmitting messages could be formed by any commonly encountered audio source. For example, the audio track of a television/radio programme or the output of a public address system could be used. In a particular application, the public address system within a shop is used to transmit message data about, for example, special offers available in the shop.

The ability to encode data which is specific to a particular geographical area is useful. For example, a television programme could be broadcast by several different television companies covering different geographical areas. The data encoded within the television programme could therefore be varied from area to area. In this way, if the data is associated with contact addresses, then the data encoded within the television programme for each television station could be associated with only the contact addresses within the geographical area covered by the television station. This is advantageous because it reduces the amount of data sent to the user by automatically removing data which is unlikely to be relevant.

The data encoded within the audio track could also be used to control the operation of the cellular phone. For example, in locations such as cinemas, aeroplanes and petrol stations where cellular phones should not be used, a data signal can be broadcast to the cellular phone which either switches the cellular phone off or puts it into a silent mode as appropriate.

In one application, the data encoded within the audio track is for a ring tone for the cellular phone, which responds by storing the ring tone data in a NVRAM (or other type of non-volatile memory) within the cellular phone. The ring tone generator of the cellular phone can then generate a ring tone corresponding to the stored ring tone data. In an embodiment, a recorded song has encoded therein data for a ring tone sounding like a segment of the song, and the cellular phone decodes the ring tone so that the ring tone of the cellular phone can be set to sound like the song.

In another application, the data for an icon is encoded within the audio track for decoding by the cellular phone. The icon can then either be displayed by the cellular phone or included in data messages to other cellular phones.

The acoustic data channel could be used to transmit small application files for the cellular phone. For example, for "Java phones" small application files commonly referred to as APPlets (sometimes referred to as MIDlets) could be received by the cellular phone via the acoustic data channel. The acoustic data channel could also be used to trigger an application file which has already been downloaded onto the cellular phone. For example, a Java phone could have stored an APPlet for displaying an animation sequence and the APPlet could be activated, and the animation sequence accordingly displayed, in response to a trigger signal received via the acoustic data channel.

Application files could also be downloaded into the cellular phone corresponding to computer characters whose behaviour varies in response to a user's actions. In particular, a "behaviour" algorithm within the application file determines the actions of the computer character on the basis of inputs by the user of the cellular phone. The user is therefore able to nurture the behaviour of the computer character. Such computer characters are known, for example Tamagochi. The acoustic data channel could then be used to convey control data which modify the behaviour algorithm of a computer character so that the behaviour of the computer character reacts to events occurring around the user of the cellular phone. For example, a horror film could have control data encoded within its sound track which makes the computer character behave in a manner indicative of being agitated or scared. In this way, the computer character is able to react to external events.

In all the above applications and embodiments, a single acoustic data channel is provided for a cellular phone. However, more than one acoustic data channel could be provided. For example, if spread spectrum encoding is used then different pseudo-noise codes could be allocated to each acoustic data channel (i.e. a code division multiple access (CDMA) arrangement).

Application files containing pseudo-noise codes for establishing an acoustic data channel and configuration instructions for responding to data received via that acoustic data channel could also be downloaded into the cellular phone. For example, the acoustic data channel corresponding to an application file could be associated with a particular company who send proprietary web page identifiers via the acoustic data channel, and the cellular phone responds by forwarding the proprietary web page identifiers to a server operated by the company. A cellular phone could have more than one of these application files stored therein, with the user being able to select one of the application files, and therefore the pseudo-noise codes used for decoding a detected acoustic signal, using a menu.

In an embodiment, an acoustic control channel is provided which uses pseudo-noise codes which are programmed within the cellular phones during manufacture. Subsequently, an application file containing pseudo-noise codes for establishing an additional acoustic data channel and configuration instructions for responding to data received via the additional data channel, is transmitted over the acoustic control channel. In an alternative embodiment, the application file is downloaded via the cellular communications network.

A problem with transmitting data acoustically is that the data transmission rates are generally slow, especially if it is desired to minimise the obtrusiveness of the acoustic data signal to a listener. For any application which requires the downloading of a significant amount of data, for example an APPlet file, this problem can be at least partially solved by transmitting a web page address, which requires significantly less data, for a web page from which the data is downloadable, using for example the Wireless Applications Protocol, via the cellular communications network. Alternatively, the data could be downloaded using e-mail. Further, it is not essential that the data is downloaded from a web page because it could be downloaded from any information source accessible via the cellular communications network.

As the bandwidth required to transmit an electrical signal conveying an original audio track modified by having a data signal encoded therein is no more than required for transmitting an electrical signal conveying the original audio track, during a call a cellular phone could encode a data signal within the outgoing RF signals conveying voice data for receipt by another cellular phone which retrieves the data signal from the received voice data. The data signal could, for example, correspond to a business card.

In all the above described applications and embodiments, the cellular phone or other telephone apparatus comprises either an encoder for encoding a data signal within an audio track, or a decoder for decoding a data signal within an electrical signal corresponding to a detected acoustic signal or both an encoder and a decoder. However, this is not essential because a conventional telephone apparatus could be used which either receives from a remote device having an encoder, via a telecommunications network, an audio track which already has a data signal encoded within it for outputting by the telephone apparatus as an acoustic signal, or could transmit, via the telecommunications network, an electrical signal corresponding to a detected acoustic signal to a remote device having a decoder.

The sixth, seventh and eighth embodiments describe systems in which a cellular phone encodes a data signal within an acoustic signal emitted by the cellular phone for detection by an electronic device. In the sixth and eighth embodiments, the data signal is encoded in a preset audio sequence whose only purpose is to alert the user that a data transfer is taking place. This preset audio sequence is therefore not essential and the spread data signal could be directly output.

In the sixth embodiment, user data is transmitted between two cellular phones using the acoustic data channel. Alternatively, the acoustic data channel could be used to enable two cellular phones to interact with each other. In an embodiment, an interactive game is provided which allows two players to play against each other using their respective cellular phones with data being transmitted between the cellular phones using the acoustic data channel. For example, the interactive game could be a chess game which has the advantage that only a small amount of data need be transmitted between the two cellular phones.

In the seventh and eighth embodiments, the control signals are used to activate corresponding routines within the electronic device. However, those skilled in the art will appreciate that the control signals could themselves convey the routines which are implemented by the electronic device. For example, the control signal could convey information enabling a speech synthesiser located within the electronic device to produce a desired sound, for example a word or phrase.

In the seventh and eighth embodiments, the control signals emitted by the cellular phone are used to control a toy. Those skilled in the art will appreciate that the control signals could control devices other than toys. For example, the cellular phone could be used as a remote control device so that by inputting instructions into the cellular phone, acoustic control signals are output for controlling a television, a home entertainment system, an airconditioning unit or another home appliance.

The cellular phone can also be used to store credits, in which case a portion of either the RAM or NVRAM is dedicated to storing a value indicative of the number of credits held by the user of the cellular phone. These credits can be downloaded into the cellular phone either via the conventional cellular communications network or via the acoustic data channel. The cellular phone can then output, via the acoustic data channel, control signals to vending appliances in order to purchase goods. The credits stored in the cellular phone could be accrued on a loyalty basis. For example, each time a user of the cellular phone goes to a particular cinema chain, a device within the cinema sends, via the acoustic data channel, a credit to the cellular phone, which in response increments the number of stored credits by one. When the number of credits stored in the cellular phone reaches a predetermined number the cellular phone can emit a control signal, via the acoustic data channel, which reduces the price of a cinema ticket.

As described previously, the cellular phone could be used to store an electronic boarding card for an airflight. Alternatively, the cellular phone could receive electronic tickets, via the acoustic data channel, for other public transport systems such as rail or coach. The cellular phone could also emit a signal, via the acoustic data channel, which controls ticket barriers provided in a public transport system when the cellular phone is storing an electronic ticket.

The cellular phone could also interact via the acoustic data channel with a network device connected to a network other than a cellular communications network, for example a Bluetooth network. In this way, the cellular phone can communicate with remote devices via networks other than the cellular communications network.

In some of the above embodiments, SMS messages are used to convey data to or from the cellular phone. Other alternative RF data transmission techniques could be used, for example EMS messaging and MMS messaging.

Although hardware encoders are used in the described embodiments, those skilled in the art will appreciate that the function of these hardware encoders could also be performed by a computer apparatus running appropriate software. Similarly, the function of the software decoder of the first to fifth embodiments could be implemented in a hardware decoder and the function of the hardware decoder of the sixth to eighth embodiments could be implemented by a software decoder. Further, the position detection routines of the described acoustic position detection systems could be implemented in hardware.

The invention therefore also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD-ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

Those skilled in the art will appreciate that the invention can be applied to cellular phones which do not conform with the GSM specification. Further, web page data can be retrieved using protocols other than the Wireless Application Protocol.

The first to fifth embodiments describe five different encoders. Those skilled in the art will appreciate that any of these five encoders could be used in the above described further embodiments and applications.

In an embodiment, the data signal generator and the encoder are in physically separated units, and the data signal is input to an input port of the encoder unit. In an alternative embodiment, the encoder and the decoder could be housed in the same unit (i.e. share a common housing).

In the second embodiment, the carrier frequency used in the modulator is varied so that the centre frequency of the spread data signal is positioned in a relatively high energy portion of the audio track. In particular, the energy in 2048 frequency sub-bands is monitored and the carrier frequency of the modulator varied accordingly. In an alternative embodiment, the number of frequency sub-bands could be reduced, for example to eight, in order to reduce the amount of processing required.

In the decoder for the second embodiment, the received audio track is analysed to determine the carrier frequency used in the modulator in the encoder. However, if the encoder uses a small number of frequency sub-bands, and therefore only a small number of carrier frequencies are possible, then in an alternative embodiment the demodulator in the decoder passes the received audio track through a number of separate channels with each channel using a respective one of the possible carrier frequencies, and subsequently determines which channel provides the strongest signal in order to recover the data signal. This has the advantage over determining the carrier frequency from the received audio track that if the audio track is altered by the communication channel between the encoder and the decoder then the data signal is still correctly recovered.

In the third embodiment, a linear predictive coding (LPC) algorithm is used to separate the audio track into a tonal part, whose values are determinable from each other, and a noise part, whose values are apparently random. Alternatively, other auto-regressive algorithms could be used to isolate a random part of the audio track which can be at least partially replaced by a shaped spread spectrum signal. Further, the frequency spectrum of the audio track could be analysed to identify tonal components which are subsequently removed to separate the tonal part and the noise part.

In the fourth embodiment, the tonality of the audio track is determined, by analysing the frequency spectrum of the audio track. Alternatively, the tonality could be determined by applying a time series model, for example an LPC model, having a fixed number of coefficients and determining the power in the modelled signal corresponding to the coefficients.

In the fifth embodiment, the number of LP coefficients, the level of the psycho-acoustic encoding and the gain factor G used in the variable combiner are selected by a user. Alternatively, one or two or all three of these variables could be automatically set by the encoder. For example, the number of LP coefficients used could be determined from the tonality of the audio track.

In the fifth embodiment, the noise part $N(t)$ and the shaped signal $S(t)$ are input to a variable combiner, and the output of the variable combiner is added to the tonal part $P(t)$ to form the modified audio track. Alternatively, the original audio track could be input to the variable combiner instead of the noise part $N(t)$, as in the fourth embodiment, so that the output of the variable combiner forms the modified audio track and the LPC analysis is only used for shaping the modulated signal $G(t)$. In other words, the modulated signal $G(t)$ is shaped to approximate the noise part $N(t)$ of an audio track to form a shaped signal $S(t)$, and then the shaped signal $S(t)$ is added directly to the audio track in a variable combiner. In an embodiment, the gain factor G for the variable combiner is automatically set so that the signal to noise ratio of the data signal in the modified audio track is within a predetermined range, for example between −10 and −15 dB. The signal to noise ratio can be calculated by inputting the shaped data signal $S(t)$ into a first power monitor, inputting the audio track into a second power monitor, and then dividing the power in the shaped data signal by the total power level obtained by adding the power in the audio track and the power in the shaped data signal. Alternatively, the signal to noise ratio could be calculated by dividing the power in the shaped data signal by the power in the audio track.

Those skilled in the art will appreciate that for some applications the described shaping techniques for shaping the data signal to reduce the obtrusiveness of the data signal in the modified audio track are not required because it is not essential for the audio track to be reproduced at high quality.

In addition, the encoder of the fifth embodiment could be modified to remove the variable combiner, in which case the signal shaped using the psycho-acoustic algorithm is added directly to the tonal part of the audio track.

For automated encoders which do not require a user input, the encoding can be carried out in real-time and therefore is suitable for, for example, real-time addition to television broadcasts or public address announcements.

In the described embodiments, the data signal F(t) is continuously added to the audio track. Alternatively, the encoder could identify the portions of the audio track which are better suited to hiding the data signal and then only encode data in those identified portions. In an embodiment, the audio track is input to a spectrum analyser which determines the tonality of the audio track (for example the spectrum analyser 201 of the fifth embodiment) and only adds the data signal in the portions of the audio track for which the tonality is below a predetermined level. In another embodiment, the encoder determines which portions are better suited to hide the data signal based on the power of the audio track, while in yet another embodiment the encoder determines the portions based on a combination of the power and tonality.

As described above, in some applications control data for synchronising an operation of a cellular phone with a broadcast audio signal, for example for a television program or a radio program, is encoded within the audio signal and the acoustic wave corresponding to the audio signal is detected by a cellular phone which decodes the control data and responds with the required synchronisation. A problem with such synchronised systems is that sometimes the audio track at the moment the response by the cellular phone is required is too quiet to hide the control data effectively. This problem can be alleviated by sending the control data in advance during a louder portion of the audio track along with timing data indicating the timing when the cellular phone should respond in accordance with the control data. Then, in the quieter portion of the audio track when the response takes place, no data need be transmitted.

The timing data need not be transmitted simultaneously with control data, but could be transmitted separately. For example, at the beginning of a data signal conveying a sequence of control data, timing data could be transmitted indicating that the response to each item of control data is to be delayed for a preset period of time. Although the time delay is not optimised for each item of control data, sending timing data in this way reduces the total amount of data which needs to be sent.

In the first to eighth embodiments, the data signal is spread over audible frequencies using DSSS encoding. As those skilled in the art will appreciate, signals encoded using DSSS encoding can be decoded in two main ways. In one way, the encoded signal is synchronously multiplied by the same pseudo-noise code which was used to encode the signal, a technique commonly referred to as coherent detection. In the other way, a correlator such as a matched filter is used to correlate the encoded signal with the pseudo-noise code which was used to encode the signal, a technique commonly referred to as incoherent detection.

In the first to fifth embodiments, a data bit whose value is "0" is represented by a pseudo-noise code PN0 and a data bit whose value is "1" is represented by a pseudo-noise code PN1. Those skilled in the art will appreciate that if coherent decoding is used, then the pseudo-noise code PN0 can be the inverse of pseudo-noise code PN1.

In an embodiment, a first plurality of pseudo-noise codes are provided for representing a data bit whose value is "0" and a second plurality of pseudo-noise codes are provided for representing a data bit whose value is "1". The choice of which pseudo-noise code is used to encode a data bit can then be based upon which pseudo-noise code produces a data signal which is the least perceptible when added to an audio track. Subsequently, the decoder could either analyse the audio track to determine which pseudo-noise code had been used or decode the received audio track using all possible pseudo-noise codes. Decoding using all possible pseudo-noise codes has the advantage that the decoding is more robust if the audio track is altered by the communication channel between the encoder and the decoder. However, if there are a large number of pseudo-noise codes then analysing the audio track to determine which pseudo-noise code was used requires less processing power.

The energy of a data signal can be spread over a wide range of frequencies by using techniques other than DSSS encoding. For example, an Orthogonal Frequency Division Modulation (OFDM) technique can be used in which, for example, 256 narrow-band orthogonal carriers carry identical data. These 256 narrow-band carriers are evenly distributed in the frequency range of 1 to 5 kHz and thus spreading of the energy of the data signal is achieved. The original data signal can then be reconstructed by demodulating the recombining each of the narrow-band signals.

It will be appreciated by a person skilled in the art that still further techniques could be used to spread the energy of the data signal. For example, frequency hopping could be used in which the frequency of the modulated data signal is changed in a random manner.

Although spread spectrum encoding is preferred because it reduces the noticeability of the acoustic data channel to a listener, it is not an essential feature of the invention. The acoustic data channel could also be formed, for example, by using a dedicated narrow frequency range. Alternatively, a data signal could be encoded within an audio track by systematically modifying either frequency or time information within the audio track. For example, an echo modulation scheme could be used in which an echo signal is added with a time delay which is varied in accordance with a data signal. Alternatively, a critical band encoding technique could be used in which each data value is associated with a respective set of narrow-band frequencies.

In another embodiment, the acoustic data channel uses an ultrasonic link which has the advantage that it is not audible to the user of the cellular phone.

In the first to eighth embodiments, phase shift keying is used to modulate the spread data signal. Those skilled in the art will appreciate that other modulation schemes, for example frequency shift keying or quadrature amplitude modulation, could be used instead.

For ease of explanation, the data signal in the described embodiments has been encoded within a single channel audio track. However, the data signal could also be encoded within a stereo audio track having two or more channels. The data signal can be added synchronously to more than one channel of the stereo audio track or with a time offset of, for example, 150 ms between the channels. Introducing a time offset has the advantage of adding an additional level of time diversity, thereby enabling a more robust regeneration of the data signal because there is less chance of losing data due to background noise (i.e. noise which is not the modified audio track). Alternatively, two different broadband signals could be generated with each one being added to a respective channel of the stereo audio track.

Alternatively, for a multi-channel audio track, the data signal need not be encoded in every channel of the audio track. For example, for a television programme in which one channel of the audio track carries voice data and another channel of the audio track carries background music data, the data signal could be added only to the channel carrying background music data.

In some embodiments, a psycho-acoustic algorithm is used to reduce the obtrusiveness of the data signal within the modified audio track. However, a psycho-acoustic algorithm is not essential and could be replaced by a simpler algorithm which requires less processing power.

Those skilled in the art will appreciate that conventional equalisation techniques, for example using a rake receiver, can be applied in the decoder to improve the bit error rate in the presence of multi-path components or frequency response impairments. Further, an automatic gain control circuit could be included at the input to the decoder.

The precise values of the bit rates, chip rates, sampling rates and modulation frequencies described in the detailed embodiments are not essential features of the invention and can be varied without departing from the invention. Further, while in the described embodiments the data signal is a binary signal, the data signal could be any narrow band signal, for example a modulated signal in which frequency shift keying has been used to represent a "1" data bit by a first frequency and a "0" data bit as second different frequency. Further, those skilled in the art will appreciate that the order in which the spreading, modulating and shaping is performed in the encoder can be varied. Although digital signal processing techniques have been described as the preferred implementation of the invention, analogue processing techniques could be used instead.

As those skilled in the art will appreciate, the sampling rate of 22.05 kHz matches that used for one channel of a compact disc and therefore the encoders and decoders described for these embodiments are suitable for use in systems where a data signal is conveyed by an audio track recorded on a compact disc. A sampling rate of 44.1 kHz could also be used for recording the data signal on a compact disc, and a sampling rate of 48 kHz could be used for recording the data signal on a DVD.

It will be appreciated that the term audio track refers to an electrical signal which is intended to be reproduced as a corresponding acoustic signal by a loudspeaker in the audible range of frequencies, which typically spans from 20 Hz to 20,000 Hz. The duration of the audio track can be short, for example the ring tone of a cellular phone or doorbell, or long, for example the soundtrack to a movie.

The invention can also be applied to other cellular communication devices such as pagers.

The invention claimed is:

1. A cellular telephone comprising:
   memory storing, in use, ID information associated with the cellular telephone;
   a microphone operable to receive an acoustic signal of a user's voice or of an audio transmission and for converting the received acoustic signal into a corresponding electrical signal;
   an RF processor operable to transmit voice and/or data signals to and to receive data signals from a cellular telephone network; and
   a data processor, coupled to said microphone and to said RF processor, and operable, in a first mode: to cause voice signals corresponding to the user's voice to be passed to said RF processor for transmission to said cellular telephone network, and operable, in a second mode: to process audio transmission signals received by said microphone to obtain audience survey data relating to the audio transmission, and operable to pass to the RF processor for transmission to a remote audience survey station, for audience survey analysis, data representing: i) the stored ID information associated with the cellular telephone; and ii) the obtained audience survey data.

2. A cellular telephone according to claim 1, wherein said RF processor is operable to transmit said data representing said ID information associated with the cellular telephone and the audience survey data to said remote audience survey station via the cellular telecommunications network.

3. A cellular telephone according to claim 1, wherein said audience survey data is encoded within the audio transmission and wherein said data processor is operable to decode the encoded audience survey data.

4. A cellular telephone according to claim 3, wherein said audience survey data is encoded within the audio using spread spectrum encoding and wherein said data processor is operable to decode the encoded audience survey data using spread spectrum decoding.

5. A cellular telephone according to claim 1, wherein the audience survey data comprises data identifying the audio transmission.

6. A cellular telephone according to claim 1, wherein the ID information associated with the cellular telephone comprises the telephone number of the cellular telephone.

7. A cellular telephone according to claim 1, wherein said RF processor is operable to transmit said data representing said ID information associated with the cellular telephone and the audience survey data automatically to the remote audience survey station.

8. A cellular telephone according to claim 7, wherein said RF processor is operable to transmit said data representing said ID information associated with the cellular telephone and the audience survey data immediately after the audience survey data has been recovered.

9. A cellular telephone according to claim 8, wherein the audience survey data comprises data identifying a broadcast channel associated with the audio transmission.

10. A cellular telephone according to claim 1, wherein the memory stores, in use, user profile data associated with the user of the cellular telephone and wherein the RF processor is operable to transmit the user profile data as well as the audience survey data to said remote audience survey station via a telecommunications network.

11. A cellular telephone according to claim 1, wherein the memory stores, in use, location information defining a geographical location of the cellular telephone and wherein the RF processor is operable to transmit the stored location data to the remote audience survey station.

12. A cellular telephone according to claim 1, wherein said audience survey data identifies a broadcast or recorded programme.

13. A cellular telephone according to claim 12, wherein said audience survey data identifies a broadcast or recorded radio or television programme.

14. A cellular telephone according to claim 1, wherein data recovered from the audio transmission causes a question to be output to a user for opinion polling.

15. A cellular telephone according to claim 14, operable to output the question to the user and operable to receive an answer from the user and wherein said RF processor is operable to transmit said answer to a remote device for collation with corresponding answers from other users for opinion polling purposes.

16. A cellular telephone according to claim 15, comprising a button for activation by a user to answer the question.

17. A cellular telephone according to claim 15, wherein the audio transmission is a radio or television broadcast and wherein the question relates to a content of the radio or television broadcast.

* * * * *